United States Patent
Kitaura et al.

(10) Patent No.: US 9,805,278 B2
(45) Date of Patent: Oct. 31, 2017

(54) DRIVING SUPPORT APPARATUS, DRIVING SUPPORT METHOD, AND COMPUTER-READABLE RECORDING MEDIUM STORING DRIVING SUPPORT PROGRAM

(71) Applicant: FUJITSU LIMITED, Kawasaki-shi, Kanagawa (JP)

(72) Inventors: Asako Kitaura, Kawasaki (JP); Yasuhiko Nakano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 369 days.

(21) Appl. No.: 14/551,267

(22) Filed: Nov. 24, 2014

(65) Prior Publication Data

US 2015/0154461 A1 Jun. 4, 2015

(30) Foreign Application Priority Data

Nov. 29, 2013 (JP) ................................. 2013-248352
Jun. 26, 2014 (JP) ................................. 2014-131728

(51) Int. Cl.
*G06K 9/00* (2006.01)

(52) U.S. Cl.
CPC ..... *G06K 9/00845* (2013.01); *G06K 9/00604* (2013.01); *G06K 9/00993* (2013.01)

(58) Field of Classification Search
None
See application file for complete search history.

(56) References Cited

U.S. PATENT DOCUMENTS

2010/0033333 A1* 2/2010 Victor .................... A61B 3/113
340/576

FOREIGN PATENT DOCUMENTS

| JP | 8-178712 | 7/1996 |
| JP | 2009-540459 | 11/2009 |
| JP | 2010-170189 | 8/2010 |

* cited by examiner

*Primary Examiner* — Thai Tran
*Assistant Examiner* — Christopher T Braniff
(74) *Attorney, Agent, or Firm* — Staas & Halsey LLP

(57) ABSTRACT

A driving support apparatus includes a line-of-data judgment unit configured to judge a type of line-of-sight data indicating a direction of the line of sight of a driver; an estimation unit configured to estimate an attentive watching state of the driver on a target area to be attentively watched by performing based on the target area being set depending on a driving situation based on vehicle state information and a direction of the line of sight indicated by a plurality of pieces of line-of-sight data acquired in a judgment time; and a confidence-level-calculation unit configured to calculate a confidence level of an estimation result of the attentive watching state by performing based on one of setting accuracy of the target area, and a configuration state of line-of-sight data associated with each type of the plurality of pieces of line-of-sight data acquired in the judgment time.

20 Claims, 26 Drawing Sheets

| ACQUISITION TIME | VALUE | VALIDITY | LINE-OF-SIGHT CLASSIFICATION | INTERPOLATED OR NOT |
|---|---|---|---|---|
| t−2 | XXX | VALID | FIXATION | — |
| t−1 | XXY | VALID | FIXATION | INTERPOLATED |
| t | — | INVALID | — | — |
| ⋮ | ⋮ | ⋮ | ⋮ | ⋮ |

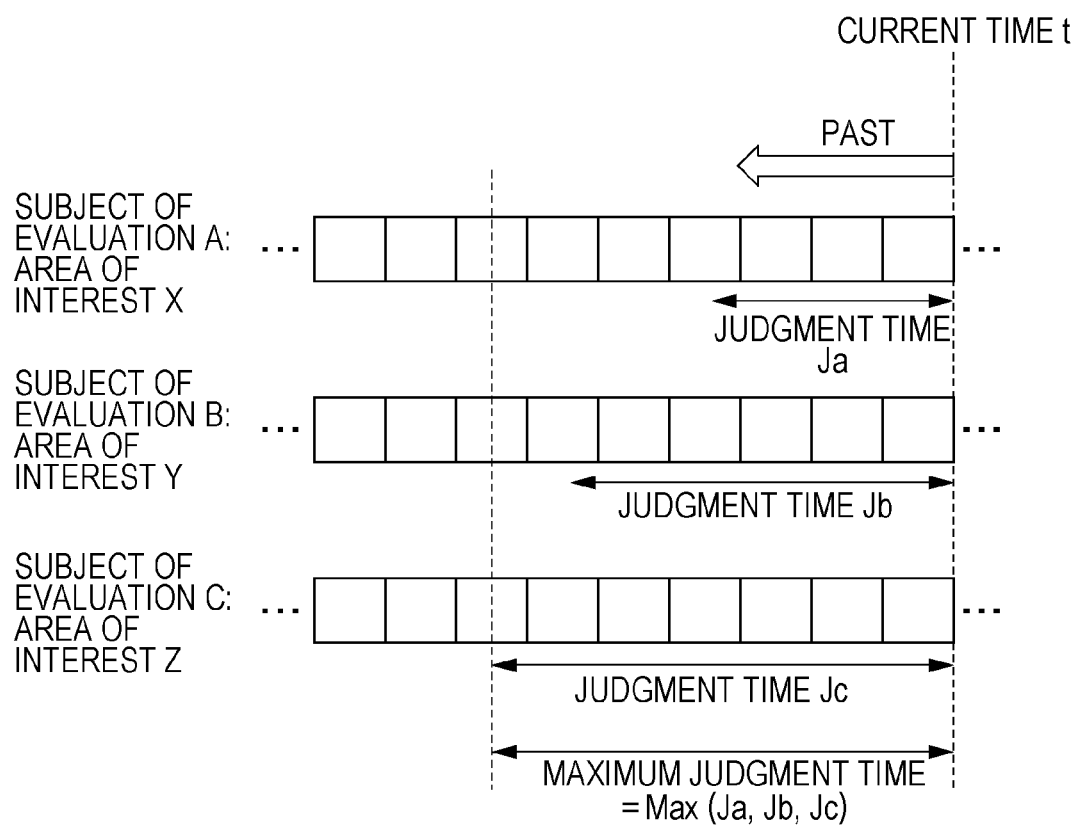

FIG. 7

| DRIVING SCENE | METHOD OF ESTIMATING DRIVING SITUATION | SUBJECT OF EVALUATION | AREA SET AS AREA OF INTEREST | JUDGMENT TIME | CONFIDENCE LEVEL CALCULATION CONDITION | CONFIDENCE LEVEL CALCULATION CONDITION | CONFIDENCE LEVEL THRESHOLD |
|---|---|---|---|---|---|---|---|
| TRAVELING STRAIGHT ON HIGHWAY | ROAD TYPE (HIGHWAY) + ROAD SHAPE (STRAIGHT ROAD) + STEERING (STRAIGHT) | EVALUATION ON FORWARD VISUAL CONFIRMATION P | FORWARD ROAD ON WHICH VEHICLE IS DRIVEN | SHORT PERIOD A | CONFIGURATION | | NORMAL |
| TRAVELLING ON CURVED ROAD | ROAD TYPE (CURVED ROAD) + STEERING (TURNING SLIGHTLY) + ACCELERATION SENSOR (IN RIGHT OR LEFT DIRECTION) | EVALUATION ON FORWARD VISUAL CONFIRMATION Q | FORWARD ROAD ON WHICH VEHICLE IS DRIVEN | SHORT PERIOD A | CONFIGURATION + AREA | | LOW |
| TRAVELLING ON CONGESTED ROAD (STRAIGHT) | ROAD POSITION (STRAIGHT LANE) + SPEED (STOPPING) + NO BLINKING + NUMBER OF VEHICLES IN CLOSE AREA, DISTANCE TO VEHICLES, DENSITY (CONGESTION) | EVALUATION ON FORWARD VISUAL CONFIRMATION P | FORWARD ROAD ON WHICH VEHICLE IS DRIVEN | SHORT PERIOD A | CONFIGURATION | | NORMAL |
| | | EVALUATION ON INATTENTIVE WATCHING R | FORWARD ROAD ON WHICH VEHICLE IS DRIVEN | LONG PERIOD B | CONFIGURATION | | LOW |
| STOPPING AT INTERSECTION (BEFORE MAKING RIGHT TURN) | ROAD POSITION (IN FRONT OF INTERSECTION (+RIGHT TURN LANE)) + SPEED (STOPPING) + RIGHT TURN BLINKING | EVALUATION ON FORWARD VISUAL CONFIRMATION Q | FORWARD ROAD ON WHICH VEHICLE IS DRIVEN | SHORT PERIOD C | CONFIGURATION + AREA | | LOW |
| | | EVALUATION ON VISUAL CONFIRMATION ON TRAFFIC SIGNAL T | TRAFFIC SIGNAL | SHORT PERIOD C | CONFIGURATION + AREA | | LOW |
| | | EVALUATION ON VISUAL CONFIRMATION FOR RIGHT TURN U | RIGHT SIDE AREA TO BE WATCHED FOR VISUAL CONFIRMATION | SHORT PERIOD C | CONFIGURATION + AREA | | LOW |
| GOING TO CHANGE LANE (TO RIGHT) | ROAD SHAPE (STRAIGHT ROAD) + STEERING (STRAIGHT) + BLINKING (RIGHT TURN) | EVALUATION ON FORWARD VISUAL CONFIRMATION P | FORWARD ROAD ON WHICH VEHICLE IS DRIVEN | SHORT PERIOD A | CONFIGURATION | | SLIGHTLY LOW |
| | | EVALUATION ON BACKWARD VISUAL CONFIRMATION W | REAR-VIEW MIRROR | SHORT PERIOD A | CONFIGURATION | | SLIGHTLY LOW |
| | | EVALUATION ON BACKWARD/SIDEWARD VISUAL CONFIRMATION X | RIGHT SIDE MIRROR | SHORT PERIOD A | CONFIGURATION + AREA | | LOW |
| GOING TO MOVE BACKWARD | ROAD SHAPE (THERE IS ROAD OR SPACE AT THE BACK) + GEAR STICK POSITION (IMMEDIATELY AFTER SHIFTED TO REVERSE POSITION) + SPEED (STOPPING) | EVALUATION ON BACKWARD VISUAL CONFIRMATION Y | REAR-VIEW MIRROR | SHORT PERIOD C | CONFIGURATION + AREA | | LOW |

FIG. 30

| PATTERN NO. | FOR USE IN ATTENTIVE WATCHING STATE EVALUATION | | FOR USE IN CALCULATING LINE-OF-SIGHT DATA CONFIGURATION | | PRIORITY LEVEL | SECOND CONFIDENCE LEVEL THRESHOLD |
|---|---|---|---|---|---|---|
| | LINE-OF-SIGHT DATA OF TYPE A | LINE-OF-SIGHT DATA OF TYPE B | LINE-OF-SIGHT DATA OF TYPE A' | LINE-OF-SIGHT DATA OF TYPE B' | | |
| 1 | RIGHT-EYE LINE-OF-SIGHT DATA AND LEFT-EYE LINE-OF-SIGHT DATA ARE BOTH VALID AND NOT OF SACCADE | RIGHT-EYE LINE-OF-SIGHT DATA AND LEFT-EYE LINE-OF-SIGHT DATA ARE BOTH VALID | RIGHT-EYE LINE-OF-SIGHT DATA AND LEFT-EYE LINE-OF-SIGHT DATA ARE BOTH VALID AND NOT OF SACCADE | ANY TYPE | 1 | 0.1 |
| 2 | BOTH-EYE LINE-OF-SIGHT DATA IS VALID AND NOT OF SACCADE | BOTH-EYE LINE-OF-SIGHT DATA IS VALID | BOTH-EYE LINE-OF-SIGHT DATA IS VALID AND NOT OF SACCADE | ANY TYPE | 2 | 0.12 |
| 3 | BOTH-EYE LINE-OF-SIGHT DATA IS VALID | ANY TYPE | BOTH-EYE LINE-OF-SIGHT DATA IS VALID | ANY TYPE | 3 | 0.14 |

DRIVING SUPPORT APPARATUS, DRIVING SUPPORT METHOD, AND COMPUTER-READABLE RECORDING MEDIUM STORING DRIVING SUPPORT PROGRAM

CROSS-REFERENCE TO RELATED APPLICATIONS

This application is based upon and claims the benefit of priority of the prior Japanese Patent Applications No. 2013-248352, filed on Nov. 29, 2013 and No. 2014-131728 filed on Jun. 26, 2014, the entire contents of which are incorporated herein by reference.

FIELD

The embodiments discussed herein are related to a driving support apparatus, a driving support method, and a computer-readable recording medium storing a driving support program.

BACKGROUND

A vehicle warning system has been proposed, in which a detection error is given by a difference between a direction of an object detected by a direction-of-object detection circuit or the like and a direction of line of sight detected by a line-of-sight direction detection apparatus. In this system, the degree of coincidence is calculated based on a relationship between the detection error of the line-of-sight direction detection apparatus and the occurrence frequency of the error, and a warning mode is determined based on the calculated degree of coincidence.

A method of analyzing data of an attentive watching direction of a driver has been proposed. In this method, based on an evaluation criterion defining a location of interest of a driver, an instance of the attentive watching direction is classified as either an inside of the location or an outside of the location.

An inattentive driving detection apparatus has been proposed. In this apparatus, a direction of the line of sight of a driver is detected by a line-of-sight detection sensor using an infrared difference image or the like, and a stationary point and a stationary time are measured. In this apparatus, a driver's line-of-sight position on a rear-view mirror, a side-view mirror, or the like is estimated from the detected line-of-sight data, and the number of times the rear-view mirror or the side-view mirror is looked at for confirmation is counted. In inattentive driving, the number of times the confirmation is performed decreases compared with the normal driving. Thus, the number of times the confirmation is performed is compared with a predetermined threshold value to determine whether inattentive driving is being performed or not, and a warning is issued depending on the determination. The threshold value used in the determination is changed depending on the presence of a vehicle ahead or a driving environment, that is, the threshold value used in the determination is changed properly depending on the driving road.

Descriptions of related techniques may be found, for example, in Japanese Laid-open Patent Publication No. 2010-170189, Japanese National Publication of International Patent Application No. 2009-540459, and Japanese Laid-open Patent Publication No. 08-178712.

SUMMARY

According to an aspect of the invention, a driving support apparatus includes a line-of-data judgment unit configured to judge a type of line-of-sight data indicating a direction of the line of sight of a driver; an estimation unit configured to perform an estimate of an attentive watching state of the driver on a target area to be attentively watched, the estimation being performed based on the target area to be attentively watched being set depending on a driving situation based on vehicle state information indicating a vehicle state and surrounding state information indicating a state surrounding the vehicle, and a direction of the line of sight indicated by a plurality of pieces of line-of-sight data acquired in a judgment time determined depending on the driving situation; and a confidence level calculation unit configured to perform a calculation for a confidence level of an estimation result of the attentive watching state, the calculation being performed based on at least one of setting accuracy of the target area to be attentively watched, and a configuration state of line-of-sight data associated with each type of the plurality of pieces of line-of-sight data acquired in the judgment time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating a maximum judgment time;

FIG. 7 is a diagram illustrating examples of driving situations and various kinds of setting information;

FIG. 30 is a table illustrating an example of classification of line-of-sight data for each of various patterns;

DESCRIPTION OF EMBODIMENTS

Figure 1:
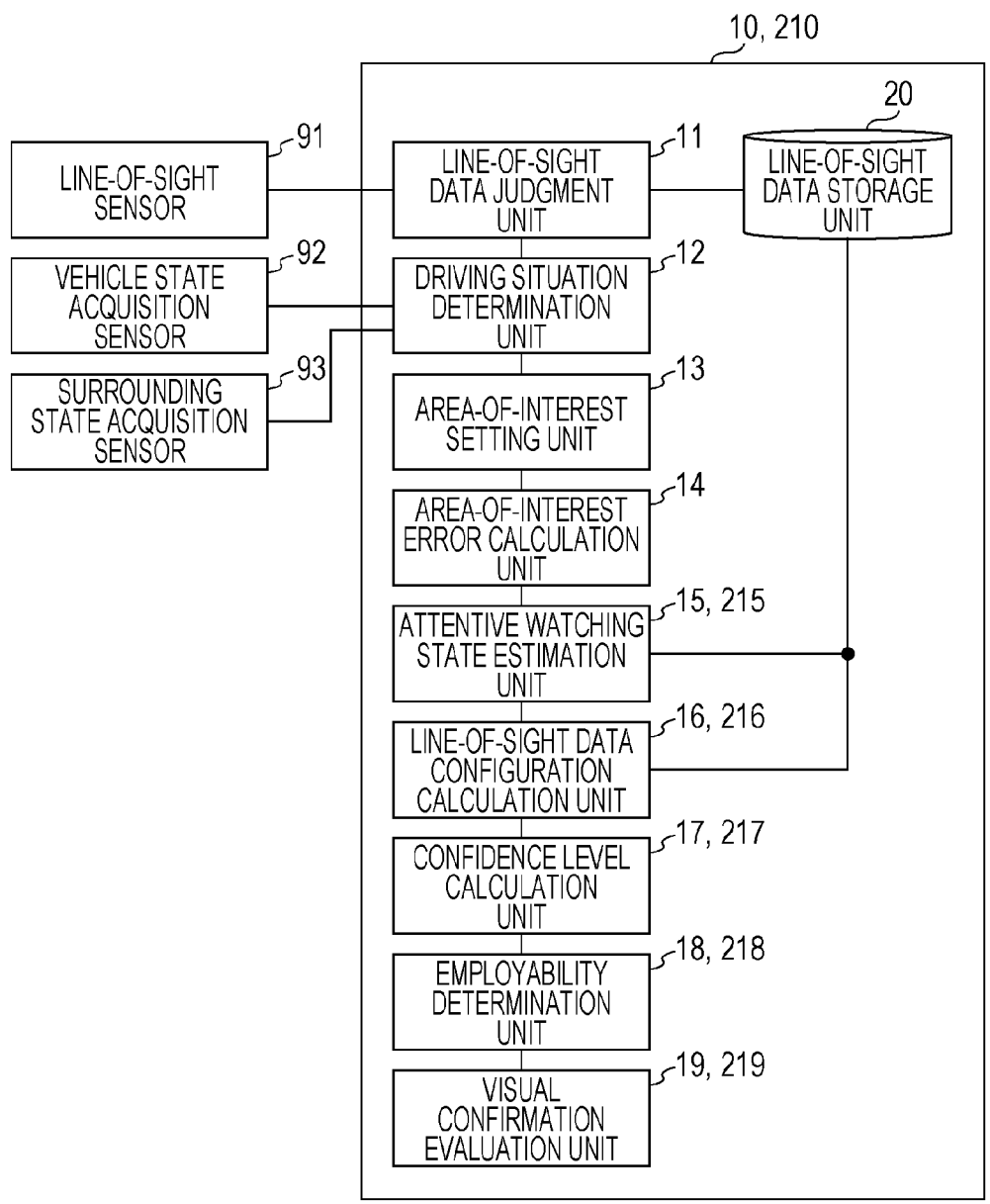
FIG. 1 is a block diagram illustrating a configuration of a driving support apparatus according to a first embodiment and a second embodiment.

The performance of the line of sight detection using the line-of-sight sensor may vary depending on the road environment, and thus there is a possibility that the line-of-sight sensor fails to detect the line of sight of a driver. In such a situation, the line-of-sight sensor may output an invalid value from time to time. In a case where it is assumed that the value of an error depends on an angle of the line of sight as with the vehicle warning system according to the known technique such as that described in the background, when an invalid value is output from the line-of-sight sensor, it is difficult to handle the output invalid value. In particular, in practical environments in which vehicles are driven, the line-of-sight detection performance is often degraded by external light, a vibration, or other degradation in environment, which may cause an invalid value to occur frequently. Therefore, in a case where it is difficult to handle occurrences of invalid values, degradation occurs in the performance of evaluation of the state of visual confirmation using the output value of the line-of-sight sensor.

In the method of analyzing the data of the attentive watching direction according to the related technique, the analysis is mainly based on a result of classifying the line of sight according to methods of ISO15007-2 and SAEJ-2396. In this method, using line-of-sight data (glance) clustered in units of locations of interest, the viewing time and the like is analyzed for each location of interest. However, in a case where clustered data of the attentive watching direction includes many pieces of data indicating saccade or in a case where there is little valid data usable in evaluating the state of visual confirmation, a reduction in performance of evaluating the state of visual confirmation occurs.

In the method of analyzing the data of the attentive watching direction according to the known technique, a place of interest to be visually confirmed by a driver is defined and judgment is performed as to whether the defined place of interest is looked at for visual confirmation or not. However, a setting error of the place of interest is not taken into account. In particular, in a case where an area that is not fixed to a vehicle is set as a place of interest, the place of interest is greatly varied depending on the environment surrounding the vehicle and/or the driving state, and thus it is very difficult to strictly define the place of interest.

Furthermore, in the inattentive driving detection apparatus according to the known technique, the number of times the rear-view mirror or the right or left side-view mirror is looked at for confirmation is estimated from the number of pieces of line-of-sight data whose direction intersects areas of the respective mirrors, and the inattentive state of the driver is estimated from the result. The area of each mirror is defined such that many pieces of line-of-sight data is collected over many days, and the standard position and shape of each mirror are statistically estimated from the collected line-of-sight data. That is, it is assumed that no change occurs in relative position between the driver and each part that is fixed to the vehicle. However, practically, the driver may change his/her posture depending on the driving situation, which may cause an error to occur in relative position between each mirror area and the driver. However, this error is not taken into account in the inattentive driving detection apparatus according to the known technique.

In an aspect of the technique disclosed herein, a determination is performed as to the confidence level for a result of estimation on attentive watching state on an area of interest to be attentively watched.

Examples of embodiments are described in detail below with reference to drawings.

First Embodiment

FIG. 1 illustrates a driving support apparatus 10 according to a first embodiment. The driving support apparatus 10 makes an evaluation, based on a direction of the line of sight of a driver of a vehicle, as to whether the driver makes an adequate behavior to visually confirm a safety depending on a driving situation, and the driving support apparatus 10 outputs a resultant evaluation result. In the following description, it is assumed by way of example that the driving support apparatus 10 according to the present embodiment is installed in a vehicle.

As illustrated in FIG. 1, data acquired by each of a line-of-sight sensor 91, a vehicle state acquisition sensor 92, and a surrounding state acquisition sensor 93 is input to the driving support apparatus 10.

The line-of-sight sensor 91 acquires line-of-sight data representing a direction of the line of sight of a driver by using a known method. For example, the line-of-sight sensor 91 may be achieved using a sensor including a camera, a lighting apparatus, and a microcomputer. With the line-of-sight sensor 91 of this type, a user's face is illuminated with light emitted from the lighting apparatus such that an area including driver's eyes is illuminated, and the camera takes an image of the user's face. The microcomputer then estimates the direction of the line of sight of the driver from driver's pupil reflex in the image captured by the camera, and acquires line-of-sight data representing the estimated direction of the line of sight. Alternatively, the direction of the line of sight of the driver may be estimated based on the orientation of the face or the head of the driver in the captured image. For example, the line-of-sight data may take values corresponding to angles or coordinate values indicating the estimated direction of the line of sight.

The line-of-sight data acquired by the line-of-sight sensor 91 may include two pieces of line-of-sight data respectively representing direction of the line of sights of right and left eyes or one piece of line-of-sight data derived from the two pieces of line-of-sight data associated with the right and left eyes. An arbitrary value derived from the two pieces of line-of-sight data respectively representing direction of the line of sights of right and left eyes may be used, and more specifically, for example, the average value of the two pieces of line-of-sight data may be used as the one piece of line-of-sight data. Alternatively, the number of pieces of line-of-sight data may be varied depending on the situation, for example, such that basically, two pieces of line-of-sight data respectively representing direction of the line of sights of right and left eyes are acquired in a normal situation, but in a case where because of external light, a vibration, an influence of glasses, or the like, it is allowed to estimate the direction of the line of sight only for one of two eyes, the only one piece of direction of the line of sight is acquired.

The vehicle state acquisition sensor 92 acquires vehicle state information associated with the vehicle in which the vehicle state acquisition sensor 92 is installed, in terms of a current position of the vehicle, a speed, an acceleration, a yaw rate, a steering state, a blinker state, an acceleration/deceleration operation state, and/or the like. The vehicle state acquisition sensor 92 includes various kinds of sensors such as a position sensor, a speed sensor, an acceleration sensor, a gyroscope sensor, and/or the like. The information of the acceleration/deceleration operation state may be information indicating whether a brake or an accelerator is operated and indicating the amount of operation thereof, and may include further information associated with the acceleration/deceleration, such as information indicating a driving mode controlled with a gearshift or a gear lever. The vehicle state information may include further information about general vehicle driving states such as illumination control information, wiper operation information, and/or the like. Note that it is sufficient when the vehicle state acquisition sensor 92 includes a sensor configured to acquire information based on which to classify the vehicle driving state into driving situations described later.

The surrounding state acquisition sensor 93 acquires vehicle surrounding state information such as information indicating whether an object exits in a vehicle surrounding area, a position of the object, a shape of a road on which the vehicle is travelling, a road type, and/or the like. The surrounding state acquisition sensor 93 may be realized using, for example, a laser radar, a millimeter-wave radar, a camera, or the like. The surrounding state acquisition sensor 93 may include a microcomputer that analyzes an output value given by the laser radar, the millimeter-wave radar, the camera, or the like. The surrounding object may be an arbitrary stationary object or moving object. Examples of arbitrary stationary objects include a building, a roadside object, a road marking object, a vehicle at rest, a dropping obstacle, and the like. Examples of moving objects include a moving vehicle, a pedestrian, a bicycle, rain/snow, a movable obstacle, and the like. The shape of the road on which the vehicle travels may include an approximate road width, a curvature of a curved road, a slope of a road, as well as the detailed actual shape of the road. The road types may represent a road type such as an express way, a national road, or the like, the number of lanes, a road part type such as a tunnel, a railroad crossing, an intersection, or the like, a road danger class indicating whether the road is dangerous or not, information indicating whether the road is paved or not.

Note that in acquiring data by sensors, data may be acquired individually by each of sensors such as the line-of-sight sensor 91, sensors included in the vehicle state acquisition sensor 92 and sensors included in the surrounding state acquisition sensor 93 or data may be acquired via a communication such as a road-to-vehicle communication, an inter-vehicle communication, or the like. Alternatively, data may be acquired using data obtained though sensors and data stored in a database. For example, the surrounding state acquisition sensor 93 may be configured to acquire vehicle surrounding state information based on map data and a position of the vehicle measured by a global positioning system (GPS).

The driving support apparatus 10 includes, functionally, as illustrated in FIG. 1, a line-of-data judgment unit 11, a driving situation determination unit 12, an area-of-interest setting unit 13, an area-of-interest error calculation unit 14, an attentive watching state estimation unit 15, a line-of-sight data configuration calculation unit 16, and a confidence level calculation unit 17. The driving support apparatus 10 further includes an employability determination unit 18, and a visual confirmation evaluation unit 19. Note that the driving situation determination unit 12, the area-of-interest setting unit 13, and the attentive watching state estimation unit 15 are examples of estimation units according to the technique disclosed herein. The area-of-interest error calculation unit 14 is an example of an error calculation unit according to the technique disclosed herein. The line-of-sight data configuration calculation unit 16 is an example of a configuration state calculation unit according to the technique disclosed herein. The employability determination unit 18 and the visual confirmation evaluation unit 19 are examples of evaluation units according to the technique disclosed herein.

The line-of-data judgment unit 11 acquires the line-of-sight data output from the line-of-sight sensor 91 and determines the type of the acquired line-of-sight data. The line-of-data judgment unit 11 stores the acquired line-of-sight data together with a judgment result in the line-of-data storage unit 20. In the present example, the type of the line-of-sight data is represented depending on the validity of the line-of-sight data, the type of the line of sight represented by the line-of-sight data, and whether interpolation is performed or not.

The validity of the line-of-sight data indicates whether the line-of-sight data acquired from the line-of-sight sensor 91 is accurate enough to use in estimating the driver's attentive watching state described below. In a case where the accuracy is high enough, the validity indicates that the line-of-sight data is "valid", but otherwise the validity indicates that the line-of-sight data is "invalid". More specifically, for example, when the line-of-sight data has a value within a predetermined range, the line-of-data judgment unit 11 determines that the line-of-sight data is valid. On the other hand, in a case where the value of the line-of-sight data is not within the predetermined range (for example, in a case where the value is "0"), the line-of-data judgment unit 11 determines that the line-of-sight data is invalid. In a case where the line-of-sight sensor 91 outputs data indicating the acquisition accuracy of the line-of-sight data together with the line-of-sight data, the line-of-data judgment unit 11 may make the determination such that when the acquisition accuracy of the line-of-sight sensor 91 is higher than a predetermined threshold value, the line-of-sight sensor is valid but when the acquisition accuracy is lower than the predetermined threshold value, the line-of-sight sensor is invalid.

Figure 2:
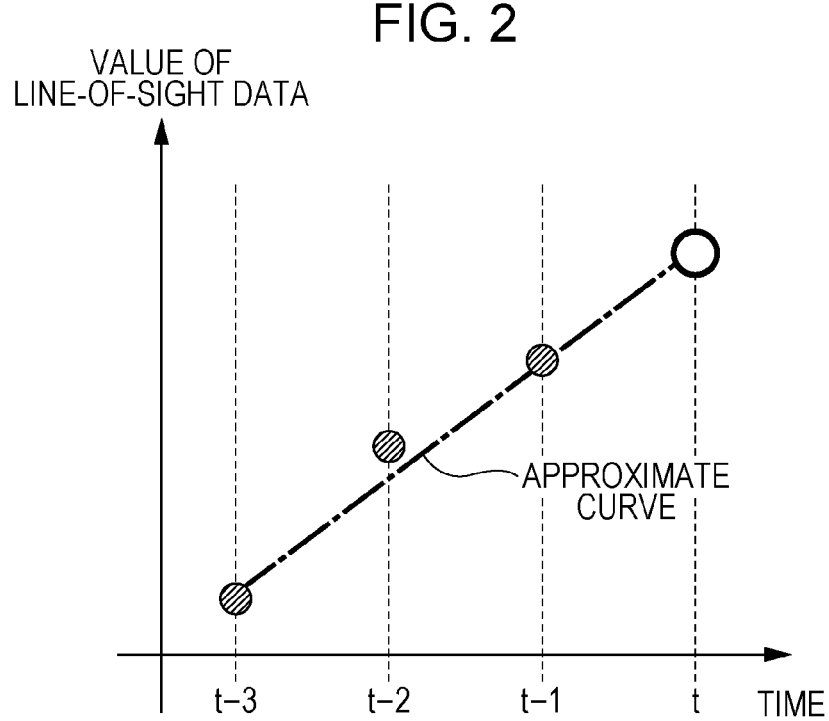
FIG. 2 is a diagram illustrating real-time interpolation of line-of-sight data.

When the line-of-sight data has an invalid value, the line-of-data judgment unit 11 performs interpolation on the invalid line-of sight data using valid line-of-sight data acquired at a different time. In the interpolation, the line-of-data judgment unit 11 may assume that the past tendency of the line-of-sight data is still continuing, and the line-of-data judgment unit 11 may perform linear or non-linear interpolation under the above assumption. FIG. 2 illustrates an example in which a real-time interpolation is performed when line-of-sight data acquired at a current time t is invalid. In the example illustrated in FIG. 2, an approximate curve is determined from three valid values of line-of-sight data respectively acquired at past times t−1, t−2, and t−3, and a value of line-of-sight data at a current time t is determined by interpolation on the approximate curve.

Figure 3:
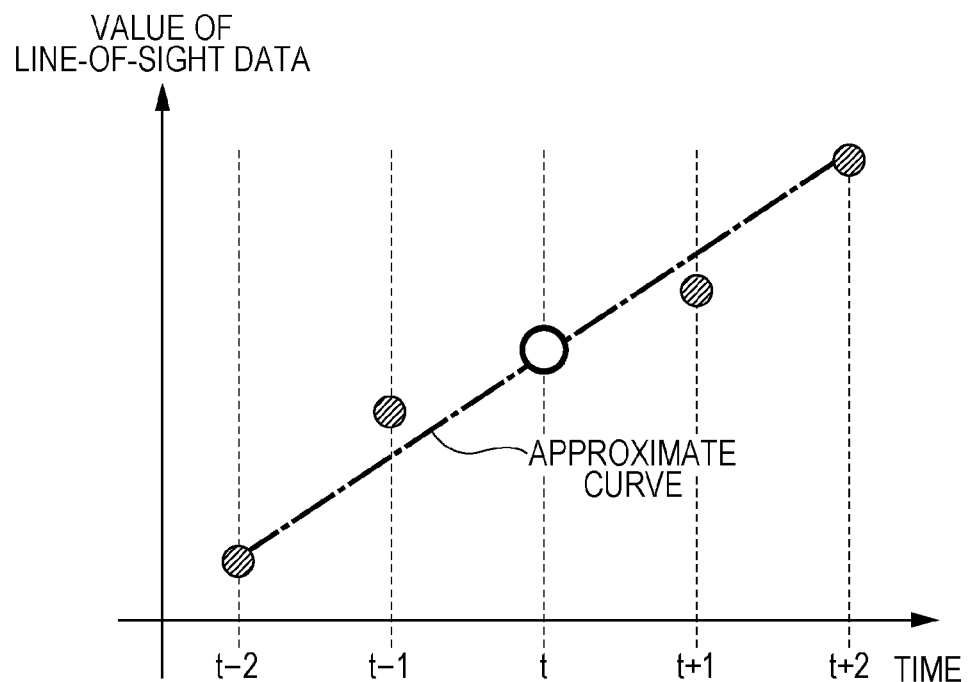
FIG. 3 is a diagram illustrating non-real-time interpolation of line-of-sight data.

In a case where it does not have to estimate the attentive watching state in real time, it does not have to perform in real time the interpolation of line-of-sight data for correcting invalid data. In this case, line-of-sight data acquired at time t to be subjected to processing may be interpolated by using line-of-sight data acquired at a time after the time t to be subjected to processing. FIG. 3 illustrates an example in which interpolation is performed in non-real time. In the example illustrated in FIG. 3, an approximate curve is determined from a total of four values including values of line-of-sight data acquired at times (t−1 and t−2) before time t of interest and values of line-of-sight data acquired at times (t+1 and t+2) after time t of interest. A value on the resultant approximate curve interpolates a value of line-of-sight data at time t of interest.

In the following description, for simplicity, it is assumed that the processing is performed in real time, that is, the current time is equal to the time of interest, that is, the time at which the processing is performed. Note that the technique disclosed herein may be applied to the case where the processing is performed in non-real time as described above. In the case where the interpolation processing is performed in non-real time, a delay occurs in the interpolation processing to wait for line-of-sight data used in the interpolation to be acquired at a future time. In the example illustrated in FIG. 3, the interpolation process to obtain the value of the line-of-sight data at the time t of interest is not performed until time t+2, and thus a delay corresponding to two time ticks occurs. Thus, in a case where the process described below is applied to the non-real-time processing, "line-of-sight data at current time t" is read as line-of-sight data acquired at a past time t a particular period of time before the current time and interpolated at current time. That is, in the example illustrated in FIG. 3, instead of the actual current time (t+2), the time t, which is a past time when the time (t+2) is a current time, is regarded as the current time t for the descriptive purpose.

In the examples illustrated in FIG. 2 and FIG. 3, an approximate linear line is determined from valid values of line-of-sight data in each case, and the resultant linear line is employed as the approximate curve. Note that the approximate curve is not limited to the approximate liner line, but an arbitrary approximate curve may be used. Furthermore, the method of the interpolation is not limited to that using the approximate curve, but an arbitrary interpolation method may be used. Furthermore, the interpolation is not limited to such a case where one invalid value of line-of-sight data at a time is interpolated, but the interpolation may be performed simultaneously on a plurality of invalid values of line-of-sight data. Furthermore, the interpolation is not limited to a case where a fixed number of values of line-of-sight data obtained at past times or future times are used for interpolation.

The line-of-data judgment unit 11 adds a label to the line-of-sight data whose value is obtained by interpolation to indicate that the value is obtained by the interpolation, and the line-of-data judgment unit 11 changes the validity to "valid". In a case where there is no valid line-of-sight data within a predetermined period of time before or after the current time t, the line-of-data judgment unit 11 may not perform the interpolation and may maintain the validity of the line-of-sight data as being "invalid". However, in a case where there are too many pieces of invalid line-of-sight data, there is a possibility that it becomes difficult to estimate the attentive watching state and make an evaluation on the visually confirming state described below. Therefore, the determination as to whether to perform the interpolation may be made taking into the account the accuracy of the interpolation.

Figures 4, 5:
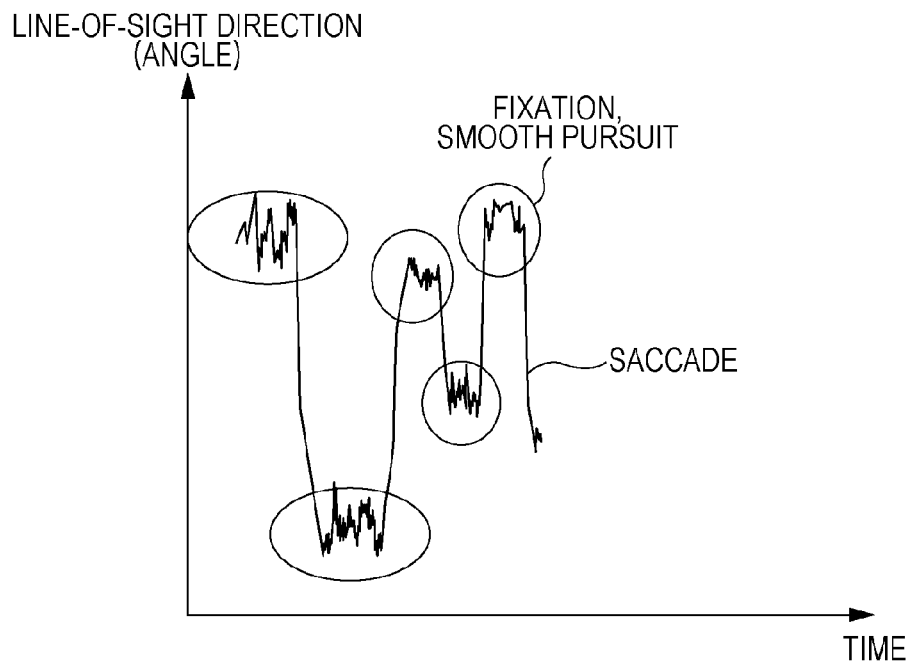
FIG. 4 is a diagram illustrating types of lines of sight.
FIG. 5 is a diagram illustrating examples of line-of-sight data stored in a line-of-data storage unit.

The line-of-sight data judgment unit 11 determines the type of the line of sight for each piece of line-of-sight data based on a change in a value of line-of-sight data in a predetermined period of time, and the line-of-sight data judgment unit 11 applies a label indicating the determined type of the line of sight to each piece of line-of-sight data. As illustrated in FIG. 4, when no large change in direction of the line of sight is observed in an area (such as those in circles in FIG. 4), the type of the line of sight according to the area represents "Fixation" in which the movement of the line of sight is limited to around a target or "SmoothPursuit" in which the movement of the line of sight moves at a slow speed following a target. When a large and rapid change in direction of the line of sight occurs in an area, the type of the line of sight according to the area represents "Saccade" in which the line of sight moves quickly to follow a target. The line-of-data judgment unit 11 classifies each piece of valid line-of-sight data into the fixation type, the smooth pursuit type, or the saccade type, and the line-of-data judgment unit 11 applies a label indicating the determined line-of-sight type. For invalid line-of-sight data, the classification of the line of sight data is not performed. Note that the types the line-of-sight data are not limited to those described above, but the line-of-sight data may be classified into other types. However, it is desirable that the line-of-sight data is classified at least into the saccade type and the other types. The saccade type is generally treated as line-of-sight data that is excluded from being judged as to whether it is used in the estimation on attentive watching state or the estimation on the visually confirming state, and thus it is desirable to record information as a type of the line-of-sight.

The line-of-data judgment unit 11 stores the acquired line-of-sight data and the line-of-sight data with the interpolated value in relation to an acquisition time and the type of the line-of-sight data in the line-of-data storage unit 20. As described above, the type of the line-of-sight data includes information indicating the validity of the line-of-sight data, the type of the line of sight, and whether interpolation is performed or not. FIG. 5 illustrates examples of some pieces of line-of-sight data stored in the line-of-data storage unit 20.

The line-of-data storage unit 20 is configured to have a storage size that allows the line-of-data storage unit 20 it to store a plurality of pieces of line-of-sight data acquired in a judgment time in estimating the attentive watching state described below. More specifically, the storage size of the line-of-data storage unit 20 is determined so as to allow as many pieces of line-of-sight data as a storing number N satisfying equation (1) described below.

$$N \geq \text{(maximum judgment time)}/\text{(acquisition time intervals of line-of-sight data)} \quad (1)$$

where the maximum judgment time is the maximum value among a plurality of judgment times varying depending on the subject of evaluation (described later) as illustrated in FIG. 6.

The driving situation determination unit 12 acquires the vehicle state information output from the vehicle state acquisition sensor 92 and the surrounding state information output from the surrounding state acquisition sensor 93. The driving situation determination unit 12 determines the current driving situation of the vehicle based on the acquired vehicle state information and the surrounding state information. Examples of driving situations include "driving straight on express way", "driving along a curved road", "driving along a congested road (straight)", "stopping at an intersection (before making a right turn)", "going to change a lane (to right)", "going to drive backward", and the like, which are predefined driving situations in which a driver is supposed to make a visually confirming behavior. The driving situations are not limited to those described above, and the driving situations may include other situations such as "stopping at an intersection (before making a left turn)", "going to change a lane (to left)", and the like.

The driving situation determination unit 12 checks whether the acquired vehicle state information and the acquired surrounding state information satisfy one of conditions predetermined for the respective driving situations, for example, such as those described in a column "method of estimating the driving situation" in FIG. 7 and estimates the likelihood of the current driving situation being in each driving situation. For example, the driving situation determination unit 12 acquires the steering angle of the vehicle as the vehicle state information, and acquires the road type and the road shape as the surrounding state information. Depending on whether the acquired steering angle is within a predetermined range indicating the "driving straight", whether the road type is the express way, and whether the road shape is "straight road", the driving situation determination unit 12 calculates the likelihood that the current driving situation is "driving straight on an express way". The driving situation determination unit 12 employs, as the current driving situation, a driving situation that gets a highest likelihood in the calculation described above.

Furthermore, the driving situation determination unit 12 determines the subject of evaluation depending on the determined driving situation. The subject of evaluation is determined in advance according to a proper visually confirming behavior of the driver depending on the driving situation, as illustrated, for example, in FIG. 7. In the example illustrated in FIG. 7, in a case where the driving situation is, for example, driving forward or stopping in the course of driving, the evaluation on forward visual confirmation is specified to evaluate whether the forward road is correctly looked at while driving (without looking aside). The driving situations corresponding to driving forward and stopping in the course of driving include, in the example illustrated in FIG. 7, "driving straight on an express way", "driving along a curved road", "driving along a congested road (straight)", "stopping at an intersection (before making a right turn)", and "going to change a lane (to right)". When the forward visual confirmation is evaluated, details of the subject of evaluation thereof may vary depending on the driving situation, and thus a suffix such as P, P', Q, and Q' following the "forward visual confirmation" is used to indicate such a difference in the details of the subject of evaluation. More specifically, for example, the evaluation on forward visual confirmation P and the evaluation on forward visual confirmation P' are both associated with the evaluation on forward visual confirmation in the driving along a straight road, and the evaluation on forward visual confirmation P and the evaluation on forward visual confirmation P' are similar in the content except that a confidence level threshold value used by the employability determination unit 18 (described below) is slightly lower for the evaluation on forward visual confirmation P' than for the evaluation on forward visual confirmation P. The evaluation on forward visual confirmation Q and evaluation on forward visual confirmation Q' are evaluations as to the forward visual confirmation on roads other than straight roads, such as curved roads or as to the forward visual confirmation before making a right or left turn at a crossing at which the vehicle is driven so as to substantially curve. The confidence level threshold values for the evaluation on forward visual confirmation Q and evaluation on forward visual confirmation Q' are different from those in the evaluation on forward visual confirmation P and the evaluation on forward visual confirmation P' for straight roads. The evaluation on forward visual confirmation Q and the evaluation on forward visual confirmation Q' are similar in the content. However, the evaluation on forward visual confirmation Q' is the evaluation in a situation in which the vehicle is not moving but is at rest, and thus a less visual confirmation rate is allowed without causing a significant danger, and thus there is a slight difference in the judgment threshold value used by the visual confirmation evaluation unit 19 described below between the evaluation on forward visual confirmation Q and the evaluation on forward visual confirmation Q'.

In the "driving along a congested road", there is a possibility that inattentive driving occurs due to irritation or a reduction in intension caused by monotonous driving at a low speed, and thus it is specified to perform, in addition to the evaluation on forward visual confirmation P', the evaluation on inattentive watching R to check whether the driver is in an inattentive watching state. In other driving situations in which there is a high probability that inattentive driving occurs, the evaluation on inattentive watching R may be added to the subject of evaluation. Basically, in driving situations in which the visual confirmation is performed in a direction other than the forward direction, such as a backward direction, a visual confirmation on a traffic signal, visual confirmation on the right side before making a right turn, visual confirmation in a side direction, inattentive driving directly results in a reduction in the evaluation result, and thus a significant benefit may not be obtained by further and separately performing the evaluation on inattentive watching.

In the "stopping at an intersection (before making a right turn)", it is specified to perform, as the evaluation on the visually confirming behavior of the driver before making a right turn, the evaluation on visually confirming a traffic signal T as to whether a signal is visually confirmed and evaluation on visual confirmation in making right turn U, that is, the evaluation on visually confirming safety on a pedestrian crossing at an intersection, an oncoming vehicle, a the like in making the right turn, in addition to the evaluation on forward visual confirmation Q'. In the example illustrated in FIG. 7, for simplicity of illustration, evaluations are unified into a single evaluation on visual confirmation in making right turn U. However, a plurality of items of evaluation on the visual confirmation may be defined, for example, they may include evaluation on the visual confirmation of an intersection, evaluation on the visual confirmation of an oncoming vehicle, and/or the like.

In "going to change a lane (to right)", as the confirmation on the visually confirming behavior of the driver before changing to the right-hand lane, it is specified to perform a backward visual confirmation W as to whether a backward direction is visually confirmed or not and evaluation on visual confirmation in back side direction X as to whether the back side direction is visually confirmed or not, in addition to the evaluation on forward visual confirmation P'. As for the evaluation on forward visual confirmation, the evaluation on forward visual confirmation P' is specified as in the driving along a congested road (not stopping) in which a plurality of visually confirming behaviors are supposed to be performed on a straight road.

In "going to drive backward", it is specified to perform a backward visual confirmation Y as to whether the backward direction is visually confirmed or not. To distinguish from the backward visual confirmation W that is the subject of evaluation performed in "going to change a lane (to right)", the backward visual confirmation herein has different suffix Y because there is a some difference in area of interest as described below.

As illustrated in FIG. 7, an area of interest on which the driver is supposed to make visually confirmation is defined depending on the subject of evaluation. In a case where the subject of evaluation is "evaluation on forward visual confirmation P, P', Q, or Q'" or "evaluation on inattentive watching R", it is specified to set the area of interest in an area on a forward road. In a case where the subject of evaluation is "evaluation on visually confirming a traffic signal T", it is specified to set the area of interest at a location of a traffic signal. In a case where the subject of evaluation is "evaluation on visual confirmation in making right turn U", it is specified to set the area of interest in the right-side visual confirmation area. In a case where the subject of evaluation is "backward visual confirmation W or Y", it is specified to set the area of interest on a rear-view mirror. In a case where the subject of evaluation is "evaluation on visual confirmation in back side direction X", it is specified to set the area of interest on a right side-view mirror.

In the example described above, one area of interest is defined for each subject of evaluation. Alternatively, a plurality of areas of interest may be defined for one subject of evaluation. For example, as for visually conforming areas when making a right turn, an intersection area, an oncoming vehicle area, and/or the like may be specified.

Furthermore, as illustrated in FIG. 7, a judgment time is set depending on the subject of evaluation. Using line-of-sight data acquired within the judgment time, the estimation of the attentive watching state and calculation of the confidence level are performed once every judgment time. When one judgment time has elapsed and thus the process in the one judgment time is completed, in case a where the same driving situation to be evaluated is still continuing, the every-judgment-time process is performed in a next judgment time. That is, in each driving situation, not only the every-judgment-time process is performed but also the evaluation is performed based on a change with elapse of time in an estimation result on the attentive watching state and confidence level in each judgment time.

The driving situation determination unit 12 detects a change in the driving situation based on the vehicle state information and the surrounding state information, and determines the driving situation and the subject of evaluation in the above-described manner each time a change occurs in the driving situation. In a case where the vehicle state information and the surrounding state information do not correspond to any one of the predefined driving situations such as those illustrated in FIG. 7, the driving situation determination unit 12 determines that no corresponding driving situation is defined.

The area-of-interest setting unit 13 sets the area of interest depending on the driving situation and the subject of evaluation determined by the driving situation determination unit 12. More specifically, the area-of-interest setting unit 13 sets the area of interest in an area specified depending on the subject of evaluation, for example, as illustrated in FIG. 7 such that the shape and the location of the area of interest are determined depending on the vehicle state information and the surrounding state information.

The area of interest is a simulated shape of an area or an object to be detected in terms of status of visual confirmation, and the area of interest may be defined two-dimensionally or three-dimensionally. The area of interest may have a fixed shape. Alternatively, at least either the shape or the location of the area of interest may be varied depending on fundamental information including the driving situation, the vehicle apparatus, the size and the location of the in-vehicle device, and the like. By changing at least one of the position and the shape of the area of interest depending on the situation, it may be possible to increase the accuracy in the estimation of the attentive watching state and the evaluation on the visual confirmation.

The shape of the area of interest may be, for example, a rectangle, an ellipse, a quadrangular pyramid, an elliptic cone, or the like, although the shape is not limited to the examples described above. The shape of the area of interest may be three-dimensional or two-dimensional as described above, and the shape of the area of interest may be a combination of different shapes. In a case where a shape is known for an actual target object on which a visual confirmation state is to be detected (for example, the target object is a side-view mirror, a rear-view mirror, or the like), the shape of the target object as currently seen from the driver may be directly used as the shape of the area of interest. In a case where the area of interest is set to have a simple shape such as a rectangle, an ellipse, a quadrangular pyramid, an elliptic cone, or the like, it becomes easy for the attentive watching state estimation unit 15 (described later) to calculate an intension (an intersection) between the area of interest and the direction of the line of sight. On the other hand, in a case where the shape of the target object is directly employed as the shape of the area of interest as described above, it becomes possible to increase accuracy in the estimation of the attentive watching state and the evaluation on the visual confirmation.

By setting the area of interest to have a shape of a combination of a plurality of small arbitrary shapes, for example, a combination of small triangles or rectangles, it becomes possible to achieve both advantages described above.

Figure 8:
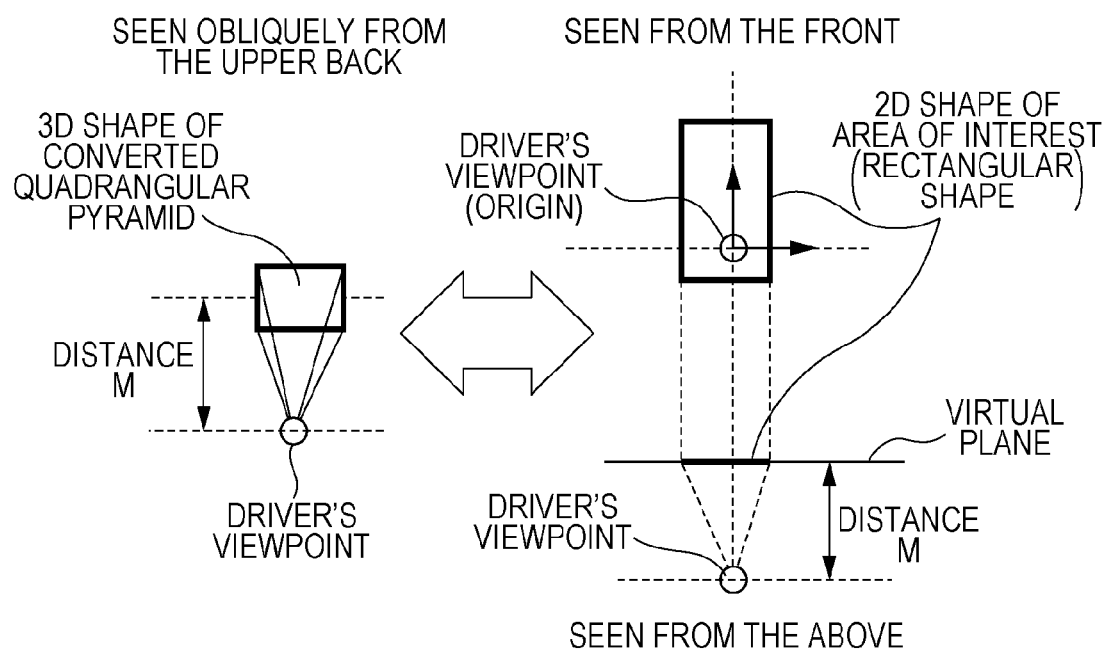
FIG. 8 is a diagram illustrating an example of a conversion between a two-dimensional shape set as an area of interest and a three-dimensional shape thereof.

FIG. 8 illustrates an example in which an area of interest is set in a virtual plane normal to the forward driving direction, and a two-dimensional shape (a rectangle) of the area of interest is converted into a three-dimensional shape (a quadrangular pyramid), or a three-dimensional shape (a quadrangular pyramid) is converted into a two-dimensional shape (a rectangle). To perform the conversion, it may be useful to specify in advance the distance M between the driver's point of view and the virtual plane in which the area of interest with the two-dimensional shape is set. Furthermore, in the defining of the rectangle, it may also be useful to define not only the size of the rectangle but the relative position from the driver's point of view.

In FIG. 8, a lower right part illustrates an example of a bird's-eye view of an area of interest (two-dimensional). In this example, the area of interest is defined in a virtual plane spaced apart by a distance M from the driver's point of view. More specifically, as may be seen from a front elevation view as seen from the driver's point of view (from back thereof), illustrated in an upper right area of FIG. 8, the two-dimensional rectangular shape may be defined in a coordinate system in which the location of the driver's point of view is taken at the origin for descriptive purposes. This makes it possible to get three-dimensional relative positions of the area of interest and the driver's point of view.

A left-hand part in FIG. 8 illustrates an example in which the two-dimensional shape of the area of interest illustrated in the bird's-eye view and the plan view on the right-hand side of FIG. 8 is converted into a three-dimensional shape. The left-hand part illustrates a state in which the area of interest is seen from a point in a slightly diagonal direction at a back side of a driver's point of view. In this example, the two-dimensional rectangular shape is converted into the three-dimensional quadrangular pyramid using the distance M from the driver's point of view to the rectangle. This conversion is possible by determining a cone in which the driver's point of view is at the vertex thereof and the bottom surface of the cone is defined by the two-dimensional shape set in the virtual plane. By placing a shape in a virtual plane taking into account the relative position to the driver's point of view as with the example of the two-dimensional shape illustrated in FIG. 8, it becomes possible to define the area of interest in a two-dimensional shape that is allowed to be easily defined and that is easy to intuitively understand, and then it is allowed to convert the two-dimensional shape into a three-dimensional shape as occasion calls. Note that the calculation of the intensity (intersection) between the area of interest and the direction of the line of sight, which will be described later, is possible for both cases in which the area of interest has a two-dimensional shape and the area of interest has a three-dimensional shape.

Figure 9:
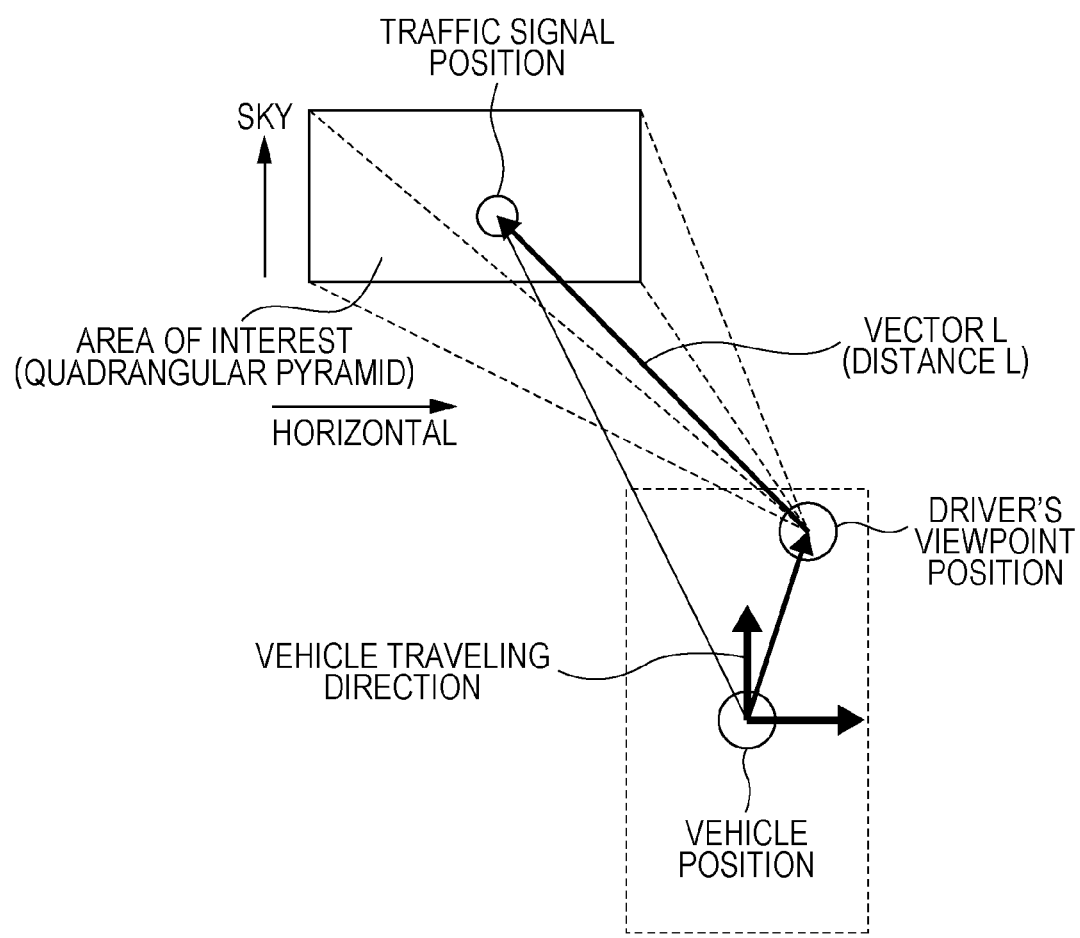
FIG. 9 is a diagram illustrating an example in which an area of interest is set at a position of a traffic signal.

Referring to FIG. 9, a further detailed explanation is given below for case in which the area of interest is set at a position of a traffic signal. This setting of the area of interest is used in the evaluation on visual confirmation of a traffic signal T illustrated in FIG. 7. The area-of-interest setting unit 13 detects a traffic signal position based on the surrounding state information. The traffic signal position may be detected from information acquired using a laser radar or the like, or may be detected based on map data, or may be detected from a forward image captured by an in-vehicle camera or the like. The area-of-interest setting unit 13 detects the vehicle position based on the vehicle state information. The area-of-interest setting unit 13 then estimates a vector L (distance L) from the driver's point of view to the traffic signal position using the vehicle position, the traffic signal position, and the position of driver's point of view in the vehicle coordinate system with reference to the vehicle driving direction. Note that the position of driver's point of view may be estimated based on a vehicle structure.

The area-of-interest setting unit 13 sets the center of a quadrangular pyramid defining the area of interest as the direction of the vector L, and puts the quadrangular pyramid such that a horizontal direction of the rectangle forming the bottom surface of the quadrangular pyramid coincides with a horizontal direction along a dashboard, and a vertical direction of the rectangle extends in a height direction (vertical direction). The area-of-interest setting unit 13 determines the size of the rectangle in the horizontal direction and that in the vertical direction by a horizontal angle of view and a vertical angle of view. For example, the horizontal angle of view and the vertical angle of view may be given by values depending on the magnitude of the vector L, that is, the distance L from the driver's point of view to the traffic signal position. More specifically, the vertical angle of view and the horizontal angle of view may be given by values inversely proportional to the distance L according to equation (2) described below.

$$\text{Angle of view} = \text{normal angle of view} \times f(L) \text{ where, for example, } f(L) = k \times 1/L, k > 0 \qquad (2)$$

Note that according to equation (2), the horizontal angle of view and the vertical angle of view are determined such that the ratio between them is fixed. However, alternatively, the angle of views may be determined such the horizontal angle of view and the vertical angle of view are respectively determined according to different equations.

Alternatively, the area-of-interest setting unit 13 may set a rectangle (a two-dimensional shape) with a predetermined size at the traffic signal position and may set the area of interest by being given by a quadrangular pyramid (three-dimensional shape) formed by a set of lines extending from the driver's point of view to respective points on each side of the rectangle. Also in this case, the greater the distance between the position of driver's point of view and the traffic signal position, the smaller the angle of view of the area of interest with respect to the driver's point of view.

Figure 10:
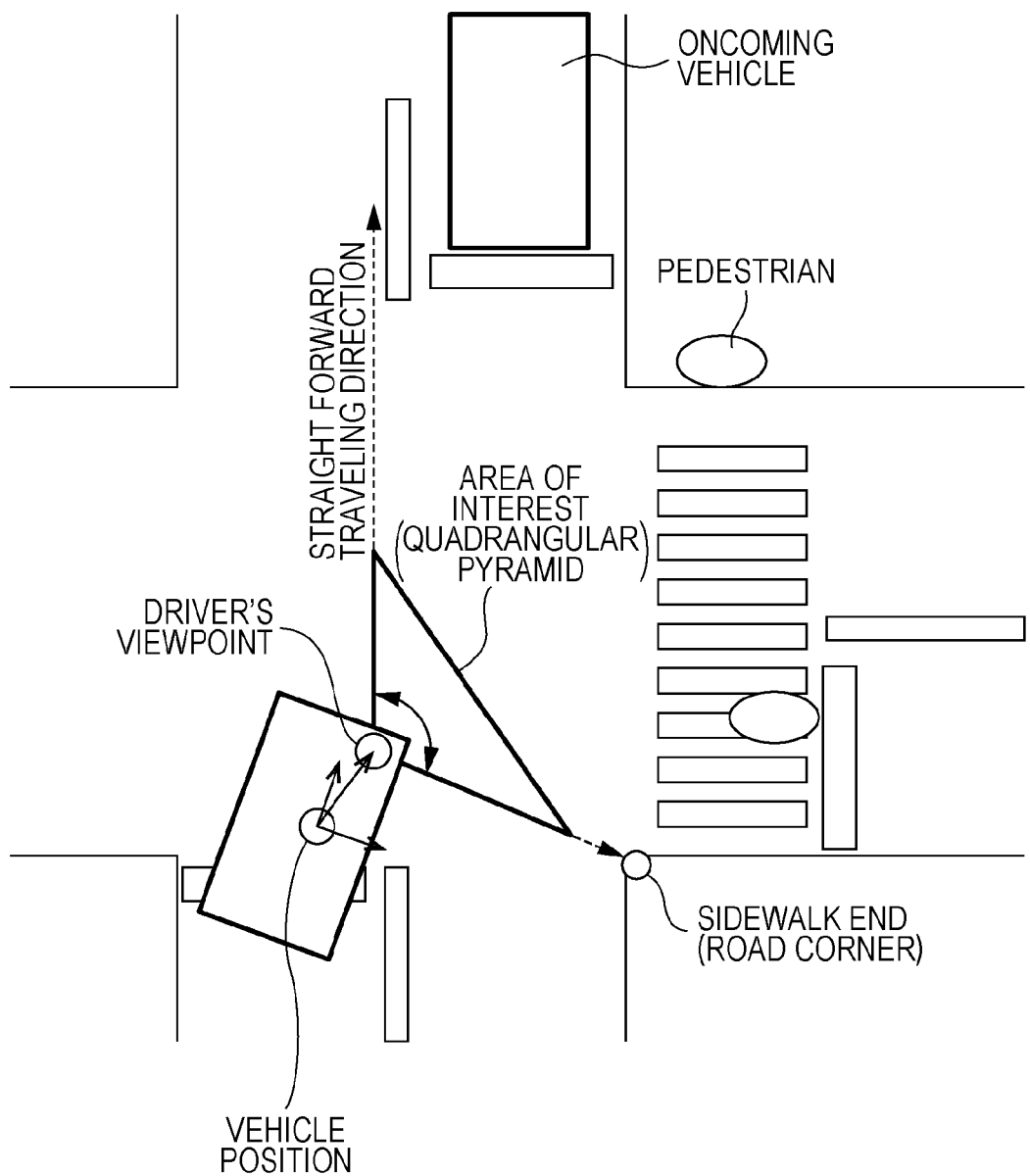
FIG. 10 is a diagram illustrating an example in which an area of interest is set in a right-side area to be visually confirmed.
Figure 11:
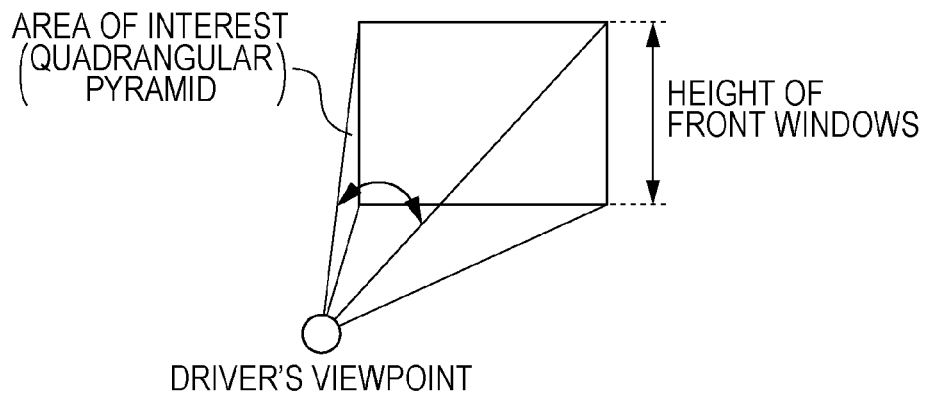
FIG. 11 is a diagram illustrating an example in which an area of interest is set in a right-side area to be visually confirmed.

Referring to FIG. 10, a description is given below as to a case where the area of interest is set in a right-side visual confirmation area in the evaluation on visual confirmation in making right turn U in the driving situation of the stopping at an intersection (before making a right turn) in the example in FIG. 7. FIG. 10 is a bird's-eye view illustrating a situation in which a vehicle is going to make a right turn at an intersection. For example, the area-of-interest setting unit 13 sets the area of interest in a shape of a quadrangular pyramid based on the vehicle position in the intersection and the shape of the intersection. More specifically, the area-of-interest setting unit 13 sets the horizontal angle of view so as to be given by a horizontal angle of view from the forward straight direction in which the vehicle is traveling along the current lane to the road corner (end of a sidewalk), on the side of the vehicle, on a right intersecting road. The area-of-interest setting unit 13 sets the vertical angle of view so as to be given by a vertical angle of view from the upper and to the lower end of a front window as seen from the driver's point of view as illustrated in FIG. 11. The area-of-interest setting unit 13 then sets the area of interest so as to be given by a quadrangular pyramid whose vertex is at the driver's point of view and whose center is coincident with the vector L and whose four triangular faces are defined by the determined horizontal angle of view and the vertical angle of view. This makes it possible to set the area of interest having a simple shape in a case where it is difficult to set the area of interest so as to have a precise shape. Even in the case where the area of interest is set so as to have a simple shape according to the present embodiment, the error of the area of interest described below may absorb the difference between the actual visually confirming area and the area of interest.

The road width of the vehicle driving road at the intersection and the road width of an intersecting road may be estimated from a road type or an intersection size such as the number of intersecting roads or the like. Information indicating the crossing angle between the driving road and the intersecting road and the center position of the intersection (center of the intersection) may be acquired as surrounding state information from general road network data.

The horizontal angle of view may be calculated such that the turning angle of the vehicle from the forward straight direction in the current driving lane along which the vehicle travels is estimated from the steering angle acquired as vehicle state information, and the horizontal angle of view may be selected from prepared values corresponding to various turning angles. In this case, a table precisely defining horizontal angle of views corresponding to turning angles may be prepared. Alternatively, the horizontal angle of view may be determined in a state of starting a right turn, in which substantially no turning has been made, and a horizontal angle of view in a state of finishing the right turn may be determined, and horizontal angle of views corresponding to turning angles between them may be determined by interpolation. In the case where the horizontal angle of views are precisely determined for the respective turning angles, it is allowed to set the area of interest so as to corresponding to the shape of each intersection. In the case where the interpolation is used, it is allowed to set the area of interest by performing a simple calculation.

Figure 12:
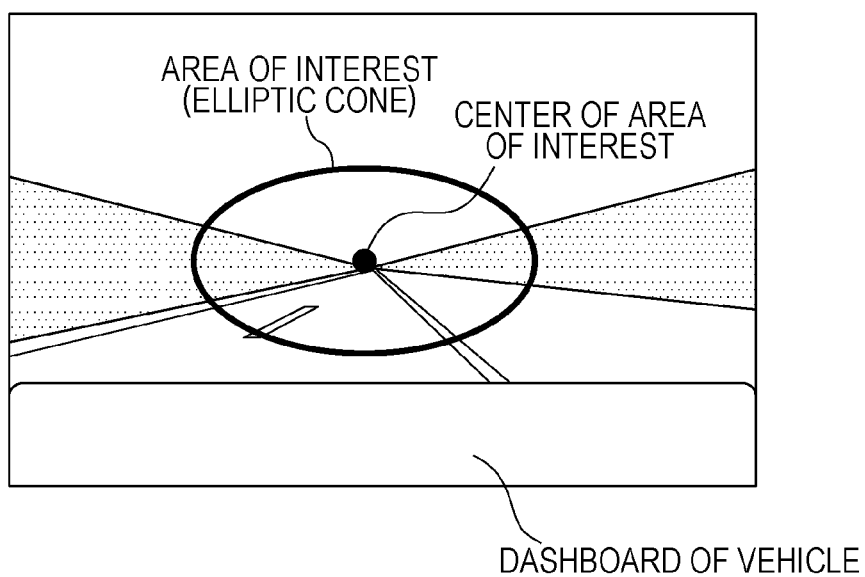
FIG. 12 is a diagram illustrating an example in which an area of interest is set on a forward road (straight road)
Figure 13:
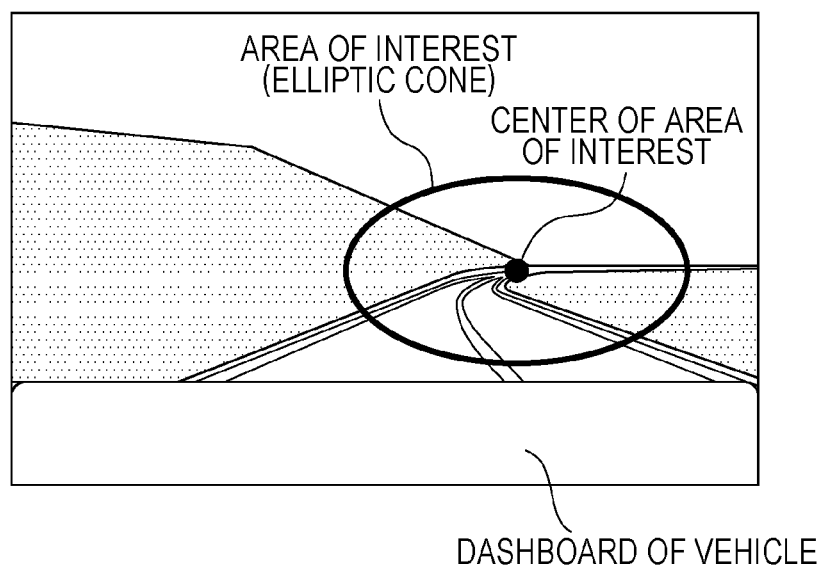
FIG. 13 is a diagram illustrating an example in which an area of interest is set on a forward road (curved road)
Figure 14:
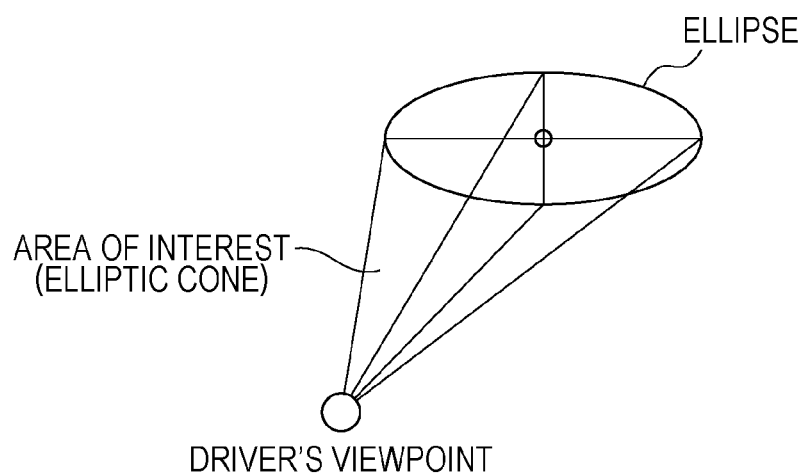
FIG. 14 is a diagram illustrating an example in which an area of interest is set on a forward road.

FIG. 12 illustrates an example of an area of interest set on a forward straight road. FIG. 13 illustrates an example of an area of interest set on a forward curved road. In the examples illustrated in FIG. 12 and FIG. 13, each area of interest is defined in the shape of an elliptic cone as illustrated in FIG. 14 such that the center of the ellipse is set at a distance point on a vehicle driving road that is the most likely point visually confirmed by the driver. The size of the ellipse may be fixed, or may be variable. For example, the higher the speed of the vehicle, the more distant point the driver tends to look at, which causes the motion of the line of sight to become small. Therefore, it may be allowed to set the area of interest so as to have a small size.

Figure 15:
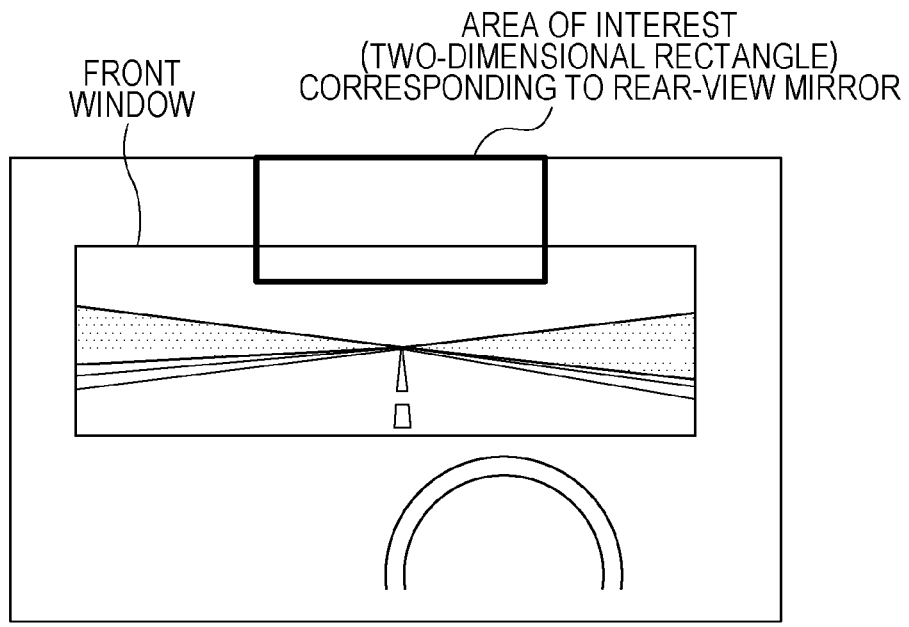
FIG. 15 is a diagram illustrating an example in which an area of interest is set at a rear-view mirror.
Figure 16:
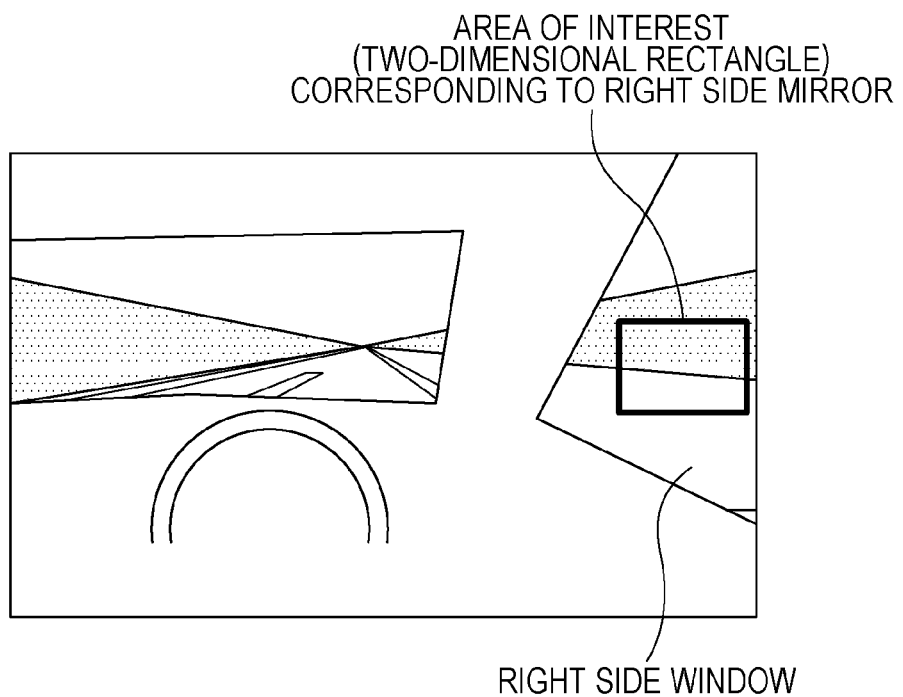
FIG. 16 is a diagram illustrating an example in which an area of interest is set at a right side-view mirror.
Figure 17:
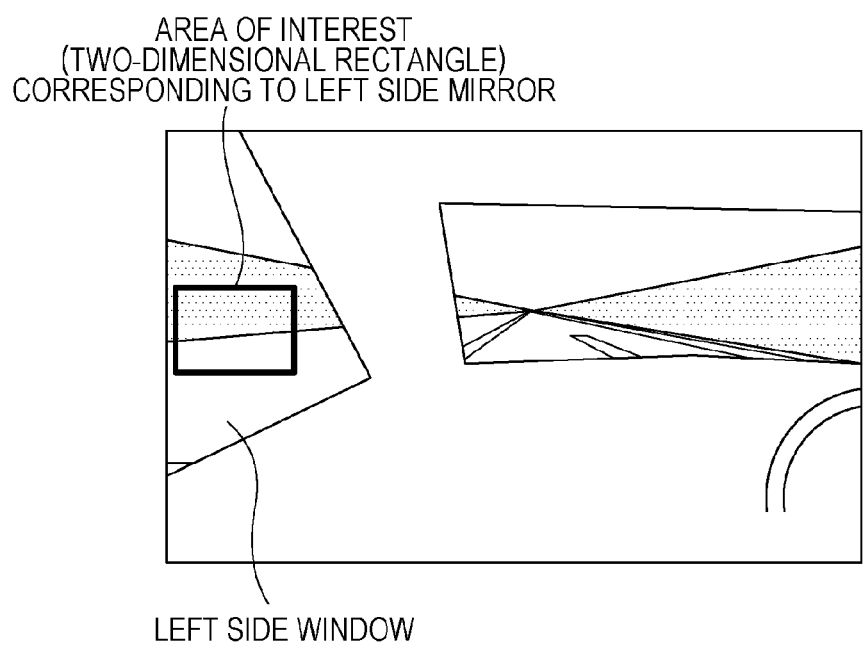
FIG. 17 is a diagram illustrating an example in which an area of interest is set at a left side-view mirror.
Figure 18:
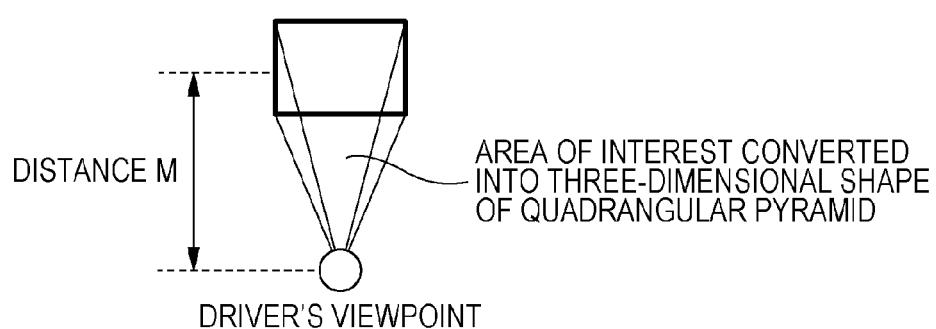
FIG. 18 is a diagram illustrating an example in which an area of interest is set at a mirror.

FIGS. 15 to 17 illustrate examples in which area of interests are set in a rear-view mirror, a right side-view mirror, and a left side-view mirror, respectively. In the examples illustrated in FIGS. 15 to 17, M denotes the distance from the driver's point of view to the rear-view mirror, the right side-view mirror, and the left side-view mirror, and a two-dimensional rectangle representative of corresponding one of the mirrors is set as an area of interest in a virtual plane at the distance M apart from the driver's point of view. Alternatively, as illustrated in FIG. 18, a three-dimensional quadrangular pyramid may be set as an area of interest such that the vertex of the quadrangular pyramid is located at the driver's point of view, and the bottom surface of the quadrangular pyramid is given by the rectangle in the virtual plane.

The area-of-interest setting unit 13 may apply a weight to a part in the set area of interest. For example, when the area of interest includes a specially important part whose state is to be especially detected, and, when an attentive watching state described below is estimated or an evaluation on the visual confirmation is performed, a weight is assigned to such a special part such that an estimation value or an evaluation value as to whether the line of sight intersects the part may be increased or decreased by a factor of the weight. For example, in the example of the area of interest (quadrangular pyramid) in a situation in which a right turn is going to be made as illustrated in FIG. 10, a greater weight may be applied to an area on a right-hand side, that is, on the side of an end of a sidewalk on which it is difficult to make a visual confirmation, and a smaller weight may be applied to a forward straight direction. Conversely, it may be allowed to take into account a possibility that the vehicle collides with an oncoming vehicle before making a right turn, a greater weight may be applied to the forward straight direction in which there is a high probability that a high-speed oncoming vehicle appears.

In the examples illustrated in FIGS. 12 and 13, in either of which the area of interest is set on the forward driving road, the greater weight may be applied the closer to the center of the area of interest. This allows it to clearly distinguish between a peripheral part and the central part to which much intention is to be paid and more attentive visual confirmation is to be made. In a case where the area of interest is changed in response to a change in the vehicle state information and the surrounding state information, a difference is detected in the shape of the area of interest between before and after the area of interest is changed, and a part newly added to the area of interest is regarded as a part to which much intention is to be paid and more attentive visual confirmation is to be made, and a great weight may be applied to this part. The value of the weight may be continuously and gradually varied depending on the position, or may take discrete values such as "large, middle, small" values.

The area-of-interest error calculation unit 14 calculates an error of the area of interest set by the area-of-interest setting unit 13 in terms of at least either the position or the shape thereof thereby calculating the accuracy of the area of interest. Unlike the weight assigned individually to each part of the area of interest set by the area-of-interest setting unit 13, the error of the area of interest represents the total error of the area of interest. The area-of-interest error calculation unit 14 increases the calculated error in a case where the area of interest is set in a shape significantly simple compared with an actual shape of a target object to be visually confirmed or in a case where the position of the area of interest is not clearly defined.

First, an explanation is given below as to the calculation of the error of the area of interest in terms of the shape thereof. The area-of-interest error calculation unit 14 calculates the error of the area of interest by determining the similarity in shape between the actual target object to be visually confirmed on which the area of interest is set and the area of interest with a simulated shape. The error of the area of interest in terms of the shape is greatly influenced by the shape of the set area of interest. Therefore, in a case where the shape of the target object to be visually confirmed is known in advance, an error may be calculated in advance for each of such areas of interest, and the recalculated error may be used. For example, in a case where an area of interest is on an object which is fixed to a vehicle and whose position and shape are known in advance as is the case with mirrors such as those illustrated in FIGS. 15 to 17, it is allowed to estimate in advance an error that occurs when the shape of the area of interest is approximated by a rectangle.

Figure 19:
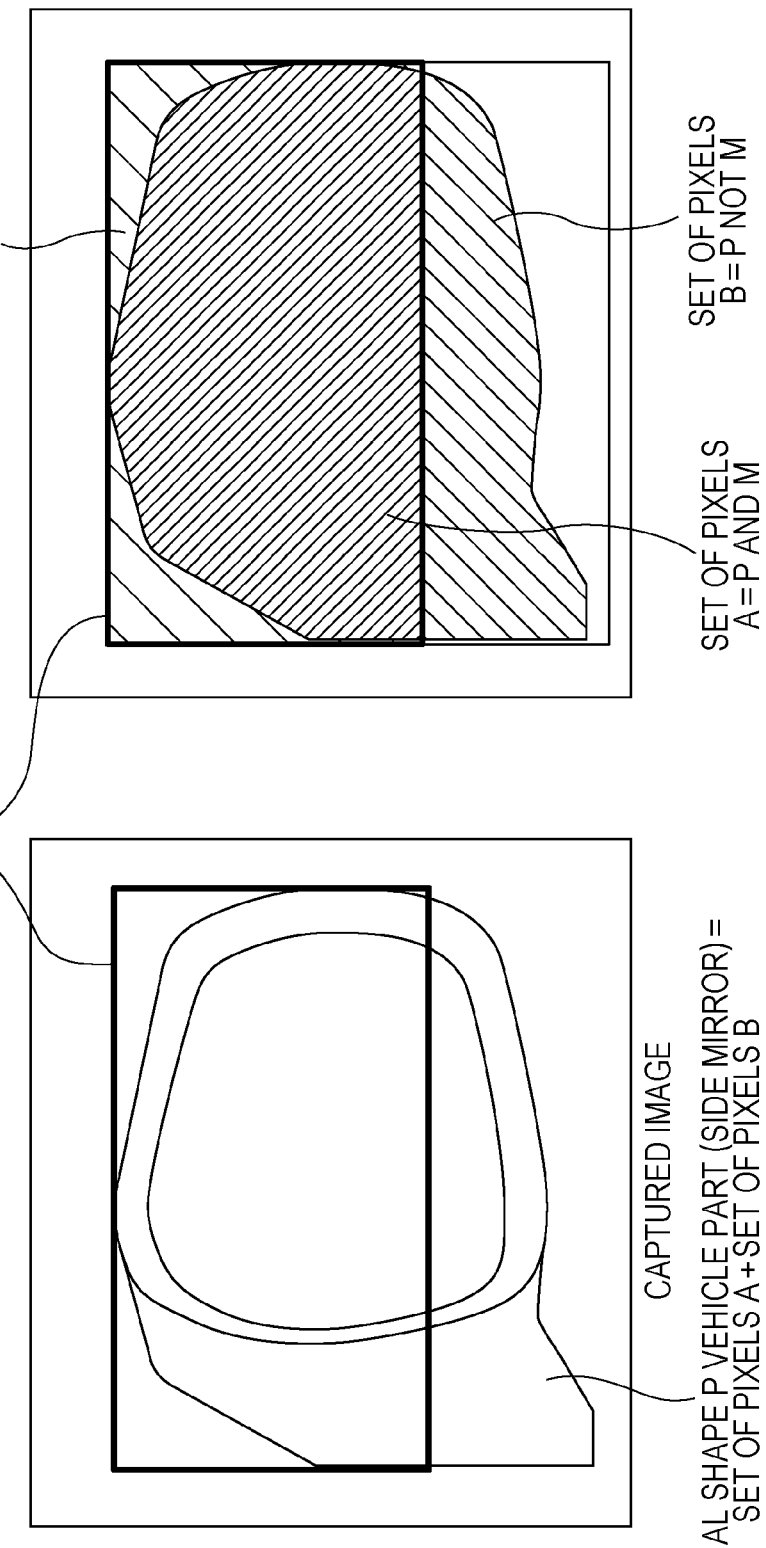
FIG. 19 is a diagram illustrating an error of area of interest in terms of a shape.

More specifically, for example, as illustrated in FIG. 19, an image of an actual in-vehicle part is captured from an angle seen by an average driver, and a shape of the in-vehicle part P in the captured image is compared with the rectangular shape M of the set area of interest. In the example illustrated in FIG. 19, the shape of the in-vehicle part P in the captured image partially overlaps the rectangular shape M of the area of interest (set of pixels A=P and M), while part of the shape of the in-vehicle part P is outside the rectangular shape M of the area of interest (set of pixels B=P not M). Furthermore, part of the rectangular shape M of the area of interest does not include the shape of the in-vehicle part P (set of pixels C=M not P). In this case, the area-of-interest error calculation unit 14 may calculate the error of the area of interest, for example, according to equation (3) described below.

Error of area of interest=$k \times$(the number of pixels $B$+the number of pixels $C$)/(the number of pixels $A$+the number of pixels $B$)=$k \times$(the number of pixels $B$+the number of pixels $C$)/(the number of pixels of shape $P$)  (3)

where k is a parameter having an arbitrary value>0.

According to equation (3), as the difference in shape and/or position between the rectangular shape M of the area of interest and the shape of the in-vehicle part P increases, the error of the area of interest increases, and thus the similarity between the object to be visually confirmed and the area of interest decreases.

In the present example, for convenience of explanation, the shape M of the area of interest is set to be slightly smaller than the shape of the in-vehicle part P. Conversely, to ensure to acquire as much line-of-sight data associated with visual confirmation as possible, the shape M of the area of interest may be set to be a bounding rectangle of the shape of the in-vehicle part P so that the shape M of the area of interest is larger than the shape of the in-vehicle part P.

Next, the error of the area of interest in terms of the position of the area of interest is described below. In the following description, an explanation is given, by way of example, for a case where the area of interest is set on a forward road as described in relation to FIGS. 12 and 13. In this case, a position at a prescribed distance ahead on a vehicle driving road is specified as a position to be visually confirmed, and an area of interest is set in an area including the road and its surroundings from a current vehicle position to the position at the prescribed distance ahead of the current vehicle position. When the vehicle position varies, the position at the prescribed distance ahead on the road accordingly varies, and thus the position at which the area of interest is set also varies. This means that when the vehicle position acquired as vehicle state information has an error, this error causes an error to occur between the position at which the area of interest is set and the position of the actual object to be visually confirmed.

Thus, in a case where it is allowed to acquire a position measurement error from the position sensor to the vehicle position, the area-of-interest error calculation unit 14 calculates the error between the area of interest based on the vehicle position and the area of interest based on the vehicle position and the position measurement error. This makes it possible to dynamically calculates the error of the area of interest depending on the current road environment from the position measurement error of the current position, and it becomes possible to get to know an influence of the position measurement error and the road environment on the attentive watching state.

Figure 20:
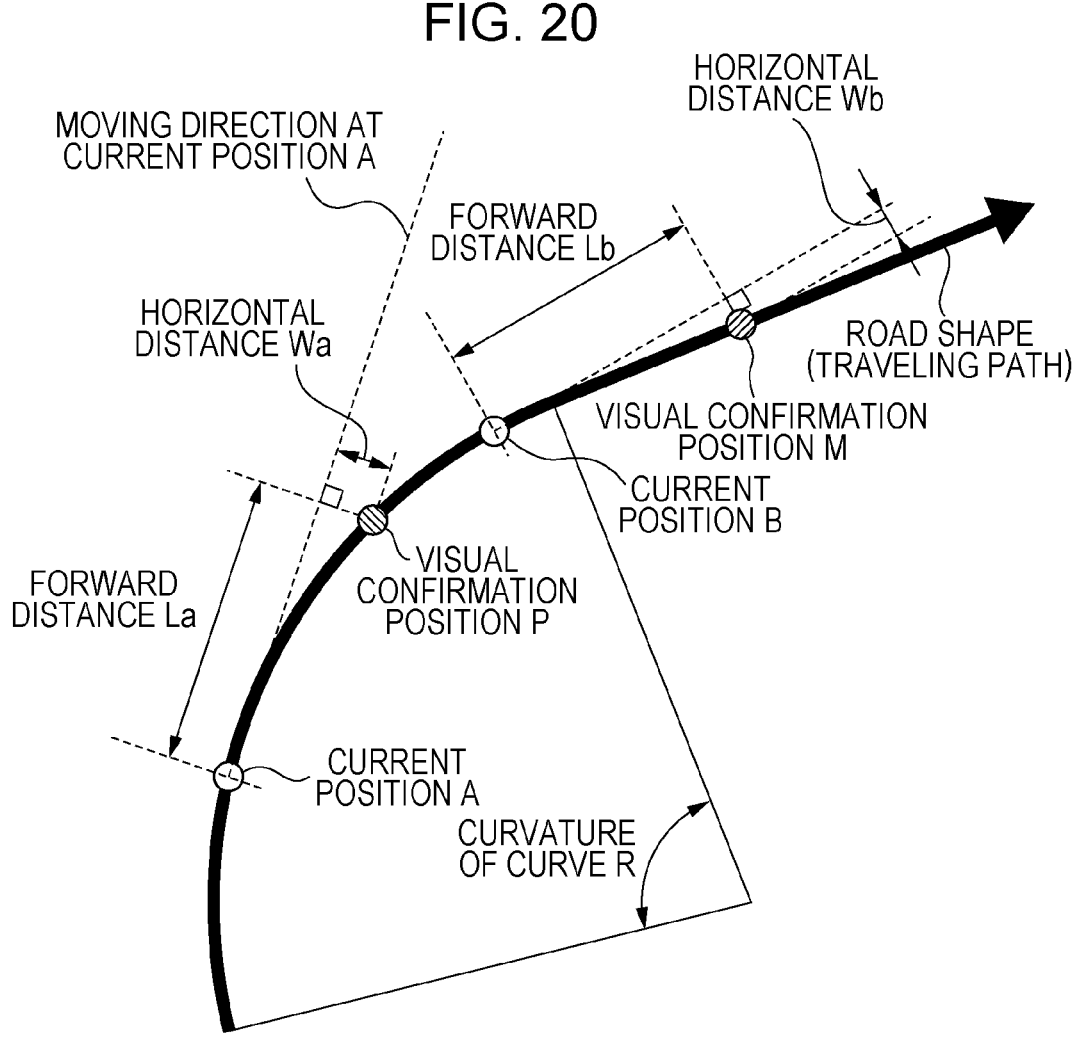
FIG. 20 is a diagram illustrating an error of area of interest in terms of a position.

More specifically, in an example illustrated in a bird's-eye view schematically illustrating a road shape in FIG. 20, the acquired current position of the vehicle is denoted by a current position A, and a position obtained by adding a position measurement error to the acquired current position of the vehicle is denoted by a current position B. Using the road shape acquired as surrounding state information, the area-of-interest error calculation unit 14 determines the position P to be visually confirmed that is the prescribed distance apart along the road from the current position A and also the position M to be visually confirmed that is the prescribed distance apart along the road from the current position B. Furthermore, a calculation is performed to determine the forward distance La and the horizontal distance Wa between the current position A and the position P to be visually confirmed, and the forward distance Lb and the horizontal distance Wb between the current position B and the position M to be visually confirmed. The forward distance is defined by a distance difference in a direction along a vehicle driving direction between the current position and a position to be visually confirmed, and the horizontal distance is defined by a distance difference in a direction perpendicular to the vehicle driving direction. The area-of-interest error calculation unit 14 may calculate the error of the error of the area of interest using these distance differences according to equation (4) described below.

$$Error of\ area of\ \text{interest} = k \times \frac{\sqrt{h \times (La - Lb)^2 + i \times (Wa - Wb)^2 + j \times (Za - Zb)^2}}{prescribed distance} \quad (4)$$

Figure 21:
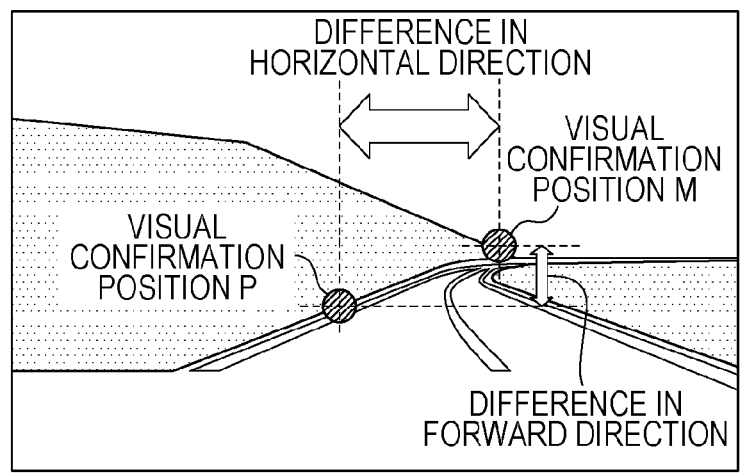
FIG. 21 is a diagram illustrating an error of area of interest in terms of a position.

In equation (4), Za and Zb each denote a difference of elevation between the current current position and the corresponding position to be visually confirmed, k is an arbitrary parameter, and h, i, and j denote arbitrary parameters respectively corresponding to the forward distance, the horizontal distance, and the difference of elevation. By setting parameters h, i, and j, it becomes possible to adjust weights of the forward distance, the horizontal distance, and the difference of elevation in the calculation of the error of the area of interest. More specifically, for example, as may be seen from FIG. 21, a change in the distance (error) in the horizontal direction directly results in an error as seen from the driver's point of view and thus the error is sensitive to the distance in the horizontal direction. In contrast, a change in the forward distance (error) does not result in a significant error. More specifically, for example, no matter whether the point is apart from the current position by a distance of 100 meters or 50 meters, the point is located close to a vanishing point when seen from the driver's point of view, and thus the forward distance (error) does not make a significant contribution to the error of the position of the area of interest. The parameters h, i, and j may be set taking into account the difference in influence of the above-described errors, thereby making it possible to calculate the error of the area of interest with higher accuracy.

Note that equation (4) is merely an example, and the equation used in calculating the error of the position of the error of the area of interest is not limited to equation (4). For example, in a case where it is not allowed to acquire information associated with the altitude, the term associated with the difference of elevation may be removed. The information associated with the altitude may be acquired from information output as vehicle state information from the position sensor, or may be acquired by performing a calculation from the current position and altitude data such as map database or the like.

In the example described above, the error is calculated from differences of two positions to be visually confirmed from their actual positions. Alternatively, the area-of-interest error calculation unit 14 may convert the actual position difference into an apparent position difference as seen from the driver's point of view and then may calculate the error of the area of interest using the apparent position difference. Use of the apparent position difference makes it possible to calculate the error of the area of interest that is more consistent with analysis using line-of-sight data.

Figure 22:
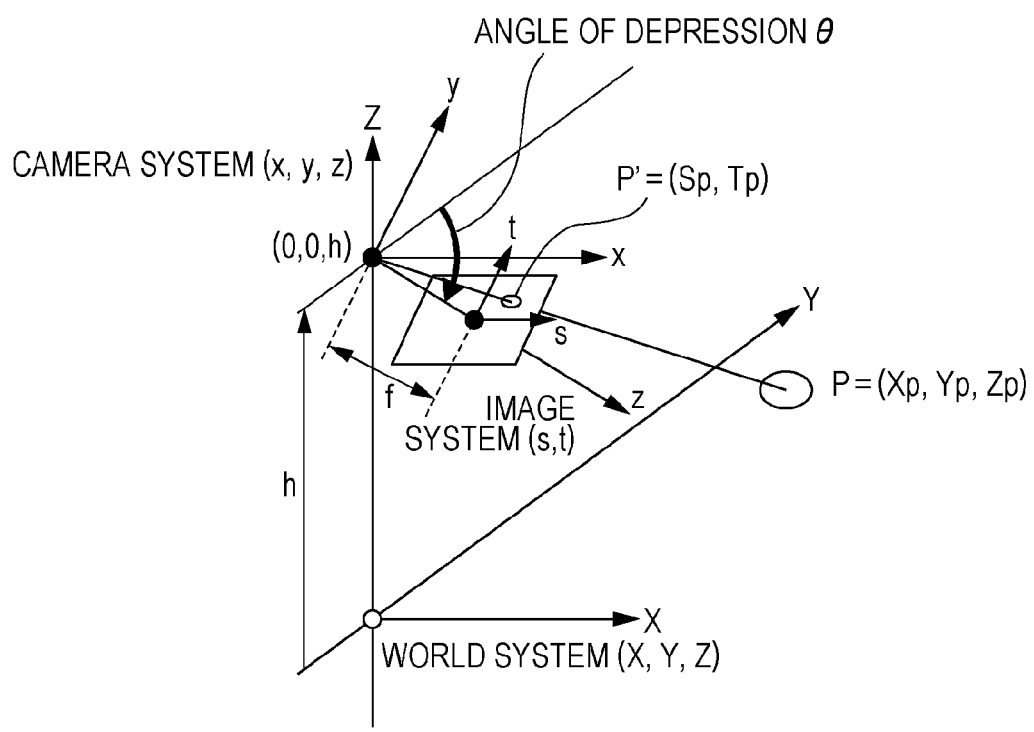
FIG. 22 is a diagram illustrating an error of area of interest in terms of a position.

For example, as illustrated in FIG. 22, the area-of-interest error calculation unit 14 calculates the error of the area of interest after the distance in the horizontal direction in a world coordinate system is converted into a position difference on an image captured by a virtual camera in a forward driving direction from the vehicle where the virtual camera is located at the position of driver's point of view and is set to have an arbitrary angle of view and an arbitrary angle of depression. Note that the world coordinate system is a coordinate system in a real world. The position on the image captured by the virtual camera at the location in the world coordinate system may be calculated geometrically using a coordinate transformation and a perspective projection method used in three-dimensional computer graphics (CG) or the like.

For example, as illustrated in FIG. 22, when the virtual camera is located at a height h in the real world and the angle of depression of the virtual camera with respect to the horizontal direction is set to θ°, the coordinates of an object in the real world may be converted in coordinates in the camera system according to, for example, equation (5) described below. Note that the origin of the world coordinate system is defined on a road surface position directly below the virtual camera, and a Z axis is defined in a vertical direction. The origin of the camera coordinate system is defined at the position of the virtual camera, and a z axis is defined in a looking down direction from the virtual camera.

$$\begin{pmatrix} x \\ y \\ z \\ 1 \end{pmatrix} = \begin{pmatrix} 1 & 0 & 0 & 0 \\ 0 & \cos(-\theta) & \sin(-\theta) & 0 \\ 0 & -\sin(-\theta) & \cos(-\theta) & 0 \\ 0 & 0 & 0 & 1 \end{pmatrix} \begin{pmatrix} 1 & 0 & 0 & 0 \\ 0 & 1 & 0 & -h \\ 0 & 0 & 1 & 0 \\ 0 & 0 & 0 & 1 \end{pmatrix} \begin{pmatrix} X \\ Z \\ Y \\ 1 \end{pmatrix} \quad (5)$$

In equation (5), (x, y, z) denotes the position in the camera system, and (X, Y, Z) denote the position in the world coordinate system. From equation (5), it is possible to obtain the position of the object in the camera coordinate system in which the virtual camera position is taken as the origin. The obtained three-dimensional position in the camera system is then converted into a two-dimensional position of an image of the object formed in a virtual image plane corresponding to the image sensing area of the virtual camera. This conversion may be performed by central projection according to, for example, equation (6) described below.

$$s = f\frac{X}{Z}, \quad t = f\frac{Y}{Z} \quad (6)$$

Herein (s, t) is a coordinate system of the virtual image plane where s denotes a horizontal axis of the virtual image plane and t denotes a vertical axis of the virtual image plane, and f denotes a focal length of the virtual camera, that is, f denotes the distance from the origin (the position of the virtual camera) of the camera system to the virtual image. Two positions M and P to be visually confirmed are respectively converted into positions M'=(Sm, Tm) and P'=(Sp, Tp) on the virtual image according to, for example, equation (6). Using position differences (Sm−Sp) and (Tm−Tp), the error of the area of interest may be calculated according to, for example, equation (7) described below.

$$\text{Error of area of interest} = k \times \sqrt{(Sm-Sp)^2 + (Tm-Tp)^2} \quad (7)$$

In equation (7), k is an arbitrary parameter. Note that equation (7) is merely an example of the representation of the error of the area of interest using apparent position differences, and the error of the area of interest may be calculated using other equations. For example, the size of the virtual image (pixel size) may be determined. The position on the image may be converted into a representation based on pixel positions and then the error may be calculated. Alternatively, the position difference on the virtual image may be divided by the size of the virtual image to obtain the ratio of the position difference to the size of the virtual image, and then the error may be calculated using the ratio. Alternatively, the error may be calculated according to other equations.

Figure 23:
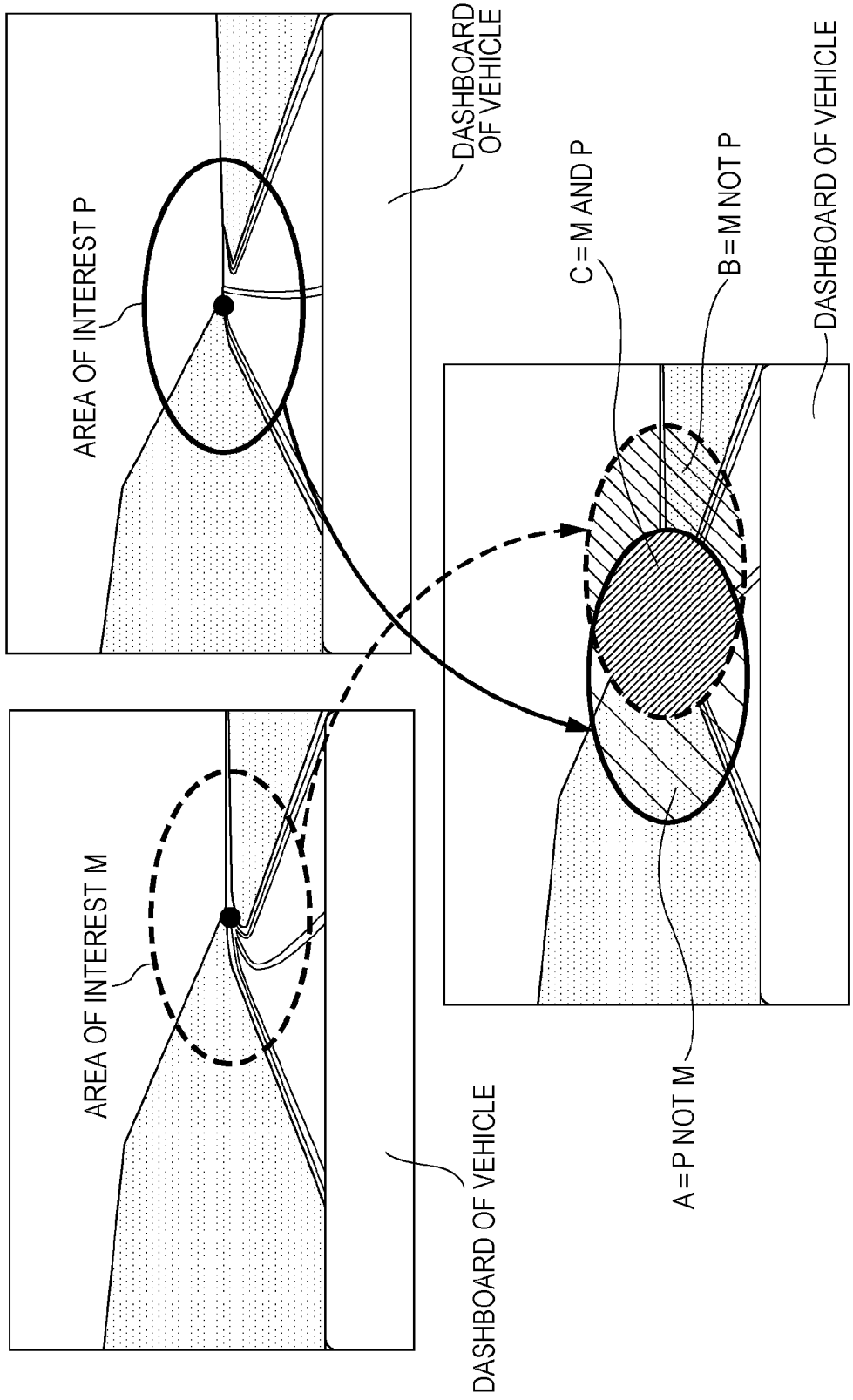
FIG. 23 is a diagram illustrating an error of area of interest in terms of a position.

Alternatively, after the apparent positions M'(Sm, Tm) and P'(Sp, Tp) on the virtual image for the position M to be visually confirmed and the position P to be visually confirmed are calculated in the above-described manner, the error may be calculated using a difference in area between area of interests set at respective apparent positions as illustrated in FIG. 23. For example, the error may be calculated according to equation (8) described below.

Error=$j$×(the sum of areas of parts having no overlap between the area of interests)/(the area size of the area of interest)=$j$×(area $A$+area $B$)/(area $M$) (8)

In equation (8), j is an arbitrary parameter. To perform an exact calculation according to this equation (8), it has to calculate an intersection area between two ellipses in the example illustrated in FIG. 23. This calculation is complicated, and thus the error of the area of interest may be calculated using simplified approximate values. For example, using a vertical width and a horizontal width of a bounding rectangle of the area of interest, the error of the area of interest may be calculated according to equation (9) described below.

Error≈$s$×((the horizontal position difference of the area of interest)/(the horizontal width of the area of interest))×((the vertical position difference of the area of interest)/(the vertical width of the area of interest)) (9)

In equation (9), s is an arbitrary parameter. In equation (9), in a case where there is no intersection between area of interests, the error increases infinitely. To handle this situation, the range of the error may be limited, for example, to 2 or less.

The explanation of the evaluation of the position difference between two positions to be visually confirmed has been given above by way of example for the case where the evaluation is performed based on the actual position difference and for the case where the apparent position difference as seen from the virtual camera configured to capture the image of position to be visually confirmed from the driver's point of view. In the latter case, the apparent position difference as seen from the driver is determined and used, which allows it to calculate the error of the area of interest similar to the error of the area of interest obtained in the former case by properly setting the parameters h, i, and j using equation (4). Practically, the influence of a difference in forward distance on the apparent distance is not unchangeable, but the influence of a difference between closer positions (for example, between positions at 2 meters and 5 meters apart from the driver's point of view) is greater than that of a difference between distance positions (for example, between positions at 50 meters and 55 meters apart from the driver's point of view). That is, the contribution to the error of the area of interest using the apparent position difference is greater in the case where positions are located closer to the driver's point of view than in the case where positions are located farther apart from the driver's point of view even when the distance between the two positions is the same for the two cases. It is difficult to properly set the parameters h, i, and j taking into account the above-described influence. On the other hand, in the case where the error of the area of interest is evaluated using the latter apparent position difference, it is allowed to calculate the error of the area of interest taking into account the influence described above, which provides a benefit.

Note that the calculation of the error of the area of interest is not limited to the methods described above. For example, an arbitrary error calculation equation may be prepared that may give an error of the area of interest which increases with the vertical position difference and the horizontal position difference of the position to be visually confirmed. Alternatively, a table may be prepared that defines the error of the area of interest for various values of the vertical position difference and the horizontal position difference. By preparing such a table for each of various values of the road curvature, it becomes possible to more easily calculate the error of the area of interest.

The evaluation of the error in terms of the position of the area of interest is applicable not only to an area of interest set on a forward road as described above with reference to the examples, but also to many other cases in which an area of interest is set at a traffic signal, a right-side area to be looked at for confirmation, or like, with reference to the vehicle position. The above-described evaluation of the error is also applicable to a case where an area of interest is set at a rear-view mirror, a side-view mirror, or the like with reference to the driver's point of view. In any case, the error of the area of interest may be calculated using a potential position difference expressed in a real value or using an apparent position difference as seen from the driver's point of view according to the method described above.

The above-described method of the calculation of the error of the area of interest taking into account the position makes it possible to calculate the position error or the area of interest and take into account the calculated error for various area of interests even in cases where it is difficult to measure the exact vehicle position and the exact positional relationship between the vehicle position or the driver's point of view and the target area to be attentively watched.

In addition to the error of the area of interest in terms of the shape of the area of interest and the error of the area of interest in terms of the position, an error may also be calculated and taken into account for a case where the area of interest varies depending on a driver's attribute (age, driving skill, or the like).

The effect of the driver's attribute is discussed below by way of example for a case where the prescribed distance to the point to be visually confirmed at which the area of interest is set is varied for the same current position. In this case, the error of the area of interest may be calculated based on a difference between the position to be visually confirmed defined using the prescribed distance L predetermined for an average driver and the position to be visually confirmed defined using the prescribed distance L' determined depending on the actual driver's attribute.

The prescribed distance L may be statistically determined in advance via actual driving experiments or the like. For example, driving experiments on roads with the same curvature are performed to collect data as to what many drivers tend to try to intensively look at, and the prescribed distance L for average drivers is given by the distance between the driver's point of view and an average point on which the line of sight concentrates. The variation of the prescribed distance L is recorded as a distance error between the prescribed distance L' corresponding to the actual driver's attribute and the prescribed distance L defined for the average driver in relation to the curvature of the road on which the experiments are performed. More specifically, the distance error is given by the standard deviation of the prescribed distance L. The environment condition such as the curvature or the like is changed, and the prescribed distance L and the distance error are calculated and the calculated values are used in calculating the error of the area of interest.

More specifically, data determined under the environment condition most similar to the condition (road condition such as a curvature or the like) of the environment where the area of interest is to be set is retrieved from the set of data, and the prescribed distance L and the distance error indicated by the retrieved data are used. In a case where the positional relationship is directly used in the calculation of the error of the area of interest, the distance error may be directly used in the calculation of the error of the area of interest, which allows a great reduction in calculation cost of the error of the area of interest. Alternatively, the positional relationship may be converted into the apparent position difference as seem from the driver, and the error of the area of interest may be calculated based on the apparent position difference. In this case, the conversion is performed to determine the position difference seen from the driver's point of view corresponding to the difference in the current road condition between the apparent position of the position to be visually confirmed determined using the prescribed distance L and the apparent position of the position to be visually confirmed determined using the sum of the prescribed distance L and the distance error, and the error of the area of interest is calculated based on the position difference as seen from the driver's point of view. This makes it possible to calculate the error of the area of interest depending on the current environment condition (road shape), which results in an increase in accuracy of the calculated error of the area of interest.

In a case where the actual driver's attribute is known in advance, the prescribed distance L may be given by a value calculated statistically for a group of drivers having the same driver's attribute. In a case where the driver's attribute is not known, the prescribed distance L may be given by a value calculated statistically for an average group of drivers. In this case, the distance error may be given by the driver distance error of the average group of drivers or may be given by the distance error determined for the group including the average group of drivers and other groups of drivers. Alternatively, instead of setting the area of interest corresponding to that of the average driver, the area of interest may be set to a large area of interest based on the prescribed distance determined for wide variety of driver's attributes such that the resultant area of interest is less dependent on a particular driver's attribute. Use of the area of interest determined in the above-described manner makes it possible to calculate the visual confirmation rate that is not dependent on the driver's attribute. However, the size the area of interest is greater than the true size, and this may cause a reduction in reliability of the calculated visual confirmation rate. In this case, the error of the area of interest may be calculated using the distance error taking into account all driver distances in the group of drivers employed in setting the area of interest, and the reduction in the reliability may be detected as a part of the confidence level of the estimation of the attentive watching state described below.

In the above-described examples, the distance to the target to be visually confirmed defined as the area of interest is calculated taking into account a change that may occur depending on various driver's attributes. Note that parameters associated with the area of interest other than the distance may be determined taking into account the driver's attribute. That is, the prescribed distance L and the distance error at the distance L for the average driver may be read as an arbitrary parameter and an error caused by a change in the parameter depending on the driver's attribute. Thus it is possible to calculate the area of interest and the error of the area of interest taking into account the driver's attribute.

The area-of-interest error calculation unit 14 calculates the error of the area of interest at least once in a judgment time. The calculation frequency may be set arbitrarily. For example, the calculation may be performed only when the driving situation is switched, or each time the setting of the area of interest is updated, or otherwise the calculate may be performed when the attentive watching state (described later) is estimated.

When the one judgment time expires, a next judgment time starts for the same driving situation unless the driving situation is ended or the driving situation is switched to another driving situation, and thus there is a possibility that the driving situation does not change even once during one judgment time. Therefore, in the case where the calculation timing is set such that the error of the area of interest is calculated only when a change in the driving situation occurs, when no change in the driving situation is detected during the judgment time, an error calculated in another judgment time may be used. Alternatively, the calculation timing is set such that the error of the area of interest is calculated at least once in each judgment time.

As the frequency of calculating the error of the area of interest is increased, the accuracy of the calculated error of the area of interest is increased. However, this results in an increase in calculation cost. Therefore, the calculation frequency may be changed depending on other factors such as a calculation status in another configuration element or another application. The calculation frequency may be determined in advance depending on the subject of evaluation or the type of area of interest, or may be determined based on the vehicle state information and the surrounding state information. For example, the error of the area of interest may be calculated only when the vehicle is moving at a speed equal to or higher than a prescribed speed. A plurality of calculation frequencies may be determined in advance, and the calculation frequency may be switched according to a predetermined rule. The calculation frequency may be selected from a plurality of calculation frequencies determined in advance depending on a some rule according to, for example, the vehicle speed, a calculation load, a surrounding road shape, a surrounding geography, existence of a moving object in the environment, or the like.

It is desirable that the frequency of calculating the error of the area of interest is greater at least than the frequency of updating the setting of the area of interest. The position and the shape of the set area of interest depend on the vehicle state information and the surrounding state information. Therefore, the position and the shape of the set area of interest may change with time. Herein, instead of strictly changing the position and the shape of the area of interest, the frequency of calculating the error of the area of interest may be increased. In this case, it is preferable to perform the calculation of the error of the area of interest more frequently than the setting of the area of interest is updated. The greater the frequency of calculating the error of the area of inters, the higher the accuracy of the evaluation on the visual confirmation.

In the case where the error of the area of interest is calculated a plurality of time in one judgment time, the area-of-interest error calculation unit 14 unifies the error of the area of interests calculated during the one judgment time into the total error of the area of interest in the judgment time. The total error of the area of interest may be given, for example, by the average value, the maximum value, the minimum value, the intermediate value, or the statistical value such as the mode value of the plurality of errors of area of interests calculated in the judgment time. As for the statistical value, for example, a weighted average value obtained by assigning weights such that a greater weight is applied at a time closer to the middle of the judgment time or at a time in a newer judgment time.

The attentive watching state estimation unit 15 estimates the attentive watching state of the driver as to the area of interest based on the area of interest set by the area-of-interest setting unit 13 and direction of the line of sights indicated by line-of-sight data acquired in the judgment time. The judgment time is determined depending on the driving situation determined by the driving situation determination unit 12 as illustrated in FIG. 7.

More specifically, based on a time in which a predetermined type of line of sight is included in the area of interest, the number of such line of sights, the occupation ratio of such line of sights in the area of interest in the judgment time, the attentive watching state estimation unit 15 estimates the attentive watching state of the driver as to the area of interest. The inclusion of the lines of sight is defined as follows. When the line of sight represented by the line-of-sight data is represented by a vector extending from the driver's point of view, when this vector is included in the three-dimensional area of interest or intersects with the two-dimensional area of interest, this line of sight is said to be included in the area of interest. The attentive watching state estimation unit 15 calculates, to determine the attentive watching state, one of the attentive watching rate #1, the attentive watching rate #2, the attentive watching time #3, and the occupation ratio #4 indicating the part of the area of interest intersected with the lines of sight.

> The attentive watching rate #1=(the number of pieces of line-of-sight data of the type $A$ included in the area of interest in the judgment time)/(the number of pieces of line-of-sight data of the type $B$ in the judgment time)

> The attentive watching rate #2=(the number of pieces of line-of-sight data of the type $A$ not included in the area of interest in the judgment time)/(the number of pieces of line-of-sight data of the type $B$ in the judgment time)

> The attentive watching time #3=(the total sum of times, in the judgment time, during each of which line-of-sight data of the type $A$ is included in the area of interest)/(the total sum of times, in the judgment time, during each of which line-of-sight data of the type $B$ appears)

> The occupation ratio #4=(the overlapping area or volume between the area of interest and shape $U$ whose center is located at the average position of set of line-of-sight data of the type $A$ in the judgment time)/(the area or volume of the shape $U$)

The line-of-sight data of the type A may be, for example, line-of-sight data classified as data to be subjected to judgment, that is, line-of-sight data determined as being "valid" and of a type of the line of sight other than "saccade". In this case, the line-of-sight data of the type B may be the line-of-sight data of the same type as the type A, line-of-sight data determined to be "valid", or all line-of-sight data.

The attentive watching state estimation unit 15 calculates the occupation ratio #4, for example, as follows. A circle is determined such that the center thereof is located at the average position of intersecting positions between the area of interest and directions of the line of sight represented by respective pieces of line-of-sight data of the type A in the judgment time and such that the radius of the circle is equal to the standard deviation of the intersecting positions, and the resultant circle is employed as the shape U. Alternatively, the shape U is given by a circular cone whose bottom surface is given by the circled obtained in the above-described manner and whose vertex is located at the driver's point of view. The attentive watching state estimation unit 15 calculates the occupation ratio #4 by determining the ratio, to the determined circle or the circular cone, of the intersection between the area of interest set by the area-of-interest setting unit 13 and the circle or the circular cone determined in the above-described manner.

The equations of the attentive watching rate #1, the attentive watching rate #2, the attentive watching time #3, and the occupation ratio #4 indicate the ratio of the number of lines of sight of interest included in the area of interest in the judgment time to the total number of lines of sight occurring in the judgment time. Based on these equations, the estimation is performed as to whether the driver actually looked at the area of interest attentively in the judgment time.

In the equations of the attentive watching rate #1, the attentive watching rate #2, the attentive watching time #3, and the occupation ratio #4, in the case where the line-of-sight data of the type A is employed as the valid line-of-sight data, saccade lines of sight included in the acquired line-of-sight data are handled. In the analysis of the area to be attentively watched, in general, all acquired line-of-sight data is not used in the analysis but only line-of-sight data representing lines of sight recognizable by human brains is used in the analysis. That is, to estimate the attentive watching state based on intentional lines of sight, line-of-sight data representing saccade lines of sight is removed from the acquired line-of-sight data, and only line-of-sight data representing fixation and smooth pursuit is used in the analysis. Therefore, in the case where the line-of-sight data of the type A includes saccade lines of sight, to make it possible to estimate the attentive watching state based on intentional lines of sight, it is desirable to perform a final evaluation by the visual confirmation evaluation unit 19 (described later) using the confidence level calculated by the line-of-sight data configuration calculation unit 16 (described later) taking into account the line of sight configuration state.

In the case where weights are set individually to respective parts of the area of interest by the area-of-interest setting unit 13, when lines of sight are included in a part assigned a large weight, the attentive watching state estimation unit 15 may perform the estimation such that the estimation value of the attentive watching state is increased or decreased. In this case, the attentive watching state estimation unit 15 may calculate the attentive watching rate #1, for example, according to the following equation instead of using the above described equation.

The attentive watching rate #1=(the total sum of $F$ in the judgment time)/(the total number of pieces of line-of-sight data classified as data to be subjected to judgment in the judgment time), where $F=\Sigma(\delta$(whether the line of sight represented by line-of-sight data i classified as data to be subjected to judgment is included in the area of interest)×(the weight assigned to the part, of the area of interest, including the line of sight represented by line-of-sight data i classified as data to be subjected to judgment).

In the above equation, $\Sigma$ denotes the sum taken over i=0 to N, N denotes the number of pieces of line-of-sight data classified as data to be subjected to judgment in the judgment time. That is, the sum is taken over all processed line-of-sight data classified as data to be subjected to judgment in the judgment time. Furthermore, $\delta$(condition) is a function that takes a value of 1 when the condition is satisfied while the function takes a value of 0 when the condition is not satisfied. Similarly, in the calculation of the attentive watching rate #2, the attentive watching time #3, and the occupation ratio #4, weights may be applied to pieces of line-of-sight data of the type A included in the area of interest. By using the weights together with the line of sight configuration state calculated by the line-of-sight data configuration calculation unit 16 (described later), it becomes possible, even in a case where an area of interest is set in a rough manner, to perform the evaluation on the visual confirmation while applying a large weight to an arbitrary important part in the area of interest such as a central part thereof in evaluating the attentive watching state.

In the calculation of the attentive watching rate #1, the attentive watching rate #2, the attentive watching time #3, and the occupation ratio #4, weights may be applied depending on time in the judgment time at which each piece of line-of-sight data classified as data to be subjected to judgment in the judgment time. For example, by assigning a greater weight to newer line-of-sight data, it becomes possible to obtain a value in which a newer line-of-sight state in a long judgment time makes a greater contribution to the value. More specifically, for example, the attentive watching rate #1 may be calculated as follows.

The attentive watching rate #1=(the total sum of $G$ in the judgment time)/(the total number of pieces of line-of-sight data classified as data to be subjected to judgment in the judgment time), where $G=\Sigma(\delta$(whether the line of sight represented by line-of-sight data i classified as data to be subjected to judgment is included in the area of interest)×(the weight determined depending on time at which line-of-sight data i classified as data to be subjected to judgment is acquired).

In the above equation, $\Sigma$ and the $\delta$(condition) are the same as the above. The "weight determined depending on time at which line-of-sight data i classified as data to be subjected to judgment is acquired" is calculated as the "weight at time Tn" calculated according to an equation described below, where Tn is the time at which the line-of-sight data i is acquired.

Weight at time $Tn$=weight at time $Ts$+(weight at time $Te$−weight at time $Ts$)×(time difference $Tn-Ts$)/ ((time difference $Te-Ts$)×k), where k=the total number of pieces of data acquired in the judgment time×(weight at time Te−weight at time Ts)/2

Time Tn denotes a time at which line-of-sight data i for which a weight is to be calculated is acquired. Time Te is the newest time in the judgment time, and time Te is the current time in most cases. Time Ts is the earliest time in the judgment time, and time Ts is the start time of the judgment time in most cases. The weight for time Te and the weight for time Ts each have a predetermined value, for example, the values are respectively set to 1.0 and 0.6. On the other hand, k is a value used to normalize the values of weights such that the total sum of weights at respective times in the judgment time equals to 1. In a case where the normalization is not desired, k may be regarded as 1.0.

In the above example, the weight at time Tn is calculated according to the equation using linear interpolation such that the obtained value is proportional to the elapsed time. Note that the weight may be calculated to another equation. Alternatively, instead of calculating the weights, a table defining values of weights may be prepared, and values of weights may be determined using the table. In any case, the weights acquired using a time difference of the time at which the line-of-sight data i is acquired from either one of the start time of the judgment time, the end time of the judgment time, and the current time.

Similarly, in the calculation of the attentive watching rate #2, the attentive watching time #3, and the occupation ratio #4, the calculation may be performed after weights are applied depending on the times at which the respective pieces of line-of-sight data are acquired.

The line-of-sight data configuration calculation unit 16 calculates the configuration state of the line-of-sight data based on the occurrence rates corresponding to types of a plurality of pieces of line-of-sight data acquired in the judgment time. More specifically, the line-of-sight data configuration calculation unit 16 calculates the configuration state of line-of-sight data in the judgment time using the number of pieces of valid line-of-sight data acquired in the judgment time, the number of pieces of line-of-sight data acquired in the judgment time and classified as data to be subjected to judgment, or a statistical value of line-of-sight positions represented by the respective pieces of line-of-sight data acquired in the judgment time. The statistical value may be, for example but not limited to, the average value, the variance, the deviation value, or the like.

More specifically, for example, the line-of-sight data configuration calculation unit 16 calculates the occurrence rates #1 to #4 for the line-of-sight data of the type A according to the following equations.

$$\text{Occurrence rate \#1} = k \times \frac{\text{the number of pieces of line-of-sight data of type } A \text{ in judgement time}}{\text{the total number of pieces of line-of-sight data in judgement time}}$$

$$\text{Occurrence rate \#2} = k \times \frac{\sum_{i=0}^{N} \delta(i=A) \times \text{weight defined depending on whether interpolation is performed}}{\text{the total number of pieces of line-of-sight data in judgement time}}$$

$$\text{Occurrence rate \#3} = k \times \frac{1}{\text{variance or standard deviation of positions of line-of-sight data of type } A \text{ in judgement time}}$$

$$\text{Occurrence rate \#4} = k \times \frac{\sum_{i=0}^{N} \delta(i=A) \times \{\delta(\text{left line of sight}) + \delta(\text{right line of sight})\}}{\text{the total number of pieces of line-of-sight data in judgement time}}$$

In the above equations, k is an arbitrary parameter. The condition "i=A" represents "the type of line-of-sight data i=type A". The condition "left line of sight" denotes that "line-of-sight data i includes valid line-of-sight data representing a left-eye line of sight". The condition "right line of sight" denotes that "line-of-sight data i includes valid line-of-sight data representing a right-eye line of sight". The line-of-sight data of the type A may be an arbitrary type of line-of-sight data such as valid line-of-sight data, line-of-sight data classified as data to be subjected to judgment, line-of-sight data classified as data not to be subjected to judgment (valid and saccade), or the like.

The "weight defined depending on whether interpolation is performed" is a weight assigned a greater value for line-of-sight data that is already valid at a point of time when the line-of-sight data is output from the line-of-sight sensor 91 than for line-of-sight data whose value is interpolated by the line-of-data judgment unit 11. For example, 1.0 is assigned for line-of-sight data that is valid from the beginning, but 0.9 or other values is assigned for line-of-sight data that is converted into valid data by performing value interpolation. By applying the weight to the occurrence rate depending on whether interpolation is performed or not, it becomes possible to calculate the line of sight configuration state such that the information representing the state of the line-of-sight data at the point of time when the line-of-sight data is acquired from the line-of-sight sensor 91 is reflected in the line of sight configuration state. Alternatively, instead of using weights, a final occurrence rate may be determined from two occurrence rates, that is, an occurrence rate calculated based on information indicating whether line-of-sight data is valid or invalid as of when the line-of-sight data is acquired, and an occurrence rate calculated after interpolation is performed. More specifically, for example, the average value of the two occurrence rates described above may be employed as the final occurrence rate.

The occurrence rate #4 is used in a case where it is allowed for the line-of-sight sensor 91 to measure line of sights for both right and left eyes. In a case where the line-of-sight data of the type A includes valid line-of-sight data representing a line of sight of a left eye, δ(left line of sight)=1. On the other hand, in a case where the line-of-sight data of the type A includes valid line-of-sight data representing a line of sight of a right eye, δ(right line of sight)=1. By taking the sum of two δ( ), the resultant value is 2 when there are valid lines of sight for both right and left eyes, while the resultant value is 1 when there is a valid line of sight for one of right and left eyes, and the resultant value is 0 when there is no valid line of sight for any of right and left eyes. As result, the occurrence rate #4 increases as the number of pieces of line-of-sight data of the type A valid for both right and left eyes increases. This makes it possible to indirectly detect whether the measurement state of the line-of-sight sensor 91 is good or not as of when the line-of-sight data is acquired.

The occurrence rate #1, the occurrence rate #2, and the occurrence rate #4 may be calculated, as with the attentive watching rate, using the "weight at the point of time when line-of-sight data i classified as data to be subjected to judgment to be used in the calculation is acquired". For example, as with the attentive watching rate, by applying a large weight to line-of-sight data acquired at the latest time, it becomes possible to obtain a value such that the state of the recently acquired lines of sight makes more contribution to the value. By calculating the occurrence rate using the same weights as those used in the attentive watching rate, it becomes possible to achieve consistency in value between the attentive watching rate and the occurrence rate. Equations described below are for calculating the occurrence rate #1, the occurrence rate #2, and the occurrence rate #4 using weights depending on the acquisition time.

Occurrence rate #1 = $k \times$ $$\frac{\sum_{i=0}^{N} \delta(i=A) \times \text{weight at time when line-of-sight data } i \text{ classified as data to be subjected to judgement is acquired}}{\text{the total number of pieces of line-of-sight data in judgement time}}$$

Occurrence rate #2 =

$$k \times \frac{\sum_{i=0}^{N} \delta(i=A) \times \text{weight depending on whether interpolation is performed} \times \text{weight at time when line-of-sight data } i \text{ is acquired}}{\text{the total number of pieces of line-of-sight data in judgement time}}$$

Occurrence rate #4 =

$$k \times \frac{\sum_{i=0}^{N} \delta(i=A) \times \{\delta(\text{left line of sight}) + \delta(\text{right line of sight})\} \times \text{weight at time when line-of-sight data } i \text{ acquired}}{\text{the total number of pieces of line-of-sight data in judgement time}}$$

The confidence level calculation unit 17 calculates the confidence level of the estimation result of the attentive watching state estimated by the attentive watching state estimation unit 15, based at least one of the error of the area of interest calculated by the area-of-interest error calculation unit 14, and the configuration state of the line-of-sight data calculated by the line-of-sight data configuration calculation unit 16.

More specifically, for example, the confidence level calculation unit 17 calculates the confidence level according to equation (10) described below.

Confidence level=$t \times$(one of occurrence rates)+$(1-t) \times$
(1/total error of the area of interest) (10)

In the above equation, the "one of occurrence rates" is one of occurrence rates #1 to #4 calculated to represent the configuration state of the line-of-sight data by the line-of-sight data configuration calculation unit 16, and t is an arbitrary parameter in a range of $0 \leq t \leq 1$. Use of t makes it possible to calculate the confidence level taking into account which factor is more important in the calculation of the confidence level, the line of sight configuration state or the error of the area of interest, which makes it possible to perform the final evaluation on the visual confirmation using the confidence level calculated taking into account which factor is more important. In the example illustrated in FIG. 7, in the column of the "confidence level calculation condition" of the table, "configuration" indicates that the confidence level is to be calculated using only the configuration state of line-of-sight data, while "configuration+area" indicates that the confidence level is to be calculated using both the configuration state of line-of-sight data and the error of the area of interest.

Instead of using only one occurrence rate in the configuration state of the line-of-sight data, a plurality of occurrence rates may be used. In a case where two occurrence rates are used, the two occurrence rates may be unified into one value using an arbitrary parameter as described in equation (11).

Confidence level=$s \times$(occurrence rate #1)+$t \times$(occurrence rate #2)+$(1-s-t) \times$(1/total error of the area of interest). (11)

In equation (11), s and t are arbitrary parameters in ranges of $0 \leq s \leq 1$, $0 \leq t \leq 1$, and $0 \leq (s+t) \leq 1$. In a case where three or more occurrence rates are used, the three or more occurrence rates may be unified in to one value using arbitrary parameters in a similar manner.

Figure 24:
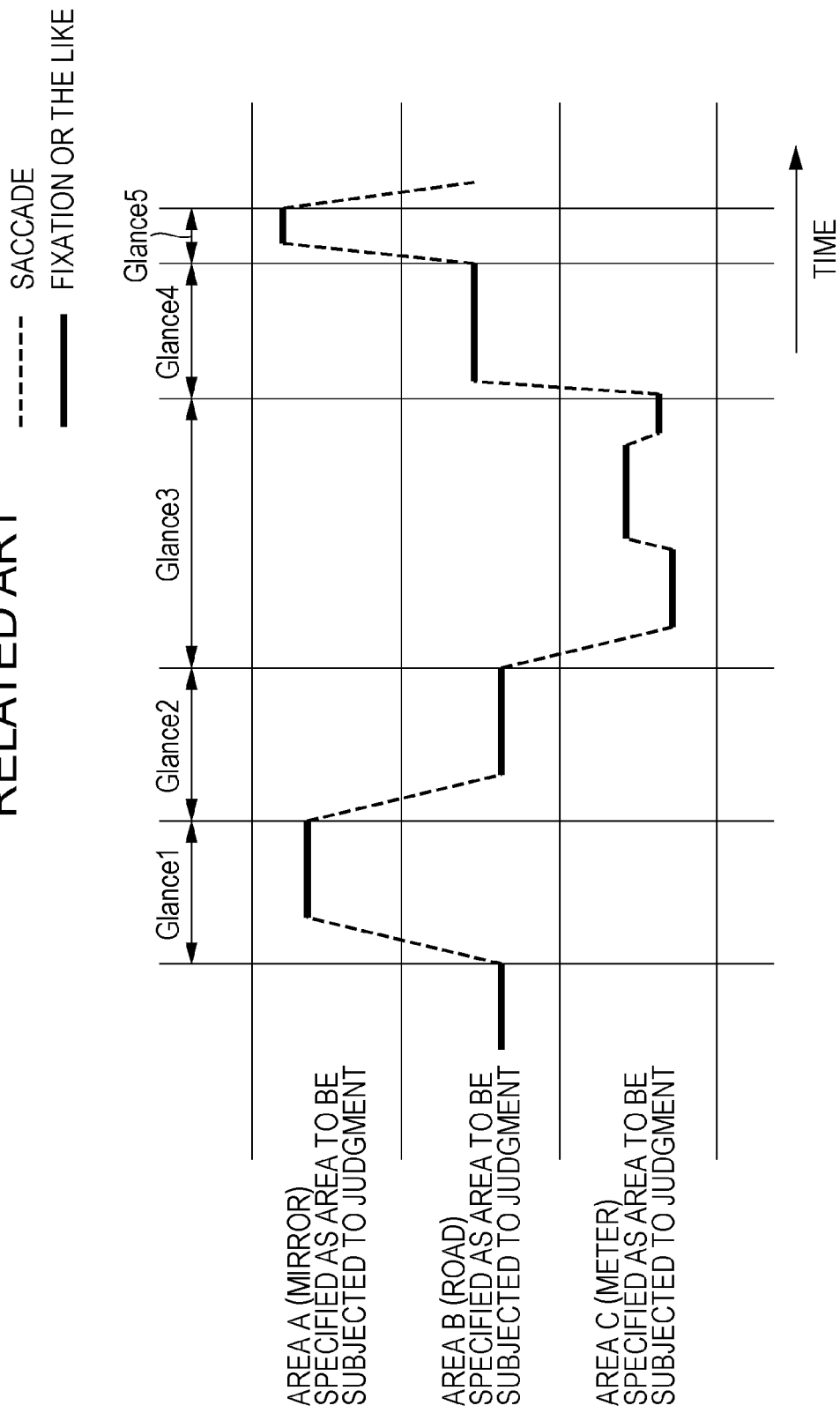
FIG. 24 is a diagram illustrating a visually confirming time according to related technique.

On the other hand, in the analysis according to the related technique using lines of sight (glance) after the clustering is performed, a visually confirming time spent for a target area includes a transit time in which a line of sight is moved to the target area as illustrated in FIG. 24. Therefore, the visually confirming time determined in this manner is useful to evaluate the visual confirmation in designing and evaluating a user interface of an in-vehicle device in terms of "how much time is spent to look at an area of interest". However, in the evaluation on the visual confirmation as to "whether a place, which is essentially important in driving, is looked at correctly and intentionally", only the line of sight staying time within the area of interest is useful, and the moving time of the line of sight between areas of interest is not desired and not useful.

Figure 25:
FIG. 25 is a diagram illustrating a manner of calculating an attentive watching rate according to a related technique.

Thus, instead, a line-of-sight data analysis method using raw line-of-sight data (gaze) already classified into types may be used. However, in this case, in the related technique, the ratio of fixation data in the area of interest to the total number of pieces of fixation data is simply used, and no consideration is taken into account as to how many pieces of fixation data occur in a judgment time or as to how many pieces of invalid line-of-sight data occur. Therefore, when there are both saccade and fixation in a judgment time, there is a possibility as illustrated, for example, in FIG. 25 that the analysis results in an equal "attentive watching rate" for both cases: a case where actually little fixation occurs; and a case where most lines of sight are of fixation. That is, in one case, there is only one piece of line-of-sight data representing fixation in a total of 30 pieces of line-of-sight data in the judgment time, and this only one piece of line-of-sight data is regarded as a line of sight to the target area. In the other case, a total of 30 pieces of line-of-sight data in the judgment time are all line-of-sight data representing fixation, and all these 30 pieces of line-of-sight data are regarded as lines of sight to the target area. In this case, the driver's "attentive watching rate" to the target area is equal for both cases. As a result, even in the time period in which there is actually little fixation and thus substantially "no intentional looking is performed", the estimation result on the attentive watching state is similar to the case in which intentional looking is performed over almost whole time period.

Furthermore, in the related technique, an in-vehicle device, various mirrors, a forward area that is to be looked at during a driving operation are defined as target areas, and visually confirming times spent for them are analyzed. However, influences of errors of the position and the shape of each target area are not taken into account. To detect occurrence of looking away from the forward sight, among various target areas, it is important to analyze the line-of-sight state associated with the target area in the forward direction. However, unlike the target area associated with an in-vehicle part or the like, the area is not fixed to the vehicle and the shape and the position of the area depend on the surrounding environment (shape of the driving road, state of surrounding vehicles, and the like) and the vehicle driving state (position, speed, steering state, and the like). That is, the area changes greatly as the vehicle travels, and it is very difficult to strictly determine the target area.

The error of such an area may be absorbed by binarization, that is, by determining whether the line of sight falls within or outside the target area. However, in some cases, as with the case of driving along a curved road, a slight change in the vehicle position results in a great change in the target position that is being looked at during the driving of the vehicle. Depending on the driving situation, the driver's point of view varies among drivers, and it is difficult to uniquely determine the driver's point of view. In such cases, a large error occurs in the location and the shape of the target area, which is not a small area that may be absorbed by binarization, that is, by determining whether the line of sight close to the boundary of the target area falls within or outside the target area. Besides, to evaluate not whether the target area is "looked at or not", but how the target area is being looked at, binarization is not effective to absorb the error.

In the present embodiment, in view of the above, based on the error of the area of interest in terms of the position and the shape of the set area of interest and the configuration state of the line-of-sight data in the judgment time, the confidence level calculation unit 17 calculates the confidence level indicating the degree to which the estimated attentive watching state is reliable. This makes it possible to perform the evaluation on the visual confirmation based on the estimation result of the attentive watching state taking into account the situations described above.

The employability determination unit 18 determines whether the estimation result on the attentive watching state in each judgment time estimated by the attentive watching state estimation unit 15 is allowed to be used in evaluating the visual confirmation by the visual confirmation evaluation unit 19 (described later) by comparing the confidence level calculated by the confidence level calculation unit 17 with a confidence level threshold value. When the estimation result on the attentive watching state is determined not to be allowed to be used in the evaluation on the visual confirmation, the process following that is not performed. That is, when the confidence level is low, the evaluation on the visual confirmation is not performed, and thus a wrong evaluation result is not output, and an excessive reaction to the wrong evaluation result is avoided by the user. For example, use of the estimation result with low confidence level may cause insufficient visual confirmation (looking away from the forward sight) to be detected excessively, which may cause a warning sound to a driver, which is one of driver support operations, to be generated excessively. The above-described situation is handed by not using the estimation result on the attentive watching state with the low confidence. In a case where occurrence of excessive reaction due to excessive detection is allowed, but it is more important not to miss an occurrence of an event to be detected, the confidence level threshold value to be compared with the confidence level may be set to a low value, or the employability determination unit 18 itself may be removed. The employability determination unit 18 may dynamically change a manner of handling the excessive detection depending on the driving situation. In this case, the confidence level threshold value may be varied depending on the driving situation.

In a case where the subject of evaluation corresponds to a plurality of area of interests, the confidence level threshold value is set to a rather low value. In the case where there are plurality of area of interests, a natural result of this is that the line of sight tends to move among the area of interests. Therefore, in this situation, a reduction in confidence level caused by movement of the line of sight is allowed.

For the subject of evaluation on a driving situation in which the attentive watching behavior is different greatly among drivers, the confidence level threshold value may be set to a rather lower value so that a rather low confidence level is accepted. Referring to FIG. 7, examples of subject of evaluations of the driving situation in which the attentive watching behavior varies greatly depending on the driver are the evaluation on forward visual confirmation Q on a curved road, the evaluation on visually confirming a traffic signal T in which the determination of the position of a traffic signal tend to have an error, the evaluation on visual confirmation in making a right turn U in which an error tend to occur due to an unclear definition of the area of interest in making the turn right.

In a case where a rear-view mirror, which is one of mirrors or in-vehicle devices, is looked at for confirmation, when the rear-view mirror is looked at for confirmation before a lane is changed, there is little difference in the manner of looking at the rear-view mirror among drivers. However, in a case where the rear-view mirror is looked at when the vehicle is driven in a reverse direction, the driver likely change his/her posture when looking at the rear-view mirror. This may result in an increase in occurrence of line-of-sight data that is invalid due to the change in position of the driver and an increase in occurrence of line-of-sight data classified as data not to be subjected to judgment. To handle the above situation, taking into account the reduction in accuracy of estimation on the line-of-sight direction due to a change in driver's posture, the latter confidence level threshold value may be set to be further lower.

In the evaluation on visual confirmation in back side direction X before the lane is changed, the area of interest is set on the right side-view mirror. However, there is a possibility that the driver changes his/her position and performs the backward visual conformation by directly looking at a backward sight without looking at the right side-view mirror. Thus, taking into account the possibility of the reduction in estimation accuracy of the direction of the line of sight due to the change in the position of the driver, the confidence level threshold value may be set to a rather low value.

As to the evaluation on inattentive watching R in the driving situation of the "driving along a congested road", it is widely known that the line of sight moves to a certain degree even in a non-inattentive state. In view of the above, the confidence level threshold value may be set to a rather low value such that an evaluation on the visual confirmation is performed even in a case where there occurs, due to an increase in the motion of the line of sight, an increase in the ratio of the number of pieces of line-of-sight data (saccade) classified as data not to be subjected to the judgment to the total number of pieces of line-of-sight data in the line of sight configuration state. In the driving situation of the "driving along a congested road", it is specified to evaluate two subject of evaluations. Although these to subject of evaluations are evaluated for the same area of interest, the confidence level threshold value for the evaluation on forward visual confirmation P' may be set to be higher than the confidence level threshold value for the evaluation on inattentive watching R.

Note that the setting of the confidence level threshold value has been described by way of example only, and the confidence level threshold value may be set to a higher or lower arbitrary value. Instead of determining the confidence level threshold value depending on the driving situation, the confidence level threshold value may be set taking additionally into account more detailed vehicle state information and surrounding state information. For example, in the driving situation of the "driving straight on express way", the confidence level threshold value may be reduced slightly as the vehicle speed increases such that the probability of missing the detection is reduced. On the other hand, as the number of moving bodies in the surrounding environment increases (as the degree of congestion increases), the confidence level threshold value may be reduced slightly.

The employability determination unit 18 may determine whether the estimation result on the attentive watching state in the judgment time of interest is allowed to be used or not based on not only the confidence level in the judgment time of interest but also a change in confidence level from a nearby judgment time to the judgment time of interest. For example, in a case where the confidence level having a high level in the previous judgment time decreases abruptly in the present judgment time, it is determined that a great change in movement of the line of sight occurs, the evaluation on the visual confirmation may not be performed. On the other hand, in a case where a confidence level lower than the confidence level threshold value occurs successively a greater number of times than a predetermined value, the confidence level threshold value may be changed such that the estimation result on the attentive watching state is allowed to be used in the evaluation on the visual confirmation. By detecting a temporary reduction in confidence level from a change in confidence level with passage of time, it becomes possible not to perform the evaluation on the visual confirmation in a situating in which there is a high probability that the sensor error is increased by a large change in driver's posture or a sudden degradation in measurement environment.

Among estimation results on attentive watching states in a plurality of continuous judgment times, only attentive watching states estimated by the employability determination unit 18 as being employable are used by the visual confirmation evaluation unit 19 in evaluating the visually confirming behavior of the driver depending on the driving situation.

For example, in the attentive watching state estimated by the employability determination unit 18 as being employable, when the visual confirmation evaluation unit 19 detects an occurrence of insufficient visual conformation on the area of interest, the visual confirmation evaluation unit 19 determines that there is a possibility that "looking away from the area of interest is occurring". When the state of "possibly looking away from the area of interest" successively occurs a predetermined number of time, then the visual confirmation evaluation unit 19 determines that looking away from the area of interest is occurring and outputs a result of an evaluation on the visual confirmation indicating that looking away is occurring. The output result of the evaluation on the visual confirmation is input to a supporting apparatus such as a warning apparatus or the like configured to output a warning to the driver to support the driver.

When the visual confirmation evaluation unit 19 determines whether the attentive watching state being evaluated is successively occurring the predetermined number of times, when an estimation result indicating unemployability occurs, that is, when a discontinuity occurs, the visual confirmation evaluation unit 19 performs evaluation by selecting one of the following options.

1. It is determined that an estimation result different from the continuing estimation result has occurred (it is determined that a discontinuation has occurred).
2. It is determined that the same estimation result as the continuing estimation result is still continuing (the estimation result obtained this time is regarded as the continuation).
3. The estimation result indicating the employability is skipped, and the continuing state is maintained (the estimation result obtained this time is ignored).

Figure 26:
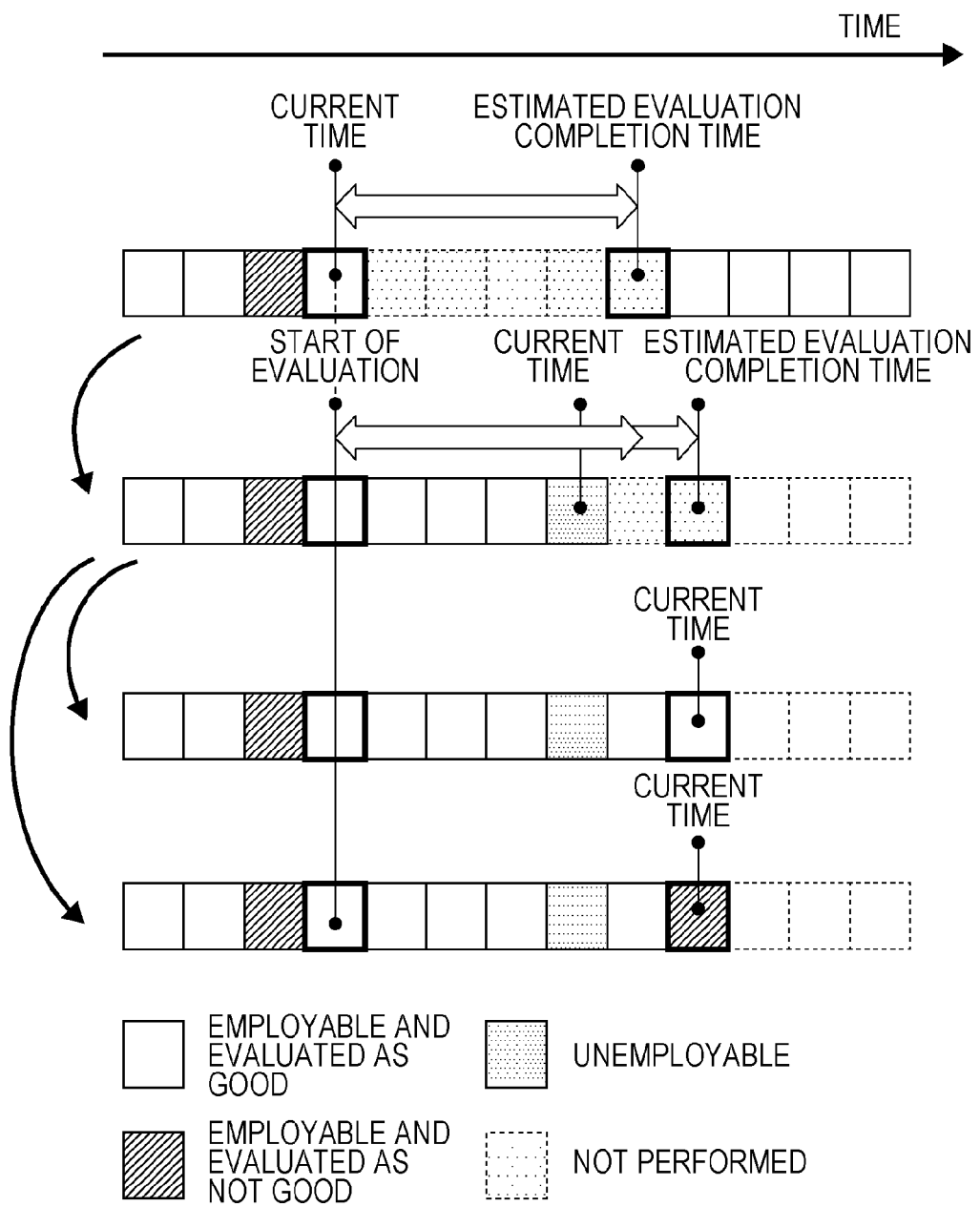
FIG. 26 is a diagram illustrating an example of an evaluation of a visual confirmation.

When option 3 is employed, the judgment time of the skipped estimation result is added to the period of time from the start of the evaluation to the point of time at which time corresponding to the predetermined number of judgment times will elapse, that is, the predicted end time of the evaluation, that is, the total judgment time is extended as illustrated in FIG. 26.

The determination on which option is selected may be made based on the result of the evaluation on the visual confirmation taking into account what kind of support to the driver is to be performed.

The predetermined number of continuous occurrences of the estimation result on the attentive watching state in the evaluation on the visual confirmation may be fixed or may be adjusted using the confidence level. For example, when the confidence level is low, the number and the evaluation time are increased. On the other hand, when the confidence level is high, the number and the evaluation time are reduced. Thus, unlike the conventional technique, even in the case where there is only estimation result on the attentive watching state with low confidence level resulting from the error of the area of interest and the configuration state of the line-of-sight data, it is possible to suppress the occurrence of excessive detection by extending the evaluation time.

Figure 27:
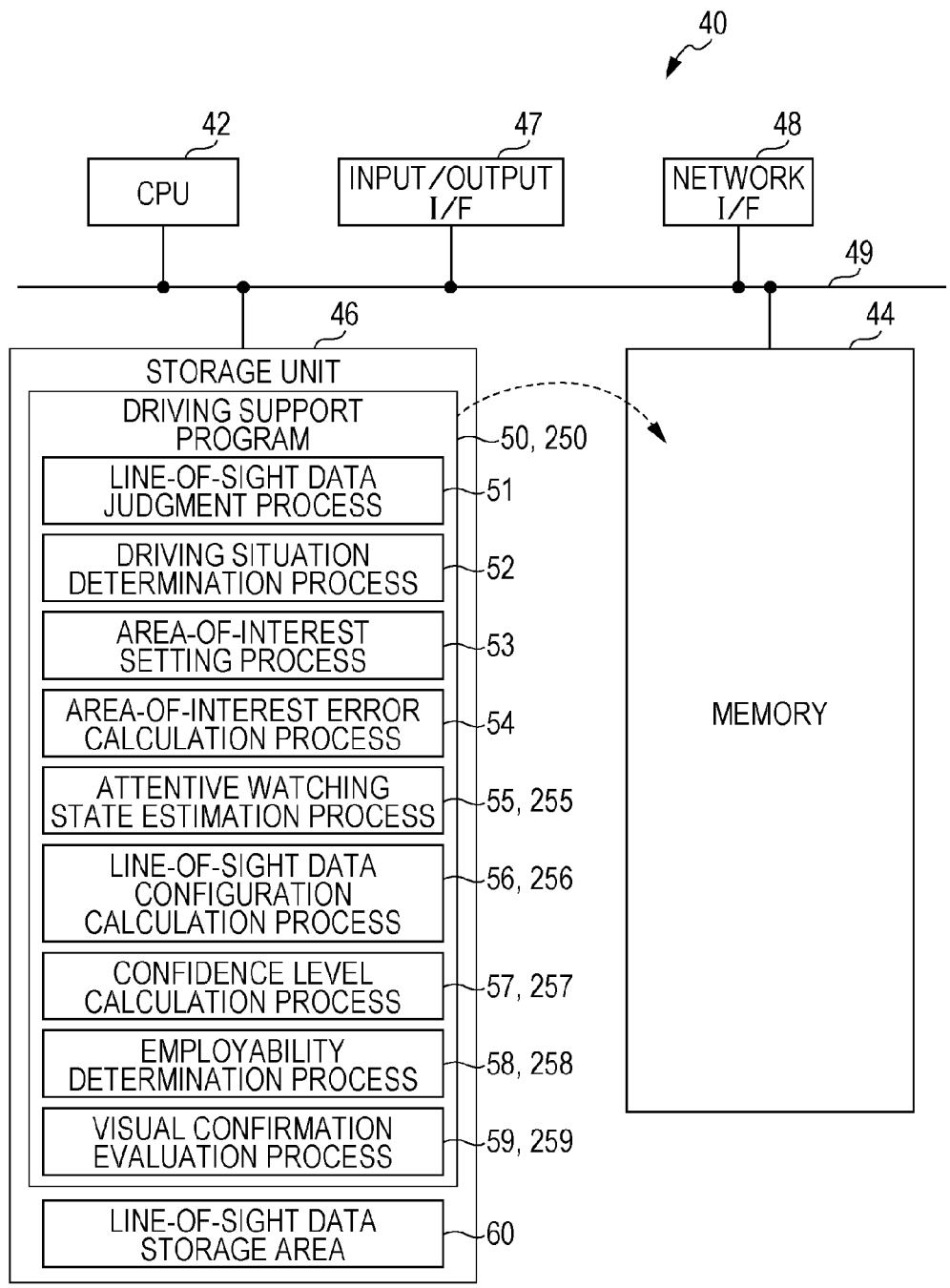
FIG. 27 is a block diagram illustrating a configuration of an in-vehicle computer functioning as a driving support apparatus according to a first embodiment or a second embodiment.

The driving support apparatus 10 may be realized, for example, using an in-vehicle computer 40 illustrated in FIG. 27. The in-vehicle computer 40 includes a CPU 42, a memory 44, a nonvolatile storage unit 46, an input/output interface (I/F) 47, and a network I/F 48. The CPU 42, the memory 44, the storage unit 46, the input/output I/F 47, and the network I/F 48 are coupled to each other via a bus 49. The driving support apparatus 10 is coupled to a line-of-sight sensor 91, a vehicle state acquisition sensor 92, and a surrounding state acquisition sensor 93 via the input/output I/F 47 or the network I/F 48.

The storage unit 46 may be realized using a hard disk drive (HDD), a flash memory, or the like. In the storage unit 46 functioning as a storage medium, a driving support program 50 for allowing the in-vehicle computer 40 to function as the driving support apparatus 10 is stored. The storage unit 46 includes a line-of-sight data storage area 60. The CPU 42 reads out the driving support program 50 from the storage unit 46, loads it in the memory 44, and sequentially executes processes included in the driving support program 50.

The driving support program 50 includes a line-of-sight data judgment process 51, a driving situation determination process 52, an area-of-interest setting process 53, an area-of-interest error calculation process 54, an attentive watching state estimation process 55, and a line-of-sight configuration state calculation process 56. The driving support program 50 further includes a confidence level calculation process 57, an employability determination process 58, and a visual confirmation estimation process 59.

The CPU 42 operates as the line-of-data judgment unit 11 illustrated in FIG. 1 by executing the line-of-sight data judgment process 51. The CPU 42 operates as the driving situation determination unit 12 illustrated in FIG. 1 by executing the driving situation determination process 52. The CPU 42 operates as the area-of-interest setting unit 13 illustrated in FIG. 1 by executing the area-of-interest setting process 53. The CPU 42 operates as the area-of-interest error calculation unit 14 illustrated in FIG. 1 by executing the area-of-interest error calculation process 54. The CPU 42 operates as the attentive watching state estimation unit 15 illustrated in FIG. 1 by executing the attentive watching state estimation process 55. The CPU 42 operates as the line-of-sight data configuration calculation unit 16 illustrated in FIG. 1 by executing the line-of-sight configuration state calculation process 56. The CPU 42 operates as the confidence level calculation unit 17 illustrated in FIG. 1 by executing the confidence level calculation process 57. The CPU 42 operates as the employability determination unit 18 illustrated in FIG. 1 by executing the employability determination process 58. The CPU 42 operates as the visual confirmation evaluation unit 19 illustrated in FIG. 1 by executing the visual confirmation estimation process 59.

Thus, the in-vehicle computer 40 functions as the driving support apparatus 10 by executing the driving support program 50. In the case where the in-vehicle computer 40 functions as the driving support apparatus 10, the line-of-sight data storage area 60 functions as the line-of-data storage unit 20 illustrated in FIG. 1.

The driving support apparatus 10 may be realized using, for example, a semiconductor integrated circuit, and more specifically, an application specific integrated circuit (ASIC) or the like.

Next, referring to FIG. 28 and FIG. 29, an operation according to the first embodiment is described below for the case where the driving support process is realized by executing the driving support program 50 by the CPU 42 of the in-vehicle computer 40.

Figure 28:
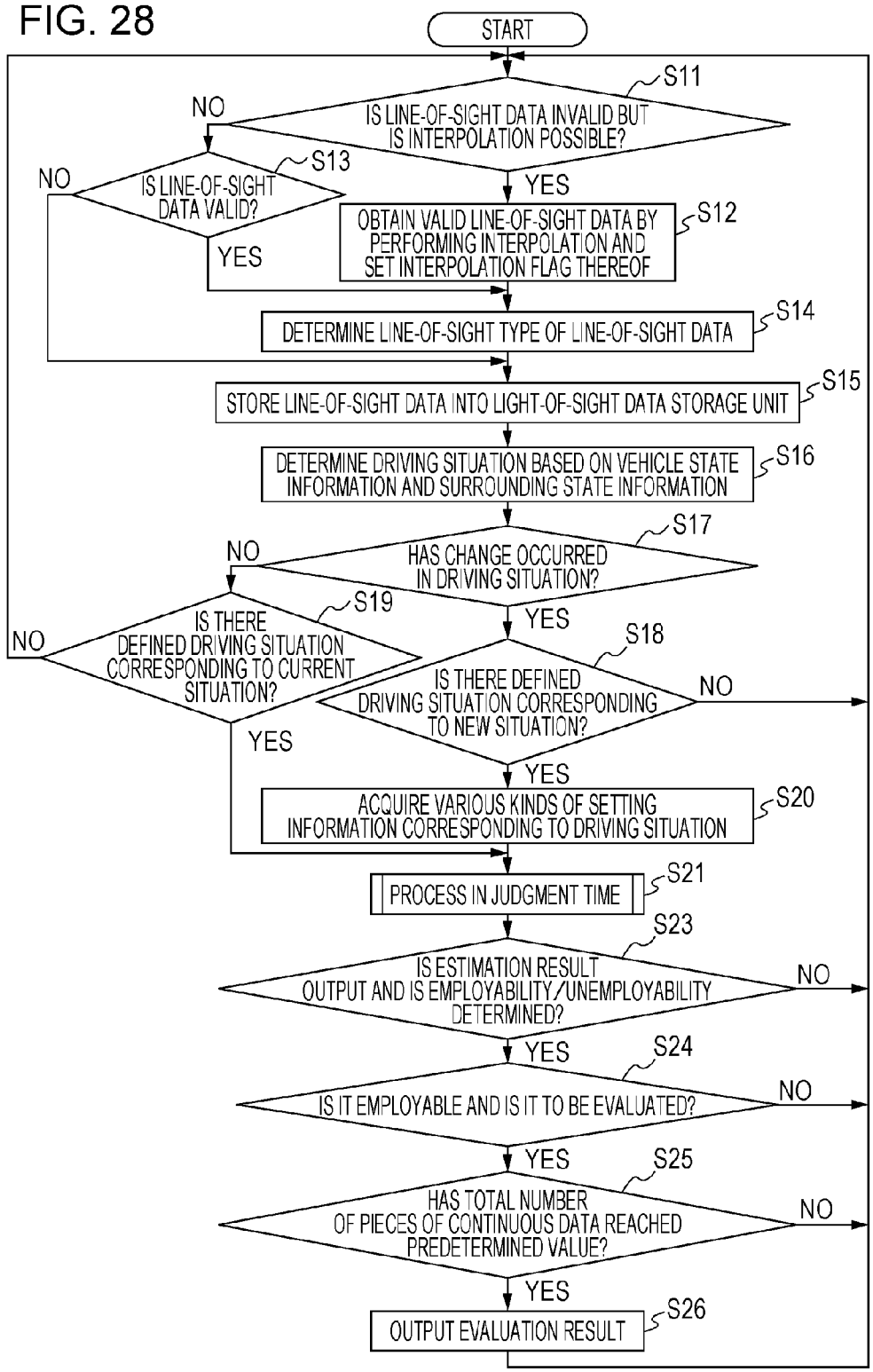
FIG. 28 is a flow chart illustrating an example of a driving support process.

In step S11 of the driving support process illustrated in FIG. 28, the line-of-data judgment unit 11 acquires line-of-sight data output from the line-of-sight sensor 91. The line-of-data judgment unit 11 determines whether the acquired line-of-sight data is invalid but it is possible to interpolate a value thereof. In a case where the acquired line-of-sight data is invalid but it is possible to interpolate the value thereof, the processing flow proceeds to step S12. On the other hand, in a case where the acquired line-of-sight data is valid or in a case where the acquired line-of-sight data is invalid and it is impossible to interpolate the value thereof, the processing flow proceeds to step S13.

In step S12, the line-of-data judgment unit 11 acquires a value for the line-of-sight data determined to be invalid by performing interpolation using valid line-of-sight data acquired at other different times. The line-of-data judgment unit 11 applies a label, indicating that the interpolation is performed, to the line-of-sight data whose value is obtained by the interpolation and further applies a label thereto to indicate that the line-of-sight data is judged as "valid". The processing flow then proceeds to step S14.

On the other hand, in step S13, the line-of-data judgment unit 11 determines whether the acquired line-of-sight data is valid or not. In a case where the acquired line-of-sight data is valid, the line-of-data judgment unit 11 applies a label indicating that the line-of-sight data is judged as "valid" to the acquired line-of-sight data. The processing step then proceeds to step S14. On the other hand, in a case where the acquired line-of-sight data is not valid, the line-of-data judgment unit 11 applies a label indicating that the line-of-sight data is judged as "invalid" to the acquired line-of-sight data. The processing step then proceeds to step S15.

In step S14, the line-of-sight data judgment unit 11 determines, from a change in value of line-of-sight data in a predetermined time, the type of the line of sight of the line-of-sight data acquired this time, and the line-of-sight data judgment unit 11 applies a label indicating the determined type of the line of sight to the line-of-sight data.

Next, in step S15, the line-of-sight-data judgment unit 11 stores the acquired line-of-sight data and the line-of-sight data with the interpolated value in relation to the corresponding type of the line-of-sight data in the line-of-sight data storage unit 20.

Next, in step S16, the driving situation determination unit 12 acquires vehicle state information output from the vehicle state acquisition sensor 92 and surrounding state information output from the surrounding state acquisition sensor 93. Using the acquired vehicle state information and surrounding state information, the driving situation determination unit 12 determines a current driving situation of the vehicle from driving situations, for example, such as those illustrated in FIG. 7.

Next, in step S17, the driving situation determination unit 12 determines whether a change has occurred in the driving situation, that is, whether the driving situation determined this time has changed from that determined at a previous time. In a case where a change has occurred, the processing flow proceeds to step S18 but otherwise the processing flow proceeds to step S19.

In step S18, the driving situation determination unit 12 determines whether there is a new driving situation or the current situation does not correspond to any driving situation. In a case where there is a new driving situation, the processing flow proceeds to step S20. However, in a case where the current situation does not correspond to any driving situation, the processing flow returns to step S11. In step S20, the driving situation determination unit 12 acquires various kinds of information including a subject of evaluation, a judgment time, and the like corresponding to the determined driving situation from the table, for example, such as that illustrated in FIG. 7.

On the other hand, in step S19, the driving situation determination unit 12 determines whether the situation is currently in one of driving situations. In a case where the situation is currently in one of driving situations, the processing flow proceeds to step S21, but otherwise the processing flow returns to step S11.

Figure 29:
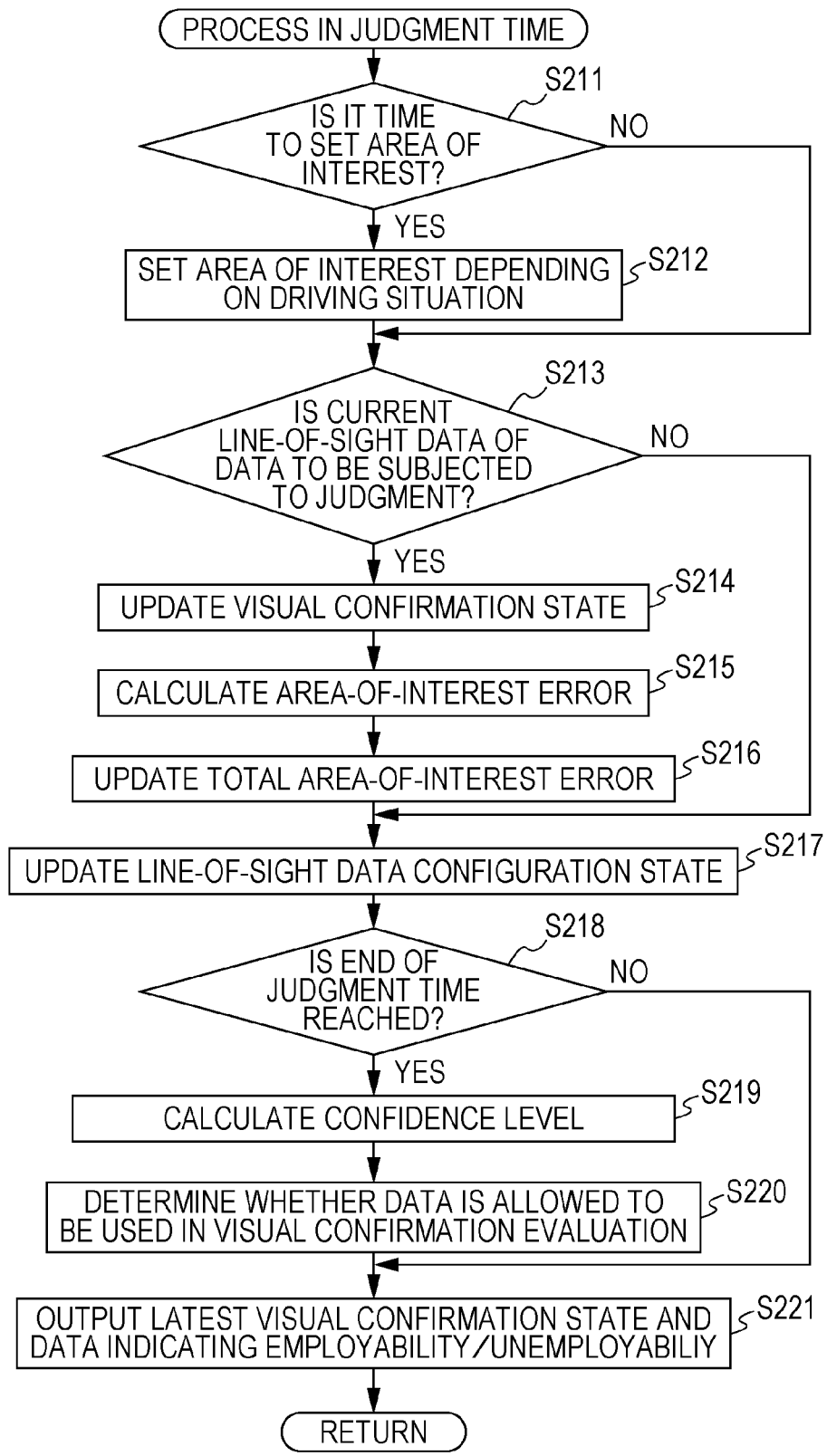
FIG. 29 is a flow chart illustrating an example of a process in the judgment time.

In step S21, the process in the judgment time illustrated in FIG. 29 is performed.

In step S211 in the process in the judgment time illustrated in FIG. 29, the area-of-interest setting unit 13 determines whether it is a first setting time to set the area of interest or it is time to update the setting of the area of interest. In a case where it is time to perform the first setting or updating of the setting, the processing flow proceeds to step S212 in which the area-of-interest setting unit 13 sets the area of interest depending on the determined driving situation and the acquired subject of evaluation. In a case where it is neither the first setting time nor the time to perform the updating, the processing flow proceeds to step S213.

In step S213, the attentive watching state estimation unit 15 determines whether the current line-of-sight data is of a type that is to be subjected to the judgment. In a case where the current line-of-sight data is valid and the type of the line of sight thereof is not the saccade, the attentive watching state estimation unit 15 determines that the current line-of-sight data is to be subjected to the judgment, and the processing flow proceeds to step S214. On the other hand, in a case where the current line-of-sight data is invalid or the type of the line of sight thereof is the saccade, the attentive watching state estimation unit 15 determines that the line-of-sight data is not to be subjected to the judgment, and the processing flow proceeds to step S217.

In step S214, the attentive watching state estimation unit 15 updates the attentive watching state as of the current judgment time. For example, the attentive watching state estimation unit 15 may employ, as the attentive watching state, one of the attentive watching rate #1, attentive watching rate #2, attentive watching time #3, and occupation ratio #4. The attentive watching state estimation unit 15 determines the type of the current line-of-sight data and determines whether the line-of-sight data is included in the area of interest. Depending on the determination result, the attentive watching state estimation unit 15 updates the attentive watching state.

Next, in step S215, the area-of-interest error calculation unit 14 calculates the error of the area of interest in terms of at least either the position or the shape of the area of interest set in step S212 according to, for example, equation (3), equation (4), equations (7) to (9), or the like.

Next, in step S216, the area-of-interest error calculation unit 14 updates the total error of the area of interest using the error of the area of interests calculated already in the same judgment time and the error of the area of interest calculated at this time.

Next, in step S217, line-of-sight data configuration calculation unit 16 updates, for example, one of the occurrence rates #1 to #4 indicating the configuration state of the line-of-sight data in the judgment time based on the type of current line-of-sight data and whether interpolation is performed or not.

Next, in step S218, the attentive watching state estimation unit 15 determines whether the judgment time has expired or not. In a case where the judgment time has expired, the processing flow proceeds to step S219, but otherwise the processing flow proceeds to step S221.

In step S219, the confidence level calculation unit 17 calculates the confidence level of the estimation result of the attentive watching state based on at least either the total error of the area of interest updated in step S216 or the configuration state of the line-of-sight data updated in step S217. The confidence level calculation unit 17 may calculate the confidence level, for example, according to equation (10), equation (11), or the like.

Next, in step S220, the employability determination unit 18 determines whether the estimation result of the attentive watching state updated in step S214 is adequate to be used in the evaluation on the visual confirmation by comparing the confidence level calculated in step S219 with the confidence level threshold value.

Next, in step S221, the visual confirmation evaluation unit 19 outputs the estimation result of the latest attentive watching state updated in step S214. In a case where the processing flow proceeds to step S221 via steps S219 and S220, the information as to the employability/unemployability determined in step S220 is also output. Thereafter, the processing flow returns to the driving support process illustrated in FIG. 28.

Next, in step S23, the visual confirmation evaluation unit 19 determines whether the estimation result is output in step S221 together with information indicating the employability/unemployability. In a case where the information indicating the employability/unemployability is not output together with the estimation result, the judgment time has not yet expired, and thus processing flow returns to step S11. On the other hand, in a case where the information indicating the employability/unemployability is output together with the estimation result, the processing flow proceeds to step S24.

In step S24, the visual confirmation evaluation unit 19 determines whether the estimation result output in step S221 is adequate to be used and whether the attentive watching state indicated by the estimation result is on the target of interest. In a case where the employability is "employable" and the estimation result is on the target of interest, the processing flow proceeds to step S25. However, in a case where the employability is "unemployable" or the estimation result is not on the target of interest, the processing flow returns to step S11.

In step S25, the visual confirmation evaluation unit 19 determines whether the number of continuous occurrences of the estimation result indicating the attentive watching state on the target of interest has reached a predetermined value. In a case where the number of continuous occurrences has reached the predetermined value, the processing flow proceeds to step S26, but otherwise the processing flow returns to step S11.

In step S26, the visual confirmation evaluation unit 19 outputs information indicating that the number of continuous occurrences of the estimation result indicating the attentive watching state on the target of interest has reached the predetermined value and also the result of the evaluation on the visual confirmation indicating that the visually confirming behavior of interest has been observed. The processing flow then returns to step S11.

In the driving support apparatus according to the present embodiment, as described above, when the visual confirmation state on the area of interest set depending on the current driving situation is evaluated from the current line-of-sight data (direction of the line of sight) of the driver, the confidence level is calculated in each judgment time in which the attentive watching state is estimated. This confidence level, unlike that according to the conventional technique, is calculated taking into account the configuration state of the line-of-sight data based on whether the line of sight is of the state of "intentionally looking" and also taking into account a setting error of an area of interest that is dynamically set. This may allow it to detect how reliable the estimation result is as to the attentive watching state on the area of interest.

Use of the confidence level makes it possible to evaluate the visual confirmation state in more detail depending on the driving situation. More specifically, for example, for a driving situation in which the area to be attentively watched varies largely depending on the driver and it is difficult to set the area of interest, the error of the area of interest and the threshold value on the confidence level determined from the error of the area of interest may be adjusted such that the occurrence of excessive detection is more effectively reduced. Furthermore, by dynamically adjusting the threshold value on the confidence level depending on the vehicle state or the environment state, there is possibility to evaluate the state of looking and confirming such that the occurrence of missing an event to be detected is suppressed for the driving situation in which the emergency level is high.

Furthermore, in a case where the line-of-sight data includes a small number of pieces of valid data or includes a large number of pieces interpolated data, or the line-of-sight data includes a small number of lines of sight with an intention of looking, it is ensure to perform the evaluation on the state of looking and confirmation only for line-of-sight data including a large number of lines of sight with an intention of looking. That is, there is possibility to perform the evaluation with low evaluation cost such that the evaluation is based not only on whether or not the line of sight hits an area of interest but based on whether or not the area of interest is really looked at, that is, based on the state of recognition in a human brain.

In addition to using the confidence level inside the technique disclosed herein, it is allowed to output the confidence level to an application using the technique disclosed herein thereby making it possible to detect a basis for the estimation on the attentive watching state. This makes it possible to flexibly use the estimation result on the attentive watching state. It may be allowed to use the technique disclosed herein in many apparatuses and systems such as a driving evaluation apparatus configured to evaluate an operation of driving a vehicle, a warning apparatus configured to give a warning in response to detecting insufficiency in confirming an environment state, an infrastructure building system in which looking away from a target to be attentively looked at is detected thereby allowing it to propose a plan to improve a road environment.

In the first embodiment described above, the explanation is given by way of example for the case where one type of area of interest is prepared for one subject of evaluation. However, alternatively, a plurality of types of area of interests may be prepared for one subject of evaluation. In this case, in addition to calculating the configuration state of the line-of-sight data in a similar manner to the first embodiment, the error of the area of interest is calculated for each area of interest. Furthermore, the confidence level is calculated for each area of interest, and the determination as to whether the data is allowed to be used in the visual confirmation evaluation unit 19 is performed for each area of interest, and the evaluation on the visual confirmation is performed for each area of interest. Based on all these evaluation results, the final evaluation on the visual confirmation is performed.

A further description is given below by way of example for a case where an area of interest depends greatly on a driver's attribute such as a forward visually confirming position or the like.

Unlike the first embodiment described above in which the area of interest on a forward road and the error of the area of interest thereof are determined for an average driver, the area-of-interest setting unit 13 and the area-of-interest error calculation unit 14 prepare area of interests and errors of area of interests for a plurality of driver's attributes. As for the error of the area of interest associated with each driver's attribute, the error (the standard deviation or the like) of the prescribed distance may be calculated for a group of drivers having only the driver's attribute of interest, and the calculated error may be employed. The attentive watching state estimation unit 15 estimates the attentive watching state for each area of interest in the set of area of interests associated with the respective driver's attributes, and the confidence level calculation unit 17 calculates the confidence level using the error of the area of interest for each area of interest. Using the plurality of attentive watching state estimation results and the confidence levels calculated above, the final attentive watching state and the confidence level are calculated.

More specifically, for example, the final attentive watching state and the final confidence level are calculated using statistical values, such as the maximum value, the minim value, the average value, the median value (the final values #1 to #4 described below) from the plurality of attentive watching states and confidence levels. Use of the final value #1 allows it to reduce the occurrence of missing of detection although the excessive detection may occur. Use of the final value #2 allows it to reduce the occurrence of excessive detection. Use of the final values #3 or #4 allows it to properly handle both the excessive detection and the missing of detection.

Final value #1=Min(values for respective area of interest)

Final value #2=Max(values for respective area of interest)

Final value #3=Average(values for respective area of interest)

Final value #4=Median(values for respective area of interest)

The employability determination unit 18 and the visual confirmation evaluation unit 19 are similar to those according to the first embodiment except that the final attentive watching state and the final confidence level are output.

Thus, in addition to the benefits obtained in the first embodiment described above, it may be allowed to obtain additional benefit that it is possible to perform the evaluation on the visual confirmation in more detailed manner.

Second Embodiment

Next, a second embodiment is described below. In the driving support apparatus according to the second embodiment, similar parts to those of the driving support apparatus 10 according to the first embodiment are denoted by similar reference symbols or reference numerals, and a further description thereof is omitted.

The driving support apparatus 210 according to the second embodiment includes functional units, that is, as illustrated in FIG. 1, a line-of-data judgment unit 11, a driving situation determination unit 12, an area-of-interest setting unit 13, an area-of-interest error calculation unit 14, an attentive watching state estimation unit 215, and a line-of-sight data configuration calculation unit 216. The driving support apparatus 10 further includes a confidence level calculation unit 217, an employability determination unit 218, and a visual confirmation evaluation unit 219.

The line-of-data judgment unit 11, as with the line-of-data judgment unit 11 according to the first embodiment, acquires the line-of-sight data output from the line-of-sight sensor 91 and determines the type of the acquired line-of-sight data. The line-of-data judgment unit 11 stores the acquired line-of-sight data together with a judgment result in the line-of-data storage unit 20. However, in the second embodiment, it is assumed that the line-of-data judgment unit 11 acquires left-eye line-of-sight data, right-eye line-of-sight data, and both-eye line-of-sight data, and judges the validity of each line-of-sight data. Note that the both-eye line-of-sight data is valid when at least either left-eye line-of-sight data or right-eye line-of-sight data is valid, the both-eye line-of-sight data is valid when both left-eye line-of-sight data and right-eye line-of-sight data are invalid.

The attentive watching state estimation unit 215, as with the attentive watching state estimation unit 15 according to the first embodiment, estimates the attentive watching state of the driver on the area of interest based on the area of interest set by the area-of-interest setting unit 13 and the direction of the line of sight represented by the line-of-sight data acquired in the judgment time. The attentive watching state estimation unit 215, to estimate the attentive watching state, calculates, for example, one of the attentive watching rate #1, the attentive watching rate #2, the attentive watching time #3, and the occupation ratio #4. In this calculation, the attentive watching state estimation unit 215 prepares a plurality of patterns in terms of methods of selecting line-of-sight data of the type A and line-of-sight data of the type B, and calculates one of the attentive watching rate #1, the attentive watching rate #2, the attentive watching time #3, and the occupation ratio #4 for each pattern.

More specifically, for example, as illustrated in a table of FIG. 30, a plurality of patterns are prepared in terms of line-of-sight data of the type A and line-of-sight data of the type B for use in estimating the attentive watching state, and a pattern number (No.) is assigned to each pattern. Hereinafter, a pattern with a pattern number of n is denoted as "pattern #n". In the example illustrated in FIG. 30, a pattern #1 defines line-of-sight data of the type A such that when left-eye line-of-sight data and right-eye line-of-sight data are both valid and the type of the line of sight thereof is not "saccade", the line-of-sight data is of the type A. A pattern #2 defines line-of-sight data of the type A such that both-eye line-of-sight data is valid, and the type of the line of sight thereof is not "saccade", the line-of-sight data is of the type A. Note that the both-eye line-of-sight data is valid when at least one of left-eye line-of-sight data and right-eye line-of-sight data is valid. Therefore, the pattern #2 may include a greater number of pieces of line-of-sight data than the pattern #1 in which both left-eye line-of-sight data and right-eye line-of-sight data are valid. In a pattern #3, line-of-sight data of the type A is defined such that when both-eye line-of-sight data is valid, the line-of-sight data is of the type A. In the pattern #3, unlike the patterns #1 and #2, there is no restriction on the type of line of sight, and thus the pattern #3 may include a greater number of pieces of line-of-sight data than the pattern #2.

In each pattern, line-of-sight data of the type B is defined such that the line-of-sight data of the type A is assumed to be line-of-sight data representing that the area of interest is being attentively watched, and the line-of-sight data of the type B includes line-of-sight data of the type A and line-of-sight data representing that the area of interest is not being attentively watched. For example, in the pattern #1, the line-of-sight data of the type B is defined such that left-eye line-of-sight data and right-eye line-of-sight data are both valid no matter what the type of the line of sight thereof is, and, among these pieces of line-of-sight data, line-of-sight data whose type of the line of sight is not "saccade" is defined as the line-of-sight data A. Alternatively, all line-of-sight data acquired in the judgment time may be defined as the line-of-sight data of the type B. The number of pieces of line-of-sight data acquired in the judgment time is equal to the number of pieces of data determined by the driving frequency or the like of the line-of-sight sensor 91. Still alternatively, the line-of-sight data of the type A may be defined such that no matter whether or not the type of the line of sight is saccade or any other type, when the validity of the line-of-sight data is valid, the line-of-sight data is of the type A, or when the validity of the line-of-sight data is valid and no interpolation is performed, the line-of-sight data is of the type A. Alternatively, when left-eye line-of-sight data and right-eye line-of-sight data are both valid and no interpolation is performed, the line-of-sight data may be defined as line-of-sight data of the type A. The above-described manner of selecting line-of-sight data of the type A and line-of-sight data of the type B is merely an example, and it is allowed to combine any other types of line-of-sight data stored in the line-of-data storage unit 20.

By defining the respective patterns of line-of-sight data of the type A and line-of-sight data of the type B such that the number of pieces of line-of-sight data varies stepwise among the patterns, it is possible to reduce the probability that it is not possible to estimate the attentive watching state. For example, in a case where only the pattern #1 is defined, when there is no line-of-sight data that satisfies the condition of the pattern #1, it is impossible to calculate the attentive watching rate #1, the attentive watching rate #2, the attentive watching time #3, or the occupation ratio #4. However, even when there is no line-of-sight data of the pattern #1, there is a possibility that line-of-sight data of the pattern #2 or the pattern #3 exists. Thus, defining a plurality of patterns, for example, as illustrated in FIG. 30 makes possible to increase the probability that the attentive watching rate #1, the attentive watching rate #2, the attentive watching time #3, or the occupation ratio #4 may be calculated for at least either one of the patterns.

The line-of-sight data configuration calculation unit 216, as with the line-of-sight data configuration calculation unit 16 according to the first embodiment, calculates the configuration state of the line-of-sight data based on the occurrence rates corresponding to plurality of pieces of line-of-sight data acquired in the judgment time. For example, the line-of-sight data configuration calculation unit 16 calculates one of the occurrence rates #5 to #8 for the line-of-sight data of the type A' according to the following equations.

$$\text{Occurrence rate \#5} = k \times \frac{\text{the number of pieces of line-of-sight data of type } A' \text{ in judgement time}}{\text{the number of pieces of line-of-sight data of type } B' \text{ in judgement time}}$$

$$\text{Occurrence rate \#6} = k \times \frac{\sum_{i=0}^{N} \delta(i = A') \times \text{weight defined depending on whether interpolation is performed}}{\text{the number of pieces of line-of-sight data of type } B' \text{ in judgement time}}$$

$$\text{Occurrence rate \#7} = k \times \frac{1}{\text{variance or standard deviation of positions of line-of-sight data of type } A' \text{ in judgement time}}$$

$$\text{Occurrence rate \#8} = k \times \frac{\sum_{i=0}^{N} \delta(i = A') \times \{\delta(\text{left line of sight}) + \delta(\text{right line of sight})\}}{\text{the number of pieces of line-of-sight data of type } B' \text{ in judgement time}}$$

Note that the occurrence rates #5 to #8 are similar to the occurrence rates #1 to #4 according to the first embodiment except that "A" is replaced by "A'" and "all lines of sight" are replaced by "type B'". The line-of-sight data of the type A' and the line-of-sight data of the type B' may be, as with the line-of-sight data of the type A and the line-of-sight data of the type B used by the attentive watching state estimation unit 215 in estimating the attentive watching state, may each be given by a combination of any types of line-of-sight data stored in the line-of-data storage unit 20. For example, any combination of valid line-of-sight data, line-of-sight data classified as data to be subjected to judgment, line-of-sight data classified as data not to be subjected to judgment (valid and saccade), and the like, may be employed so as to allow it detect the line of sight configuration state of interest.

The occurrence rates described above are used to detect the state of existence of line-of-sight data of the type A used by the attentive watching state estimation unit 215 in estimating the attentive watching state, and thus it is desirable that the type A' be the same as the type A if possible. Even in a case where the type A' is different from the type A, it is desirable that the type A' is as similar to the type A as possible. For example, when the type A is defined as "both-eye line-of-sight data is valid", to achieve as high similarity as possible, the type A' may be defined, for example, such that left-eye line-of-sight data and right-eye line-of-sight data are both valid. Similarly, the line-of-sight data of the type B' may be the same as the line-of-sight data of the type B. However, instead, when the line-of-sight data of the type B' is defined as all line-of-sight data acquired in the judgment time, then the denominator is given by a fixed value, which means that only the type A' is reflected in the occurrence rate, which results in a reduction in the number of factors that may change the occurrence rate. This results in an increase in stability in terms of time-dependent change in confidence level calculated from the occurrence rate as described later, and thus it becomes easier to set the threshold value used in estimating the confidence level.

The correspondence of the type A and the type B to the type A' and the type B' may be defined in advance in a table such as that illustrated in FIG. 30 used by the above-described attentive watching state estimation unit 215. The line-of-sight data configuration calculation unit 216 refers to this table and determines line-of-sight data of the type A' and line-of-sight data of the type B' for use in the calculation of the line of sight configuration state, corresponding to patterns of line-of-sight data of the type A and line-of-sight data of the type B used by the attentive watching state estimation unit 215. The line-of-sight data configuration calculation unit 216 then calculates one of the occurrence rates described above. In the calculation of the occurrence rates, weights may be used in a similar manner to the first embodiment in which the occurrence rates #1 to #4 are calculated using weights determined depending on the time in the judgment time at which line-of-sight data is acquired.

The confidence level calculation unit 217 calculates the confidence level for each pattern according to equation (12) described below using the occurrence rate calculated for each pattern by the line-of-sight data configuration calculation unit 216.

$$\text{Confidence level} = t \times (\text{one of occurrence rates}) \quad (12)$$

where t is an arbitrary parameter. In a case where the confidence level calculation condition (see FIG. 7) is defined as "configuration+area", the confidence level calculation unit 217 calculates the confidence level according to equation (10) used in the first embodiment. To distinguish between these two confidence levels, hereafter, the confidence level according to equation (10) is referred to as the "first confidence level", and the confidence level according to equation (12) is referred to as the "second confidence level".

For example, in the table such as that illustrated in FIG. 7, when the confidence level calculation condition is defined as "configuration", the first confidence level is the same of the second confidence level, and thus the "confidence level threshold value" in FIG. 7 may be used as the second confidence level threshold value. On the other hand, in a case where the confidence level calculation condition is defined as "configuration+area", The "confidence level threshold value" defined in FIG. 7 is that for the first confidence level in which the error of the area of interest is also taken into account, and thus, for the second confidence level, a dedicated threshold value is prepared. The second confidence level threshold value dedicated to the second confidence level may be adjusted depending on the driving situation described in FIG. 7 as with the first confidence level threshold value. The second confidence level threshold value may be the same for all patterns, or may be different among the patterns. In a case where the second confidence level threshold value is set to be different among the patterns, the second confidence level for each pattern may be determined from line-of-sight data obtained, for example, in test driving or the like, and a proper default value of the second confidence level threshold value for each pattern may be set based on the obtained second confidence level. The default threshold value may be properly adjusted based on the second confidence level obtained from line-of-sight data in an actual driving operation.

Furthermore, as illustrated in FIG. 30, the priority level may be set for each pattern, and the priority level corresponding to the pattern is applied depending on which pattern is used in calculating the first confidence level and the second confidence level.

The employability determination unit 218, as with the employability determination unit 18 according to the first embodiment, makes a determination based on the confidence level calculated by the confidence level calculation unit 217 as to whether the result of the estimation by the attentive watching state estimation unit 215 as to the attentive watching state in each judgment time is employable or not in the evaluation on the visual confirmation performed by the visual confirmation evaluation unit 219. In the second embodiment, two types of confidence levels, that is, the first confidence level and the second confidence level are calculated, and the employability is determined differently from the first embodiment as described below.

The employability determination unit 218 selects a second confidence level with a highest priority level assigned thereto from a set of second confidence levels calculated for each pattern by the confidence level calculation unit 217, and determines whether the selected second confidence level is lower than the second confidence level threshold value. In a case where the selected second confidence level is lower than the second confidence level threshold value, the employability determination unit 218 selects a second confidence level with a next highest priority level and determines whether the selected second confidence level is lower than the second confidence level threshold value. In this manner, the employability determination unit 218 selects a second confidence level that has a highest priority level from the second confidence levels higher than the second confidence level threshold value. In a caser where the confidence level calculation condition is defined as only "configuration", the first confidence level is the same as the second confidence level, and thus when a second confidence level higher than the second confidence level threshold value may be selected, it is determined that the estimation result as to the attentive watching state in the judgment time of interest is allowed to be used.

In a case where the confidence level calculation condition is defined as the "configuration+area", the employability determination unit 218 determines whether the first confidence level corresponding in pattern to the second confidence level selected in the above-described manner is lower than the first confidence level threshold value. When the first confidence level is also higher than the first confidence level threshold value, then employability determination unit 218 determines that it is allowed to use the estimation result as to the attentive watching state in the judgment time of interest. In a case where the first confidence level corresponding in pattern to the selected second confidence level is lower than the first confidence level threshold value, the employability determination unit 218 repeats the process of selecting a second confidence level having a next highest priority level and being higher than the second confidence level threshold value. In a case where there is no first confidence level higher than the first confidence level threshold value and there is no second confidence level higher than the second confidence level threshold value, the employability determination unit 218 determines that it is not allowed to use the estimation result as to the attentive watching state in the judgment time of interest.

Alternatively, the employability determination unit 218 may first select all second confidence levels higher than the second confidence level threshold value and may compare a first confidence level corresponding in pattern to the selected second confidence levels with the first confidence level threshold value sequentially in order from highest priority level. In this case, at the stage of the process when a first confidence level higher than the first confidence level threshold value is found, the employability determination unit 218 determines that it is allowed to use the estimation result on the attentive watching state in the judgment time of interest. In a case where there is no first confidence level higher than the first confidence level threshold value, the employability determination unit 218 determines that it is not allowed to use the estimation result on the attentive watching state in the judgment time of interest.

Alternatively, regardless of whether the confidence level calculation condition is defined as only "configuration" or "configuration+area", the employability determination unit 218 may perform the determination based on only the second confidence level as to whether or not it is allowed to use the estimation result on the attentive watching state.

The visual confirmation evaluation unit 219 as with the visual confirmation evaluation unit 219 according to the first embodiment, evaluates the visually confirming behavior of the driver depending on the driving situation based on the attentive watching state indicated by the estimation result determined to be employable in the evaluation. For example, in a case where in the estimation results determined to be employable by the employability determination unit 18, an estimation result occurs that indicates that the attentiveness in watching the area of interest is low, the visual confirmation evaluation unit 219 judges that "there is a possibility that the line of sight is off the area of interest". The estimation result indicating low attentiveness in watching may occur, for example, when the attentive watching rate #1, the attentive watching time #3, or the occupation ratio #4 is low in value or when the attentive watching rate #2 is large in value. In this case, the visual confirmation evaluation unit 219 performs the evaluation based on the attentive watching state estimated using the line-of-sight data of the type A and the line-of-sight data of the type B indicated by the pattern corresponding to the priority level of the second confidence level or the first confidence level based on which the estimation result on the attentive watching state is determined to be employable by the employability determination unit 218.

The visual confirmation evaluation unit 219, as in the first embodiment, performs the evaluation on the visual confirmation based on whether an attentive watching state of interest being subjected to judgment occurs successively a predetermined number of times. In this evaluation, in a case where an estimation result indicating unemployability occurs, that is, in a case where a discontinuity occurs, the visual confirmation evaluation unit 219 estimates a cause of the occurrence of the discontinuity and handles the discontinuity depending on the estimated cause. The cause of the discontinuity may be a great change in orientation of a face or a head (hereinafter, referred to generically as face orientation) of a driver, or a disturbance to the line-of-sight sensor 91 such as a sensor error, a vibration, a reflection of light from glasses or the like. The visual confirmation evaluation unit 219 makes a determination based on only the line-of-sight data as to whether the cause of the discontinuity is the former one, that is, the great change in the face orientation. Depending on whether the cause is the great change in the face orientation or not, the visual confirmation evaluation unit 219 changes the manner of handling the attentive watching state of the time in which the discontinuity is occurring.

Herein it is assumed that when the determination is performed as to whether a large change in the face orientation is occurring, the current driving situation is a limited situation determined in advance at the installation position of the line-of-sight sensor 91. The limited situation is a situation set so as to include almost the whole area of interest in a driver's line-of-sight direction range measurable by the line-of-sight sensor 91. For example, in a case where the line-of-sight sensor 91 is configured to estimate the direction of the line of sight of the driver based on pupil reflex of the driver on a captured image, the direction of the line of sight of the driver physically measurable by the line-of-sight sensor 91 is limited. For example, in a case where driver's eyes are not captured in the image as in the case where the driver moves his/her face greatly away from the line-of-sight sensor 91, it is impossible to measure the direction of the line of sight, and thus the line-of-sight sensor 91 is capable of measuring the direction of the line of sight, in principle, only within a range of angle of view of a camera in which the direction of the line of sight is captured. This measurable range of the face orientation of the driver is referred to as a line-of-sight direction range.

Figure 31:
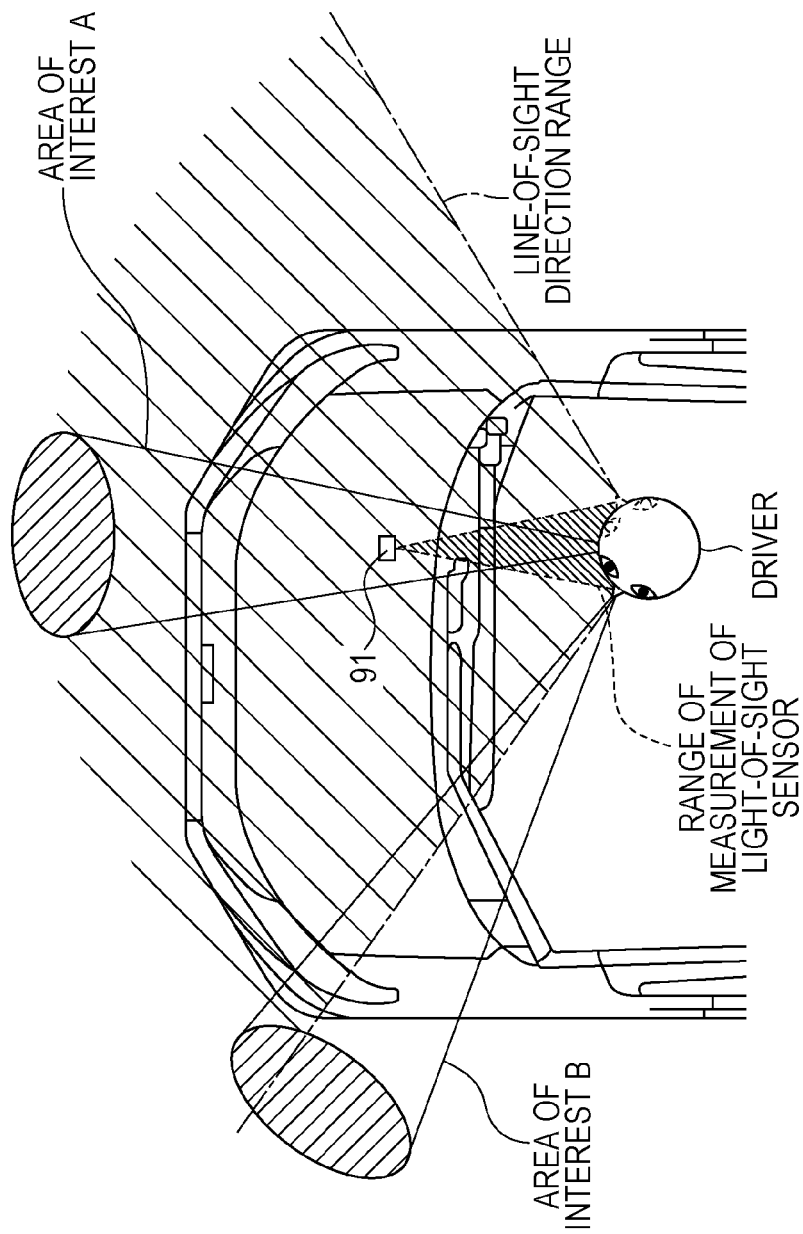
FIG. 31 is diagram illustrating a limited situation.

FIG. 31 illustrates an example of a relationship between a line-of-sight direction range and an area of interest. In FIG. 31, an area of interest A is an area of interest used in the evaluation on forward visual confirmation, and area of interest B is an area of interest that is to be looked at for confirmation when making a left turn or the like. The area of interest A is located in the same direction as the direction of the line-of-sight sensor 91 as seen from the driver and thus the area of interest A is within the line-of-sight direction range, while the area of interest B is located in a different direction from the direction of the line-of-sight sensor 91 as seen from the driver and thus a part of it is outside the line-of-sight direction range. In such a case, a driving situation in which an evaluation on the visual confirmation is performed using the area of interest A is a limited situation. For example, when an area of interest used in evaluation on forward visual confirmation is set on a forward road along which the vehicle is traveling straight, the line-of-sight sensor 91 located in front of the driver is capable of, in most cases, capturing this whole area of interest within the area in the direction of the line of sight, and thus the driving situation using this area of interest is a limited situation.

In the above-described limited situation, when line-of-sight data of the type A used in estimating the attentive watching state is "valid" in the validity and the employability of the estimation result on the attentive watching state is judged only using the second confidence level, the visual confirmation evaluation unit 219 is estimates the cause of the discontinuity. As a result of the limitation descried above, estimation of the cause of the discontinuity is limited to a case where the attentive watching state is calculated based on line-of-sight data of the type A that is line-of-sight data that is valid for either left or right eye. That is, even in a case where the condition of selecting line-of-sight data used in estimating the attentive watching state is not strict, in a limited situation in which an estimation result on an attentive watching state is determined to be unemployable based on the line of sight configuration state, a cause of discontinuity is estimated. As one of functions of the visual confirmation evaluation unit 219, the visual confirmation evaluation unit 219 has a function of handling the continuity as described below.

The visual confirmation evaluation unit 219 classifies each piece of line-of-sight data in an arbitrary period of time before the current time as to whether the line-of-sight data is invalid for both right and left eyes, that is, whether both-eye line-of-sight data is invalid or not. Herein the type of the line-of-sight data is checked as to the types described above regardless of whether the line-of-sight data is of the type A or B used in the estimation on attentive watching state by the attentive watching state estimation unit 215 or of type A' used in calculating the occurrence rate by the line-of-sight data configuration calculation unit 216. To judge whether a great change in the face orientation is occurring or not, it is desirable that the arbitrary period of time is equal to or longer than the judgment time used by the attentive watching state estimation unit 215.

In a case where line-of-sight data at the present time is invalid, the visual confirmation evaluation unit 219 searches the set of line-of-sight data in the above-described arbitrary period of time to find right-eye line-of-sight data and left-eye line-of-sight data that respectively appeared in the valid state after the invalid state for the first time as seen back from the current time. On the other hand, in a case where line-of-sight data at the present time is valid, the visual confirmation evaluation unit 219 searches the set of line-of-sight data in the above-described arbitrary period of time to find right-eye line-of-sight data and left-eye line-of-sight data that respectively appeared in the invalid state after the valid state for the first time as seen back from the current time. The visual confirmation evaluation unit 219 determines whether the difference between the acquisition time of the retrieved right-eye line-of-sight data and the acquisition time of the retrieved left-eye line-of-sight data is equal to or greater than a predetermined threshold value. The threshold value may be an arbitrary value greater than 0. However, it is desirable the threshold value is equal to or less than a period of time in which motion of a face in a general face orientation occurs and furthermore the threshold value is at least equal to or greater than an acquisition time difference between line-of-sight data at adjacent locations.

In a case where the acquisition time difference between the retrieved two pieces of line-of-sight data is less than the threshold value, the visual confirmation evaluation unit 219 determines that no transition of line of sight occurred before the continuity occurred in the estimation result on the attentive watching state, and thus estimates that the cause of the discontinuity is not a large change in the face orientation. In this case, the visual confirmation evaluation unit 219 performs the evaluation on the visual confirmation under the assumption that the same estimation result still continues as the continuously occurring estimation result. On the other hand, in a case where the acquisition time difference between the retrieved two pieces of line-of-sight data is equal to or greater than the threshold value, the visual confirmation evaluation unit 219 determines that transition of line of sight occurred before the continuity occurred in the estimation result, and estimates that the cause of the discontinuity is a large change in the face orientation. In this case, the visual confirmation evaluation unit 219 performs the evaluation on the visual confirmation under the assumption that an estimation result different from the continuously occurring estimation result occurred. That is, when the visual confirmation evaluation unit 19 judges whether the attentive watching state of interest to be subjected to judgment occurs continuously a predetermined number of times, the visual confirmation evaluation unit 19 does not determine that the estimation result on the attentive watching state in the judgment time in which the discontinuity occurred is not unemployable but the visual confirmation evaluation unit 19 performs the evaluation on the visual confirmation under the assumption that the determined estimation result actually occurred.

As described above, it is possible to estimate whether a greater change occurs in an attentive watching state by judging a change in a face orientation based on a change or a lack of line-of-sight data, and it is possible to perform the evaluation on the visual confirmation based on more accurate continuity even in a case where an estimation result on the attentive watching state is determined to be unemployable.

In a case where the assumed situation as to the handling of discontinuity is not satisfied, the visual confirmation evaluation unit 219 handles the discontinuity in a similar manner to the first embodiment. That is, in this case, one option is automatically selected from three options (regarded as continuous, regarded as discontinues, ignored) determined taking into account the content of the supporting to the driver, and the judgment time is increased as occasion calls. Also in a case where right-eye line-of-sight data and left-eye line-of-sight data that respectively appeared in the invalid state after the valid state for the first time are not found from the line-of-sight data in an arbitrary period of time, the visual confirmation evaluation unit 219 handles the discontinuity in a similar manner to the first embodiment.

As in the first embodiment, the driving support apparatus 210 may be realized, for example, using an in-vehicle computer 40 illustrated in FIG. 27. In the storage unit 46, a driving support program 250 for allowing the in-vehicle computer 40 to function as the driving support apparatus 210 is stored. The driving support program 250 includes a line-of-sight data judgment process 51, a driving situation determination process 52, an area-of-interest setting process 53, an area-of-interest error calculation process 54, an attentive watching state estimation process 255, and a line-of-sight configuration state calculation process 256. The driving support program 250 further includes a confidence level calculation process 257, an employability determination process 258, and a visual confirmation estimation process 259.

The CPU 42 operates as the attentive watching state estimation unit 215 illustrated in FIG. 1 by executing the attentive watching state estimation process 255. The CPU 42 operates as the line-of-sight data configuration calculation unit 216 illustrated in FIG. 1 by executing the line-of-sight configuration state calculation process 256. The CPU 42 operates as the confidence level calculation unit 217 illustrated in FIG. 1 by executing the confidence level calculation process 257. The CPU 42 operates as the employability determination unit 218 illustrated in FIG. 1 by executing the employability determination process 258. The CPU 42 operates as the visual confirmation evaluation unit 219 illustrated in FIG. 1 by executing the visual confirmation estimation process 259. The other processes are similar to those according to the first embodiment. Thus, the in-vehicle computer 40 functions as the driving support apparatus 210 by executing the driving support program 250.

The driving support apparatus 210 may also be realized using, for example, a semiconductor integrated circuit, and more specifically, an application specific integrated circuit (ASIC) or the like.

The operation of the second embodiment is described below with a focus on a difference from the first embodiment.

In the driving support process according to the second embodiment, in step S13 in FIG. 28, the line-of-data judgment unit 11 determines whether line-of-sight data is valid or not for each of left-eye line-of-sight data, right-eye line-of-sight data, and both-eye line-of-sight data. Then in step S15 via step S14, the line-of-data judgment unit 11 stores the respective pieces of line-of-sight data in relation to the corresponding types, including the judgment result on the validity, of the line-of-sight data in the line-of-data storage unit 20.

In step S213 in the process in the judgment time illustrated in FIG. 29, the attentive watching state estimation unit 215 determines whether the current line-of-sight data is of the type A corresponding to one of patters defined in a table, for example, such as that illustrated in FIG. 30. When the determination is affirmative, the processing flow proceeds to step S214. However, when the determination is negative, the processing flow proceeds to step S217. In step S214, the attentive watching state estimation unit 215 calculates the value indicating the attentive watching state, and more specifically, for example, the attentive watching rate #1 for each pattern including a combination of line-of-sight data of the type A and the line-of-sight data of the type B.

Furthermore, in step S217, the line-of-sight data configuration calculation unit 216 determines line-of-sight data of the type A' and the line-of-sight data of the type B' for use in calculating the line of sight configuration state corresponding to the pattern including the line-of-sight data of the type A and the line-of-sight data of the type B used in step S214. Furthermore, the line-of-sight data configuration calculation unit 216 calculates, for example, the occurrence rate #1 as a value indicating the line of sight configuration state for each pattern of the line-of-sight data of the type A' and the line-of-sight data of the type B'.

In step S219, the confidence level calculation unit 217 calculates the second confidence level for each pattern according to, for example, equation (12) using the occurrence rate #1 calculated for each pattern in step S217. The confidence level calculation unit 217 calculates the first confidence level for each pattern according to, for example, equations (10), (11), or the like.

Figure 32:
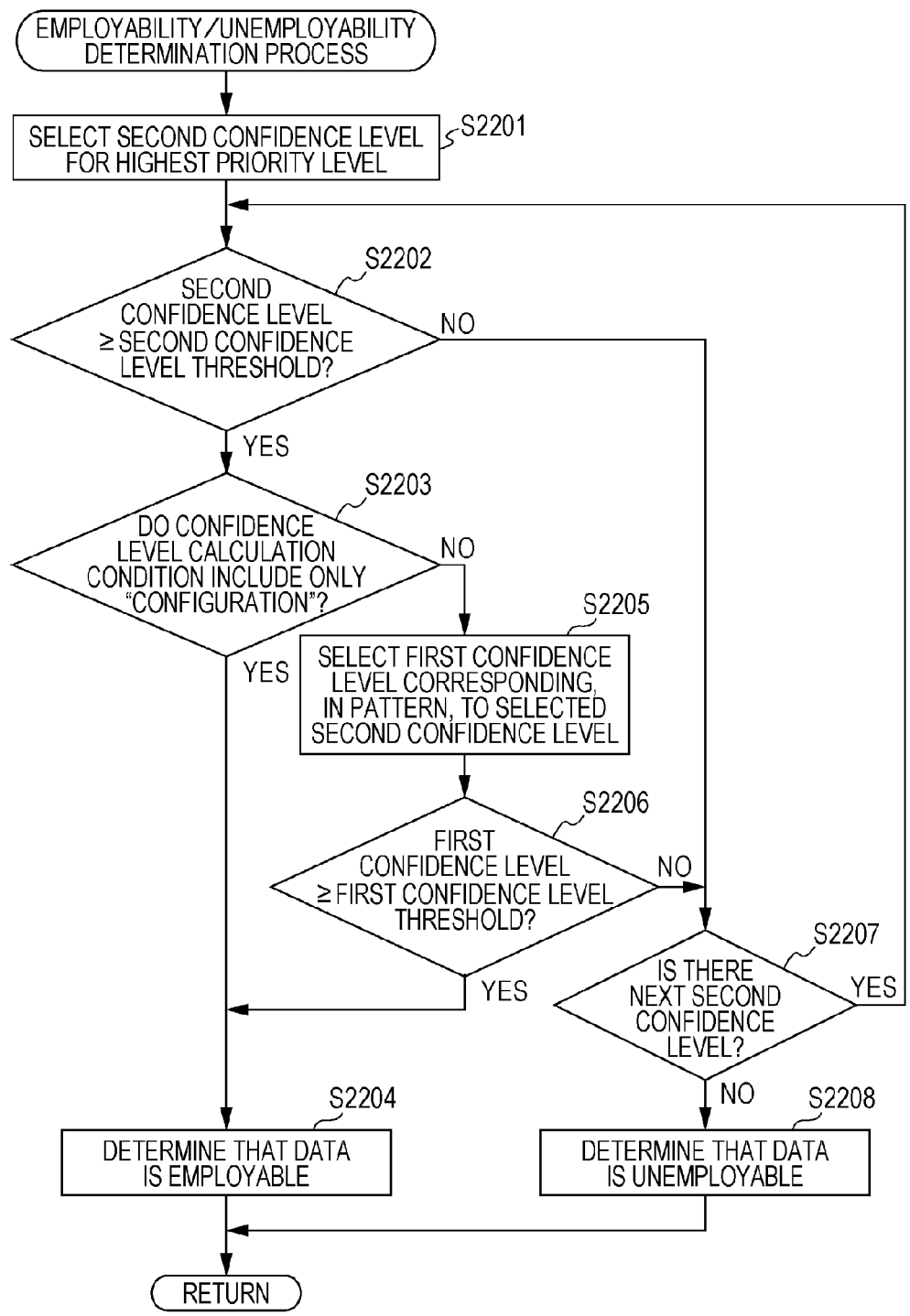
FIG. 32 is a flow chart illustrating an example of an employability determination process.

Next, in step S220, the employable/unemployable determination process illustrated in FIG. 32 is performed. First, in step S2201, the employability determination unit 218 selects a second confidence level with a highest priority level assigned thereto from a set of second confidence levels calculated for each pattern in step S219. Next, in step S2202, the employability determination unit 218 determines whether the selected second confidence level is equal to or greater than the second confidence level threshold value. In a case where the second confidence level is equal to or greater than the second confidence level threshold value, the processing flow proceeds to S2203. On the other hand, in a case where the second confidence level is lower than the second confidence level threshold value, the processing flow proceeds to step S2207.

In step S2203, the employability determination unit 218 determines whether the confidence level calculation condition defined in a table such as that illustrated in FIG. 7 is only "configuration". In a caser where the confidence level calculation condition is defined as only "configuration", the processing flow proceeds to step S2204. In step S2204, the employability determination unit 218 determines that it is allowed to use the estimation result on the attentive watching state in the judgment time of interest. Thereafter, the processing flow returns to the process in the judgment time illustrated in FIG. 29. On the other hand, in a case where the confidence level calculation condition is defined as "configuration+area", the processing flow proceeds to step S2205.

In step S2205, the employability determination unit 218 selects a first confidence level corresponding in pattern to the selected second confidence level. Next, in step S2206, the employability determination unit 218 determines whether the selected first confidence level is equal to or greater than the first confidence level threshold value. In a case where the first confidence level is equal to or greater than the first confidence level threshold value, the processing flow proceeds to step S2204. However, in a case where the first confidence level is lower than the first confidence level threshold value, the processing flow proceeds to step S2207.

In step S2207, the employability determination unit 218 determines whether there is an unselected second confidence level in the set of second confidence levels. When there is an unselected second confidence level, the employability determination unit 218 selects a second confidence level having a highest priority level of the unselected second confidence levels. The processing flow then returns to step S2202. In a case where there is no unselected second confidence level, the processing flow proceeds to S2208. In step S2208, the employability determination unit 218 determines that it is not allowed to use the estimation result on the attentive watching state in the judgment time of interest. Thereafter, the processing flow returns to the process in the judgment time illustrated in FIG. 29. Thereafter, the processing flow returns to the driving support process via step S221.

Figure 33:
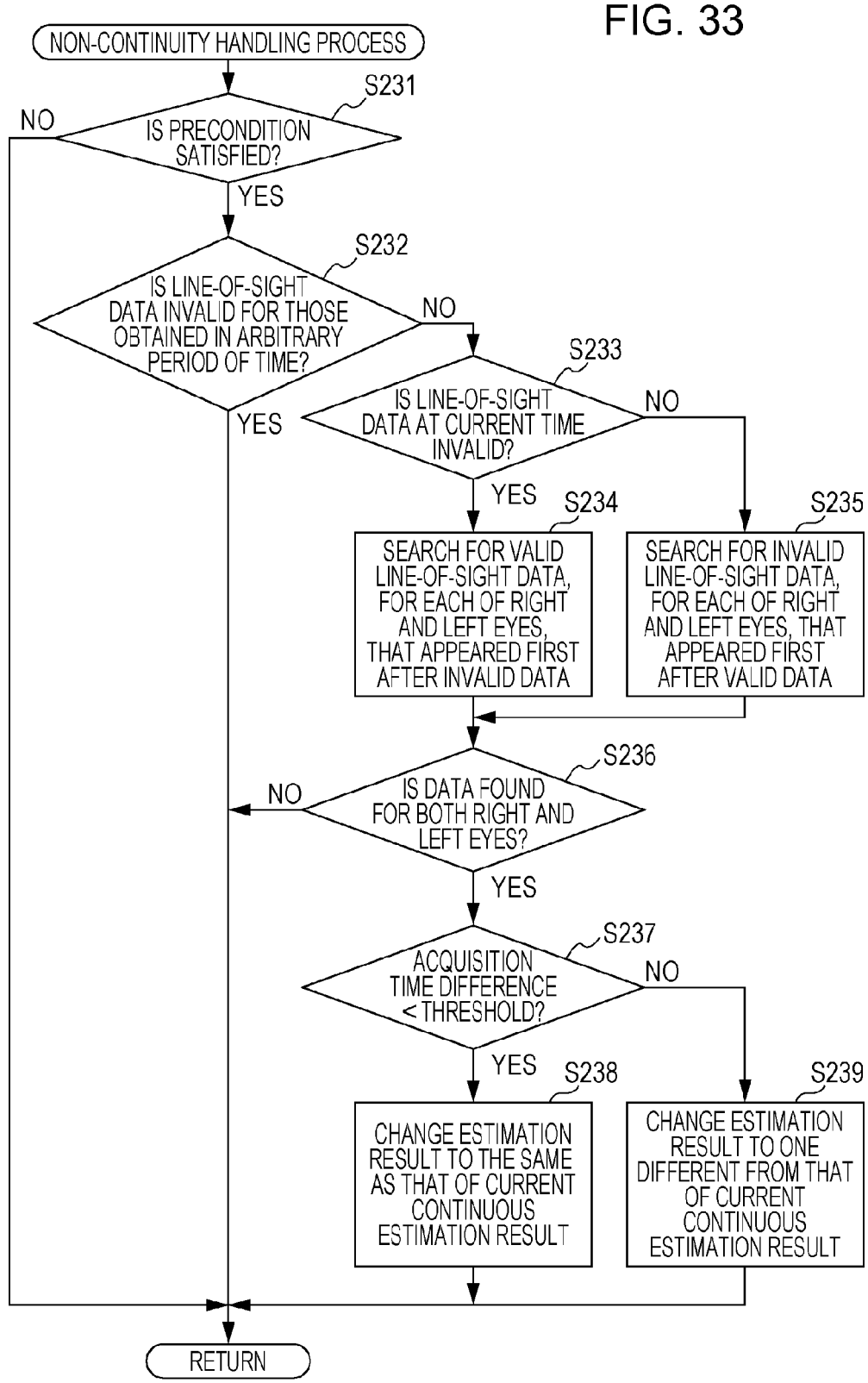
FIG. 33 is a flow chart illustrating an example of a discontinuity handling process.

In the driving support process according to the second embodiment, a discontinuity handling process illustrated in FIG. 33 is executed between step S23 and step S24 in FIG. 28.

In step S231 in the discontinuity handling process, the visual confirmation evaluation unit 219 determines whether the estimation result on the attentive watching state, determined to be "unemployable" in the determination as to the employability, satisfies the precondition for performing the handling of the discontinuity. As described above, the precondition to be satisfied is that the driving situation in the judgment time of interest is a limited situation, the line-of-sight data of the type A used in estimating the attentive watching state is "valid" in the validity, and the employability of the estimation result on the attentive watching state is judged only using the second confidence level. In a case where the precondition is satisfied, the processing flow proceeds to step S232, but otherwise the discontinuity handling process is ended and the processing flow directly returns to the driving support process in FIG. 28.

In step S232, the visual confirmation evaluation unit 219 classifies each piece of line-of-sight data in an arbitrary period of time before the current time as to whether the line-of-sight data is invalid for both right and left eyes, that is, whether both-eye line-of-sight data is invalid or not. In a case where all pieces of line-of-sight data in the arbitrary period of time are invalid, the discontinuity handling process is ended and the processing flow directly returns to the driving support process in FIG. 28. In a case where there is valid line-of-sight data in the arbitrary period of time, the processing flow proceeds to step S233.

In step S233, the visual confirmation evaluation unit 219 determines whether the line-of-sight data at the present time is valid or not. In a case where the line-of-sight data at the present time is invalid, the processing flow proceeds to step S234. On the other hand, in a case where the line-of-sight data at the present time is valid, the processing flow proceeds to step S235.

In step S234, the visual confirmation evaluation unit 219 searches the set of line-of-sight data in the above-described arbitrary period of time to find right-eye line-of-sight data and left-eye line-of-sight data that respectively appeared in the valid state after the invalid state for the first time as seen back from the current time. On the other hand, in step S235, the visual confirmation evaluation unit 219 searches the set of line-of-sight data in the above-described arbitrary period of time to find right-eye line-of-sight data and left-eye line-of-sight data that respectively appeared in the invalid state after the valid state for the first time as seen back from the current time.

Next, in step S236, the visual confirmation evaluation unit 219 judges whether right-eye line-of-sight data and left-eye line-of-sight data are both retrieved in step S234 or step S235. In a case where the retrieval is successful, the processing flow proceeds to step S237, but otherwise the processing flow returns to the driving support process in FIG. 28.

In step S237, the visual confirmation evaluation unit 219 determines whether the difference between the acquisition time of the retrieved right-eye line-of-sight data and the acquisition time of the retrieved left-eye line-of-sight data is smaller than a predetermined threshold value. In a case where the acquisition time difference is smaller than the threshold value, the processing flow proceeds to step S238. In a case where the acquisition time difference is equal to or greater than the threshold value, the processing flow proceeds to step S239.

In step S238, the visual confirmation evaluation unit 219 assumes that, as to the estimation result in the judgment time of interest, the same estimation result still continues as the continuously occurring estimation result, and the visual confirmation evaluation unit 219 changes the employability to "employable" and changes the estimation result on the attentive watching state to the same estimation result as that in the previous judgment time. On the other hand, in step S239, the visual confirmation evaluation unit 219 assumes that, as to the estimation result in the judgment time of interest, an estimation result different from the continuously occurring estimation result is occurring, and the visual confirmation evaluation unit 219 changes the employability to "employable" and changes the estimation result on the attentive watching state to an estimation result different from that in the previous judgment time. The estimation result may be different from that in the previous judgment time, for example, in the following case. When the estimation result in the previous judgment time was an estimation result indicating an attentive watching state to be evaluated, a different estimation result is an estimation result indicating an attentive watching state not to be evaluated. On the other hand, when the estimation result in the previous judgment time was an estimation result indicating an attentive watching state not to be evaluated, a different estimation result is an estimation result indicating an attentive watching state to be evaluated. Thereafter, the discontinuity handling process is ended, and the processing flow returns to the driving support process in FIG. 28.

In step S24 of the driving support process illustrated in FIG. 28, in a case where the estimation result has been changed in step S238 or step S239, the evaluation on the visual confirmation is performed using the changed estimation result. Note that also in a case where the result of the determination in step S231 or step S236 is negative, the process of handling the discontinuity is performed in step S25 in a similar manner to the first embodiment.

In the driving support apparatus according to the second embodiment, as described above, a plurality of patterns are prepared as to types of line-of-sight data used in the estimation of the attentive watching state and the calculation of the line of sight configuration state, and the estimation of the attentive watching state and the calculation of the confidence level are performed for each pattern. Using the confidence levels of the respective patterns stepwise, the determination is performed as to whether the estimation result of the attentive watching state is allowed to be used. This allows it to evaluate the visual confirmation state based on the line-of-sight configuration more consistent with the current driving situation. For example, in an environment in which the sensor does not have significant degradation due to backlight, vibrations, or the like, or in a case in which it is allowed to properly perform evaluation on the visual confirmation based on line-of-sight data indicating, for example, an arbitrary change in line of sight, it is possible to perform the evaluation on the visual confirmation based on the visual confirmation rate calculated using only strictly selected lines of sight in the intentionally looking state.

In particular, in a case where the line-of-sight data of the type A used by the attentive watching state estimation unit 215 is defined as line-of-sight data other than "saccade" line-of-sight data, it is allowed to estimate the attentive watching state using only intentional lines of sight. On the other hand, in this case, only lines of sight in a stable situation in which no movement occurs with the lines of sight, and thus line-of-sight data representing a moving line of sight is not used in calculating the attentive watching rate #1, the attentive watching rate #2, the attentive watching time #3, and the occupation ratio #4. Even in such a situation, in a case where the past line-of-sight data in the judgment time includes line-of-sight data of a type other than "saccade" in a not moving state, it is possible to calculate the attentive watching rate #1 or the like. However, in a case where a line of sight of "saccade" is included at a time close to the current time in the judgment time, the attentive watching rate #1 or the like calculated using the past line-of-sight data other than "saccade" does not have a value in which the latest state of line of sight is sensitively reflected. Depending on the situation, "saccade" is not completely excluded, but it is more desirable to estimate the attentive watching state which is influenced by the latest line of sight including the line of sight of "saccade".

In such a case, for example, a higher priority level is assigned to a pattern using line-of-sight data other than "saccade" as the type A than a priority level assigned to a pattern using valid line-of-sight data including "saccade" as the type A. The evaluation on the visual confirmation is performed using line-of-sight data other than "saccade" when the line-of-sight configuration is possible via the judgment on the employability/unemployability using the second confidence level including the occurrence rate #1 or the like indicating the line of sight configuration state calculated by the line-of-sight data configuration calculation unit 216. In a case where the line-of-sight configuration is not possible, the operation is switched to a mode in which the evaluation on the visual confirmation is performed using the line-of-sight data including "saccade". Thus, by switching the line-of-sight data with a low confidence level caused by the line of sight configuration state to another line-of-sight data with a high confidence level in the estimation of the attentive watching state, it becomes possible to perform the evolution based on intentional lines of sight while sensitively reflecting the line-of-sight state as much as possible.

In the second embodiment, a plurality of estimation results (attentive watching rate #1, attentive watching rate #2, attentive watching time #3, occupation ratio #4, and the like) on the attentive watching state calculated for each pattern are transferred to a following process. Alternatively, for example, statistical values such as the mean value, the intermediate value, the maximum value, the minimum value or the like of the plurality of values of attentive watching rate #1, the attentive watching rate #2, the attentive watching time #3, and the occupation ratio #4 calculated for each pattern may be transferred as the final attentive watching rate #1, the attentive watching rate #2, the attentive watching time #3, and the occupation ratio #4 to the following process. Equation (13) described below illustrates an example in which the average value of the attentive watching rates #1 calculated for the respective patterns is calculated as the final attentive watching rate #1. Equation (14) described below illustrates an example in which the minim value of the attentive watching rates #1 calculated for the respective patterns is calculated as the final attentive watching rate #1.

$$\text{Final attentive watching rate \#1} = \frac{\sum_{i=1}^{N} \text{attentive watching rate of pattern } i}{N} \quad (13)$$

$$\text{Final attentive watching rate \#1} = \text{MIN(attentive watching rate of pattern } i), \quad i = 1 \sim N \quad (14)$$

As with the second embodiment, a priority level may be assigned to each pattern, and a pattern with a highest priority may be selected from a plurality of patterns that allows it to calculate the attentive watching rate #1 and the like. Using line-of-sight data of the type indicated by the selected pattern, the attentive watching rate #1 may be calculated. As in the case where line-of-sight data that is valid for both left and right eyes and is not subjected to interpolation is selected as line-of-sight data of the type A and the type A described above, there is no line-of-sight data at all available for use, depending on the measurement state of the line-of-sight sensor 91. In such a case, it is not possible to calculate the attentive watching rate #1 or the like, the pattern may be changed to another pattern that allows it to calculate the attentive watching rate #1 or the like.

In a case where the final attentive watching rate #1 or the like is calculated, or in a case where the attentive watching rate #1 or the like of a pattern that is assigned a high priority and that allows it to calculate the attentive watching rate #1 or the like, for example, the attentive watching state estimation unit 215 may calculate one value of the estimation result on the attentive watching state. Thus, the process following this may be performed in a similar manner to the first embodiment.

Furthermore, in the second embodiment, in a case where the first confidence level and the second confidence level are different from each other, the employability determination unit 218 evaluates the second confidence level and the first confidence level in the order of priority. Alternatively, for example, first confidence levels equal to or higher than the first confidence level threshold value are extracted from first confidence levels corresponding in pattern to second confidence levels equal to or higher than the second confidence level threshold value. A plurality of attentive watching rate #1 or the like are calculated using line-of-sight data of the type indicated by the respective patterns corresponding to the extracted first confidence levels. The final attentive watching rate #1 or the like is then calculated from the plurality of calculated attentive watching rates #1, and is used in evaluation on the visual confirmation. The final attentive watching rate #1 may be given, as with the case describe above, by the statistical value such as the mean value, the intermediate value, the maximum value, or the minimum value of the plurality of attentive watching rates #1 calculated for the respective patterns corresponding to the extracted first confidence levels.

As the value indicating the estimation result on the attentive watching state, use of the statistical value instead of the attentive watching rate #1 or the like selected according to the priority of the patterns makes it possible to perform the evaluation on the visual confirmation from the overall point of view taking into account attentive watching rates associated with various kinds of lines of sight.

Furthermore, in the second embodiment, the estimation is performed on whether a great change occurs in the face orientation, using the line-of-sight data acquired by the line-of-sight sensor 91. Alternatively, the face direction may be measured directly by the line-of-sight sensor 91, or there may be an additional sensor configured to measure the face orientation. In this case, instead of performing searching to detect the validity or invalidity of left-eye line-of-sight data and right-eye line-of-sight data, a change in continuity may be estimated from a change in angle of the face orientation. That is, the angle of the face orientation at a time at which a discontinuity occurs is compared with the angle of the face orientation an arbitrary time before the current time. When the angle difference is equal to or greater than a predetermined threshold value, it is allowed to assume that an estimation result different from the continuing estimation result has occurred. On the other hand, in a case where the angle difference is less than the predetermine threshold value, it is assumed that an estimation result that occurred is the same as the continuing estimation result.

Compared with the face orientation, the line of sight tends to move in a complicated manner to make a fine adjustment to compensate for an excessive motion of the face orientation. Therefore, use of data representing the face orientation in the judgment makes it possible to accurately determine a change in attentive watching state caused by a movement of a target being attentively watched.

In the above embodiments, the driving support program 50 or 250 that is an example of the driving support program according to the technique disclosed herein is stored (installed) in advance in the storage unit 46. Alternatively, the driving support program according to the technique disclosed herein may be provided in a form in which the driving support program is stored in the storage medium such as CD-ROM, DVD-ROM, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A driving support apparatus comprising:
memory; and
a hardware processor coupled to the memory and configured to:
    judge a type of line-of-sight data indicating a direction of the line of sight of a driver;
    estimate an attentive watching state of the driver on a target area to be attentively watched, the estimation being performed based on
        the target area to be attentively watched being set depending on a driving situation based on vehicle state information indicating a vehicle state and surrounding state information indicating a state surrounding the vehicle, and
        a direction of the line of sight indicated by a plurality of pieces of line-of-sight data acquired in a judgment time determined depending on the driving situation; and
    calculate a confidence level of an estimation result of the attentive watching state, the calculation being performed based on at least one of
        setting accuracy of the target area to be attentively watched, and
        a configuration state of line-of-sight data associated with each type of the plurality of pieces of line-of-sight data acquired in the judgment time.

2. The driving support apparatus according to claim 1, the hardware processor being further configured to:
    calculate the configuration state of the line-of-sight data based on an occurrence rate of a predetermined type of line-of-sight data relative to the total of the plurality of pieces of line-of-sight data acquired in the judgment time; and
    calculate at least either an error of a position or an error of a shape of the set target area to be attentively watched to determine accuracy of the target area to be attentively watched.

3. The driving support apparatus according to claim 2, wherein the calculating the configuration state of the line-of-sight data uses, as the type of line-of-sight data, at least one of the following:
    whether the line-of-sight data is effective in estimating the attentive watching state;
    whether the line-of-sight data indicates a saccade line of sight;
    whether the line-of-sight data has a value obtained by performing interpolation using another line-of-sight data; and
    whether the line-of-sight data represents lines of sight of both eyes effective in estimating the attentive watching state.

4. The driving support apparatus according to claim 2, wherein the calculating the configuration state of the line-of-sight data uses a weight calculated using a difference between a current time and an acquisition time of the line-of-sight data.

5. The driving support apparatus according to claim 2, wherein the calculating the at least either the error of the position or the error of the shape is based on a difference between a target area to be attentively watched set for an average driver and a target area to be attentively watched depending on an attribute of a driver for which estimating an attentive watching state is to be performed.

6. The driving support apparatus according to claim 1, wherein the estimating the attentive watching state of the driver sets the target area to be attentively watched so as to have a shape of a two-dimensional plane assumed to correspond to a target to be attentively watched located a predetermined distance apart from a point of view of the driver or so as to have a shape of a cone whose vertex corresponds to the point of view of the driver and whose bottom surface corresponds to the two-dimensional plane.

7. The driving support apparatus according to claim 6, wherein the calculating the at least either the error of the position or the error of the shape calculates the error using position accuracy of the position of the vehicle or the position of the point of view of the driver.

8. The driving support apparatus according to claim 6, wherein the calculating the at least either the error of the position or the error of the shape calculates the error using at least one of the following: the area of an overlapping part between the two-dimensional plane of the set target area to be attentively watched and a shape of an actual target to be attentively watched; and the area of a non-overlapping part between the two-dimensional plane of the set target area to be attentively watched and the shape of the actual target to be attentively watched.

9. The driving support apparatus according to claim 1, wherein in a case where a plurality of target areas to be attentively watched are set, the estimating the attentive watching state of the driver uses, as a final estimation result, a value statistically obtained from estimation results on attentive watching states for the respective set target areas to be attentively watched, and
    in the case where the plurality of target areas to be attentively watched are set, the calculating the confidence level uses, as a final confidence level, a value statistically obtained from confidence levels of estimation results of the respective set target areas to be attentively watched.

10. The driving support apparatus according to claim 1, wherein the estimating the attentive watching state of the driver estimates the attentive watching state based on the degree of overlapping between the target area to be attentively watched and a shape, the center of which is located at the average position of intersecting positions where direction of the lines of sight indicated by line-of-sight data included in the judgment time intersect with the target area to be attentively watched, and the size of which corresponds to a variation of the intersecting positions.

11. The driving support apparatus according to claim 1, the processor further configured to evaluate the visually confirming behavior of the driver depending on the driving situation based on an estimation result on the attentive watching state in a judgment time, the estimation result being given for each of a plurality of continuous judgment times, the visually confirming behavior being evaluated based on the estimation result having a confidence level equal to or greater than a predetermined threshold value.

12. The driving support apparatus according to claim 1, wherein the estimating the attentive watching state of the driver estimates the attentively watching behavior of the driver for each of patterns of different types of line-of-sight data used in estimating the attentive watching state of the driver, wherein the easiness of acquiring the line-of-sight data of the respective types varies stepwise among the types of the line-of-sight data.

13. The driving support apparatus according to claim 12, wherein the calculating the confidence level calculates the confidence level of the estimation result on the attentive watching state for each pattern.

14. The driving support apparatus according to claim 12, wherein the evaluating the visually confirming behavior of the driver selects an estimation result to be used in the evaluation from the estimation results on the attentive watching state for the respective patterns, according to the priority level assigned to each pattern based on the easiness of acquiring the line-of-sight data.

15. The driving support apparatus according to claim 12, wherein the evaluating the visually confirming behavior of the driver uses, as a final attentive watching state, a value statistically obtained from the estimation results on the attentive watching state for the respective patterns.

16. The driving support apparatus according to claim 11, wherein the evaluating the visually confirming behavior of the driver estimates the continuity of the estimation result on the attentive watching state in each judgment time based on a change between line-of-sight data valid line-of-sight data invalid for use in the estimation on the attentive watching state and line-of-sight data.

17. A driving support method configured to cause a computer to execute a process, the process comprising:
    judging a type of line-of-sight data indicating a direction of the line of sight of a driver;
    estimating an attentive watching state of the driver on a target area to be attentively watched, based on the following:
        the target area to be attentively watched being set depending on a driving situation based on vehicle state information indicating a vehicle state and surrounding state information indicating a state surrounding the vehicle, and
        a direction of the line of sight indicated by a plurality of pieces of line-of-sight data acquired in a judgment time determined depending on the driving situation; and
    calculating a confidence level of an estimation result of the attentive watching state based on at least one of the following:
        setting accuracy of the target area to be attentively watched, and
        a configuration state of line-of-sight data associated with each type of the plurality of pieces of line-of-sight data acquired in the judgment time.

18. The driving support method according to claim 17, wherein the process comprising at least one of the following:
    calculating the configuration state of the line-of-sight data based on an occurrence rate of a predetermined type of line-of-sight data relative to the total of the plurality of pieces of line-of-sight data acquired in the judgment time; and
    calculating at least either an error of a position or an error of a shape of the set target area to be attentively watched thereby determining accuracy of the target area to be attentively watched.

19. The driving support method according to claim 18, wherein the process of calculating the configuration state of the line-of-sight data uses, as the type of line-of-sight data, at least one of the following:
    whether the line-of-sight data is effective in estimating the attentive watching state;
    whether the line-of-sight data indicates a saccade line of sight;
    whether the line-of-sight data has a value obtained by performing interpolation using another line-of-sight data; and
    whether the line-of-sight data represents lines of sight of both eyes effective in estimating the attentive watching state.

20. A non-transitory computer-readable recording medium storing a driving support program that, when executed, causes a computer to perform a process, the process comprising:
    judging a type of line-of-sight data indicating a direction of the line of sight of a driver;
    estimating an attentive watching state of the driver on a target area to be attentively watched, based on the following:
    the target area to be attentively watched being set depending on
        a driving situation based on vehicle state information indicating a vehicle state and surrounding state information indicating a state surrounding the vehicle, and
        a direction of the line of sight indicated by a plurality of pieces of line-of-sight data acquired in a judgment time determined depending on the driving situation; and
    calculating a confidence level of an estimation result of the attentive watching state based on at least one of the following:
        setting accuracy of the target area to be attentively watched, and
        a configuration state of line-of-sight data associated with each type of the plurality of pieces of line-of-sight data acquired in the judgment time.

* * * * *